(12) United States Patent
Lee et al.

(10) Patent No.: US 7,340,558 B2
(45) Date of Patent: Mar. 4, 2008

(54) MULTISECTION MEMORY BANK SYSTEM

(75) Inventors: Dongyun Lee, San Jose, CA (US);
Yeshik Shin, Sunnyvale, CA (US);
David D. Lee, Palo Alto, CA (US);
Deog-Kyoon Jeong, Seoul (KR); Shing Kong, Brisbane, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 941 days.

(21) Appl. No.: 10/045,601

(22) Filed: Nov. 7, 2001

(65) Prior Publication Data

US 2003/0208655 A1    Nov. 6, 2003

Related U.S. Application Data

(60) Provisional application No. 60/252,724, filed on Nov. 22, 2000.

(51) Int. Cl.
| | |
|---|---|
| G06F 12/06 | (2006.01) |
| G06F 13/00 | (2006.01) |
| G06F 3/00 | (2006.01) |
| G11C 29/00 | (2006.01) |
| G11C 7/10 | (2006.01) |
| G11C 8/00 | (2006.01) |

(52) U.S. Cl. ................ 711/5; 711/153; 711/149; 711/150; 711/167; 711/168; 711/173; 710/38; 710/52; 714/711; 365/189.01; 365/230.03; 365/230.05; 365/554

(58) Field of Classification Search ................ 711/5, 711/149–150, 153, 167–168, 173; 710/52, 710/38; 365/230.03, 230.05, 189.01; 714/711; 345/554
See application file for complete search history.

(56) References Cited

U.S. PATENT DOCUMENTS

| | | | | |
|---|---|---|---|---|
| 4,797,850 | A | * | 1/1989 | Amitai ..................... 711/106 |
| 4,972,314 | A | * | 11/1990 | Getzinger et al. .......... 711/149 |
| 5,539,696 | A | * | 7/1996 | Patel ..................... 365/189.01 |
| 5,987,577 | A | * | 11/1999 | Miller et al. ................. 711/168 |
| 6,415,353 | B1 | * | 7/2002 | Leung ........................ 711/106 |
| 6,560,728 | B2 | * | 5/2003 | Merritt ....................... 714/711 |

* cited by examiner

*Primary Examiner*—Hyung Sough
*Assistant Examiner*—Mardochee Chery
(74) *Attorney, Agent, or Firm*—Perkins Coie LLP

(57) ABSTRACT

A serial communications architecture for communicating between hosts and data store devices. The Storage Link architecture is specially adapted to support communications between multiple hosts and storage devices via a switching network, such as a storage area network. The Storage Link architecture specifies various communications techniques that can be combined to reduce the overall cost and increase the overall performance of communications. The Storage Link architecture may provide packet ordering based on packet type, dynamic segmentation of packets, asymmetric packet ordering, packet nesting, variable-sized packet headers, and use of out-of-band symbols to transmit control information as described below in more detail. The Storage Link architecture may also specify encoding techniques to optimize transitions and to ensure DC-balance.

22 Claims, 59 Drawing Sheets

| | | | | | | | | | | | | | | | | | | | | | | | | | |
|---|---|---|---|---|---|---|---|---|---|---|---|---|---|---|---|---|---|---|---|---|---|---|---|---|---|
| BIT BUFFER | A8 | A7 | A6 | A5 | A4 | A3 | A2 | A1 | A0 | B8 | B7 | B6 | B5 | B4 | B3 | B2 | B1 | C0 | C8 | C7 | C6 | C5 | C4 | C3 | C2 | C1 | C0 |
| BIT CONTENT | 0 | 0 | 1 | 0 | 0 | 0 | 0 | 0 | 0 | 0 | 0 | 1 | 0 | 0 | 1 | 1 | 1 | 1 | 1 | 0 | 0 | 0 | 0 | 0 | 0 | 0 |
| "10" DETECTION | | | | | | | | | | | | | | | | | | | | | | | | | | | |
| "10" DETECTION RESULT | 0 | 0 | 1 | 0 | 0 | 0 | 0 | 0 | 0 | 0 | 0 | 1 | 0 | 0 | 0 | 0 | 0 | 0 | 1 | 0 | 0 | 0 | 0 | 0 | 0 | 0 |
| SYMBOL STARTING POINTS | | | ←X | | | | | | | | | ←X | | | | | | | | ←X | | | | | | | |

*Fig. 9B*

| 8b code | 9 bit symbol |
|---|---|
| 0000 0000 | 101010101 |
| 0000 0001 | 101010100 |
| 0000 0010 | 101010111 |
| ⋮ | |
| 0101 0101 | 001010101 |
| ⋮ | |
| 0111 0110 | 001110110 |
| 0111 0111 | 100100010 |
| ⋮ | |
| 1111 1111 | 110101010 |

*Fig. 20*

Input Queue 3201

| Port | R/W | Address | Data |
|---|---|---|---|
| 3 | R | 1000 | |
| 4 | W | 4000 | 10....1 |
| 3 | W | 1000 | 111...0 |
| 3 | R | 2000 | |
| ... | ... | | |

Output Queue 3202

| Valid | Port | Data |
|---|---|---|
| 1 | 3 | 11..0 |
| 0 | | |
| 0 | | |
| 1 | 3 | 101...1 |
| | ... | |

*Fig. 32*

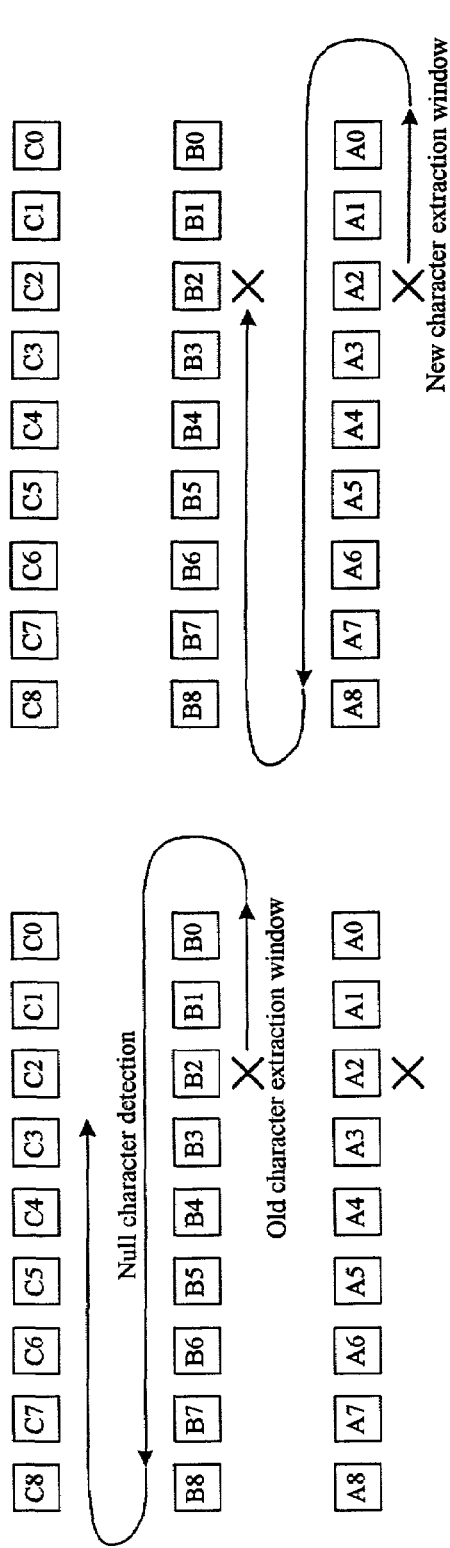
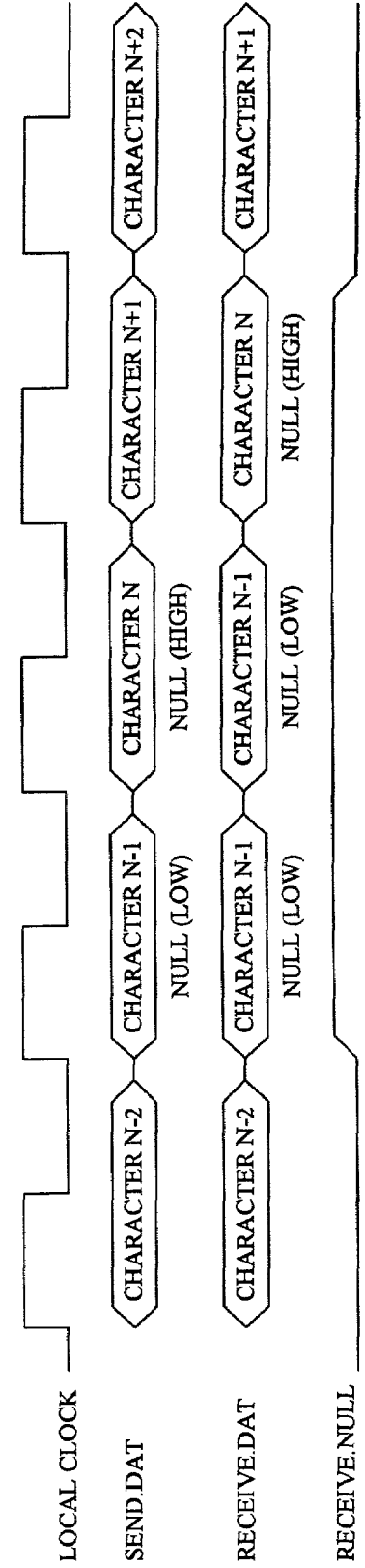
*Fig. 48A*
*Fig. 48B*

MULTISECTION MEMORY BANK SYSTEM

CROSS REFERENCE TO RELATED APPLICATIONS

This application claims the benefit of U.S. Provisional Application No. 60/252,724 entitled "METHOD AND APPARATUS FOR STORAGE I/O WITH FULL-DUPLEX ONE-TIME BLOCK I/O TRANSFER AND ADAPTIVE PAYLOAD SIZING, " filed Nov. 22, 2000, and is related to U.S. patent application Ser. No. 10/037,168 entitled "METHOD AND SYSTEM FOR PLESIOSYNCHRONOUS COMMUNICATIONS WITH NULL INSERTION AND REMOVAL"; U.S. patent application Ser. No. 10/045,393, entitled"METHOD AND SYSTEM FOR TRANSITION-CONTROLLED SELECTIVE BLOCK INVERSION COMMUNICATIONS"; U.S. patent application Ser. No. 10/035,591 entitled"COMMUNICATIONS ARCHITECTURE FOR STORAGE-BASED DEVICES"; U.S. patent application Ser. No. 10/036,135 entitled"METHOD AND SYSTEM FOR PACKET ORDERING BASED ON PACKET TYPE"; U.S. patent application Ser. No. 10/036,794 entitled"METHOD AND SYSTEM FOR HOST HANDLING OF COMMUNICATIONS ERRORS"; U.S. patent application Ser. No. 10/045,606 entitled "METHOD AND SYSTEM FOR DYNAMIC SEGMENTATION OF COMMUNICATIONS PACKETS"; U.S. patent application Ser. No. 10/045,348 entitled"METHOD AND SYSTEM FOR ASYMMETRIC PACKET ORDERING BETWEEN COMMUNICATIONS DEVICES"; U.S. patent application Ser. No 10/053,461 entitled "METHOD AND SYSTEM FOR COMMUNICATING CONTROL INFORMATION VIA OUT-OF-BAND SYMBOLS"; U.S. patent application Ser. No. 10/045,625 entitled"METHOD AND SYSTEM FOR INTEGRATING PACKET TYPE INFORMATION WITH SYNCHRONIZATION SYMBOLS"; U.S. patent application Ser. No 10/035,911 entitled"METHOD AND SYSTEM FOR NESTING OF COMMUNICATIONS PACKETS"; U.S. patent application Ser. No. 10/045,297 entitled "COMMUNICATIONS ARCHITECTURE FOR MEMORY-BASED DEVICES"; U.S. patent application Ser. No 10/045,600 entitled "METHOD AND SYSTEM FOR DC-BALANCING AT THE PHYSICAL LAYER"; and U.S. patent application Ser. No 10/045,601 entitled"MULTISECTION MEMORY BANK SYSTEM", which are all hereby incorporated by reference in their entirety.

BACKGROUND

The described technology relates generally to communications techniques and particularly to communications between hosts and data store devices.

The speed and capacity of the data store devices, such as disk drives and memories, have increased significantly over the past several years. As a result of their improved performance, these data store devices are being used in many new applications, such as database servers, Web servers, personal video recorders, and digital displays. These applications often require large amounts of data to be communicated between data store accessing devices ("hosts") and data store devices. (Hosts may include computers, CPUs, or any logic for accessing a data store device.) Moreover, as host speed increases, the speed in communicating between hosts and data store devices can have a significant impact on the overall performance of the application. In particular, even though the speed of hosts and data store devices has increased significantly, the speed of communications between hosts and data store devices has not increased as significantly, especially for communications over long distances (e.g., greater than one meter). Thus, the communications speed presents a bottleneck in many new applications.

Current communications techniques typically communicate between hosts and certain types of data store devices, such as disk drives, using a bus with many parallel lines or using a single serial communications link. The Integrated Disk Electronics ("IDE") bus and the Small Computer Systems Interface ("SCSI") bus are examples of bus-based parallel communications techniques. These communications techniques, however, present many problems. Performance of bus-based communications techniques is generally improved by increasing the number of lines in the bus, which may significantly increase the cost of such techniques. In addition, bus-based communications techniques generally provide arbitration so that multiple hosts and data store devices can share the same bus. The use of arbitration can significantly increase the cost of such a bus. The cost of such bus-based communication techniques is further increased because their design needs to address additional problems such as cross-talk and clock skew. In particular, as the communications speed increases, the solution to cross-talk and clock skew become much more complex.

Some serial communications techniques have been developed to address some of the problems of bus-based communications techniques. Current serial communications techniques, however, have problems of their own. Serial AT, Attachment, which is intended to replace IDE, does not scale well and only operates in a half duplex mode. Fibre Channel, currently used to support storage area networks ("SANs"), is very generic and therefore, not optimized for any particular application. In particular, Fibre Channel has a relatively small packet size with a large header. As a result, use of Fibre Channel often results in an unacceptably large overhead. For example, data transmitted to disk drives is typically sent in very large blocks (e.g., 216 bytes). With Fibre Channel, such large blocks need to be divided in many (e.g., 32) packets, which results in a high overhead in the amount of redundant header information and in the redundant processing performed as a packet is routed to its destination. Thus, Fibre Channel may not be appropriate for many applications.

Current memory devices, such as SDRAM and RDRAM, are typically designed to be synchronous with the accessing processing unit. The hosts and the memory devices are synchronous in that they share the same clock signal. These memory devices are typically optimized for access patterns that are both temporally and spatially related. In particular, these memory devices are optimized to read and write arrays (or streams) of data. There is a setup overhead (e.g., 5 clock cycles) when accessing the first word of an array in memory, but access of subsequent words in the array occurs at the synchronized clock rate (e.g., 1 access per clock cycle). Since the access patterns of central processing units and graphics processors are typically temporally and spatially related, they can access such memory devices efficiently.

Existing memory devices that are designed to support access patterns with a high temporal and spatial relationship may not be appropriate for uses having access patterns with a lower spatial relationship. The setup overhead for each access may be too high. There are, indeed, many uses for memory devices with access patterns that are not as spatially or temporally related as those of a central processing unit or a graphics processor. For example, a switch may have a memory device in which packets of data received via an input port are stored before they are transmitted via an output port. Traditionally, switches used crossbars to provide the switching function and FIFOs to provide a buffering function. When a memory device is used on a switch in place of a crossbar, then all the input and output ports need access to the memory device. The accesses by the different ports are, however, not particularly spatially related. Moreover, when the packet size is small (e.g., 53 bytes in the case of an ATM switch), the spatial relationship of accesses by a single port may not be significant. Other uses in which there may not be a significant spatial relationship of accesses include network processors and caches for storage area networks. In such uses, the data is received from disparate sources at disparate times and may not be spatially related.

Many existing memory devices are not particularly suitable for many uses because the memory devices typically allow access by only one accessing device at a time and because the memory devices typically operate at different clock rates than the accessing devices. Because such memory devices can only be accessed by one device at a time, the accessing devices may need to enter a wait state because the memory device is busy or a memory controller may need to have a buffering component. Of course, the use of a wait state may result in unacceptable performance. Also, the addition of a buffering component may increase complexity and cost. In addition, when multiple accessing devices access the same memory device through a single bus (e.g., one writing to the memory device and the other reading from the memory device), then all the devices that access the memory device need to be synchronized with the memory device. Because the accessing devices may have different underlying clock rates, complex and costly logic is needed to support the mapping to the bus clock rate.

Existing communications protocols, such as Fibre Channel, may have an unacceptable overhead for communicating with memory devices. The communications from a host to a memory device may occur in relatively short blocks (e.g., 32 bytes). Each block needs to be transmitted in a separate packet with a relatively large header. In some packets, the header may be larger than the data itself, which can significantly reduce the overall bandwidth and speed of transmission. More generally, communications between devices typically occurs in a synchronous or an asynchronous mode. In a synchronous mode, the transmitting and receiving devices use the same clock signal. The transmitting device can send the clock signal to the receiving device either as a separate signal or as a signal that can be derived from the data signals. When the clock is sent as a separate signal, problems arise resulting from the different delays in the data signals and the clock signal. These delays and resulting problems are increased as the transmission speed and distance are increased. It is very difficult and costly to account for these delays. In addition, the receiving device will have an asynchronous clock boundary. That is, a portion of the receiving device will operate at the clock frequency based on the transmitting device's clock frequency (i.e., the transmitter's clock domain) and another portion will operate at the receiving device's local clock frequency (i.e., the receiver's clock domain). As a result of the asynchronous boundary, the receiving device typically needs to buffer control and data signals sent between the clock domains using elastic buffers, which adds to the complexity and cost of the receiving devices. These elastic buffers require substantial space (e.g., chip area), and when a single chip has multiple communications ports, the design is complicated because each port needs its own elastic buffer. When the clock is derived from the data signal, the problems of the delay are reduced somewhat, but there are still the problems associated with an asynchronous clock boundary.

A plesiosynchronous clocking technique can be used to avoid the need to transmit a separate clock signal or derive the clock signal from the data signal. With plesiosynchronous clocking (also known as "plesiochronous" clocking), the transmitting and receiving devices have clocks with nominally the same clock frequency. If the clock frequencies were exactly the same, then transmitting and receiving devices would be synchronized and the receiving device could accurately identify the transmitted data (in the case of serial transmission). Also, since the receiving device operates only at its local clock frequency, there is no asynchronous clock boundary. In practice, however, clock frequencies are not exactly the same but vary, for example, by 100 ppm. The receiving device can use techniques as described in U.S. Pat. No. 6,229,859, entitled "System and Method for High-Speed, Synchronized Data Communication," which is hereby incorporated by reference, to account for clock variations. Those techniques use an oversampling of the data by the receiving device to detect edge boundaries of the transmitted data. The receiving device can vary the number of bits of data detected during an interval to compensate for the variations in frequency.

It would be desirable to have a communications architecture that provides high-performance for applications (e.g., data storage-based applications and memory-based applications) at a low cost. Such a communications architecture would allow for communications techniques to be tailored to particular applications.

BRIEF DESCRIPTION OF THE DRAWINGS

FIG. 9B illustrates the identification of synchronization symbols in one embodiment.

FIG. 20 illustrates an alternate bit inversion encoding technique in one embodiment.

FIG. 32 is a block diagram illustrating contents of a bank cache in one embodiment.

FIGS. 48A and 48B are diagrams illustrating NULL detection while the start-of-symbol pointer is in the underrun extend region.

DETAILED DESCRIPTION

Figure 1:
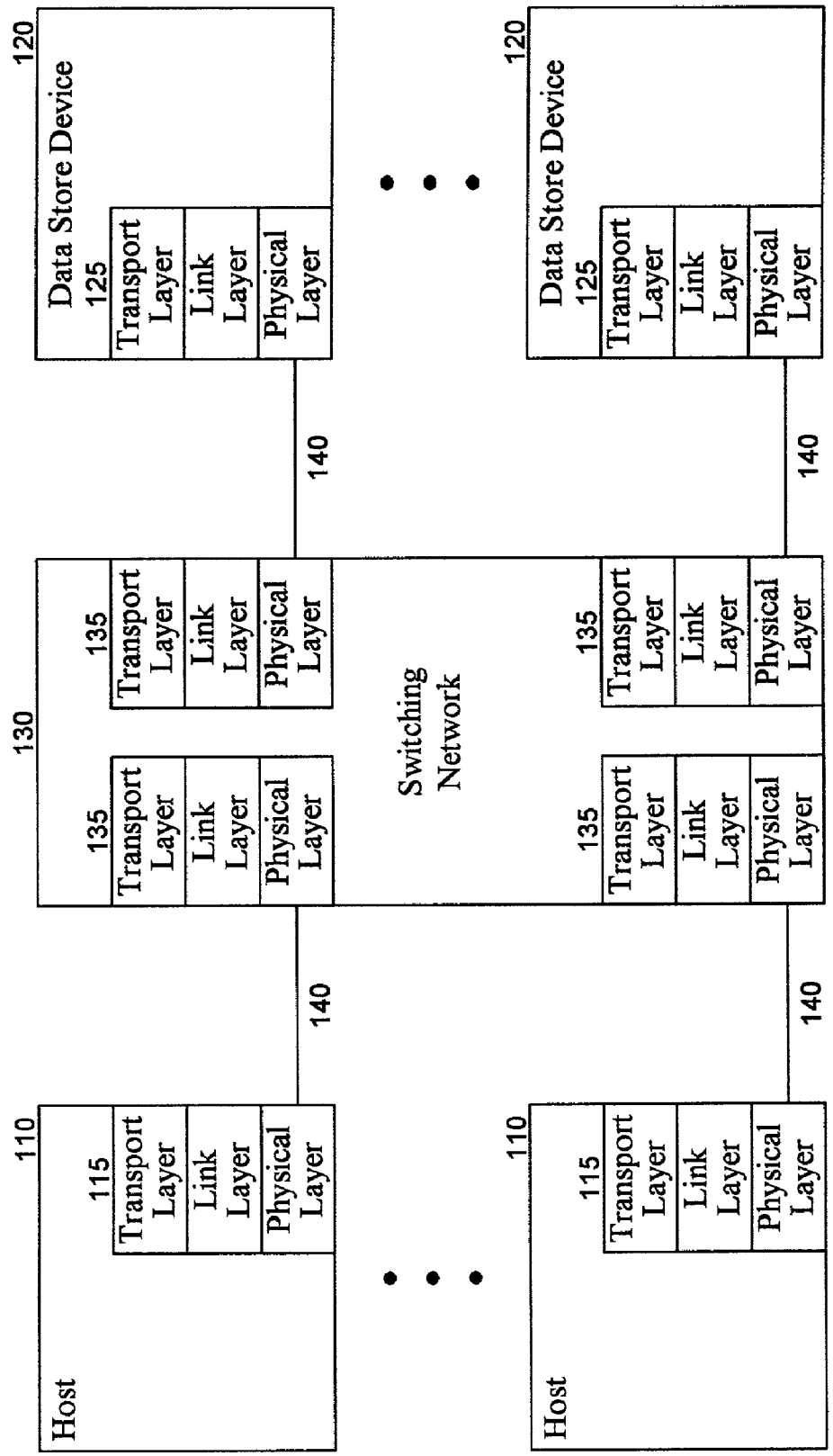
FIG. 1 is a block diagram illustrating components of the Storage Link architecture in one embodiment.

A serial communications architecture for communicating between hosts and data store devices is provided. Aspects of the serial communications architecture, referred to as "Storage Link," are specially adapted for communications with storage devices, such as disk drives. Other aspects of the serial communications architecture, referred to as "Memory Link," are specially adapted for communications with memory devices, such as RAM devices. In addition, Storage Link and Memory Link may use an improved plesiosynchronous technique when receiving data transmitted via a serial communications link.

In one embodiment, the Storage Link architecture is specially adapted to support communications between multiple hosts and storage devices via a switching network, such as a storage area network. The Storage Link architecture specifies various communications techniques that can be combined to reduce the overall cost and increase the overall performance of communications. The Storage Link architecture defines a hierarchy of transport, link, and physical layers such that each layer in the hierarchy is aware of and can take advantage of characteristics of lower layers in the hierarchy. For example, the transport layer, which is responsible for handling packets, may receive signals from the link layer that indicate when an end of packet is received.

Traditional communications architectures prohibit a lower layer from being aware of the functions of a higher layer. The Storage Link architecture may provide packet ordering based on packet type, dynamic segmentation of packets, asymmetric packet ordering, packet nesting, variable-sized packet headers, and use of out-of-band symbols to transmit control information as described below in more detail. The Storage Link architecture may also specify encoding techniques to optimize transitions and to ensure DC-balance. The Storage Link architecture may also use the NULL insertion and removal techniques with plesiosynchronous clocking as described below in detail. The Storage Link architecture thus provides an improved way to access storage devices that reduces cost and increases communications speed.

In one embodiment, the Memory Link architecture also provides various communications techniques that can be combined to reduce the overall cost and increase the overall performance of communications between a host and a memory device. Like the Storage Link architecture, the Memory Link architecture uses a hierarchy of layers in which each layer can take advantage of the characteristics of a lower layer in the hierarchy. The Memory Link architecture in one embodiment provides a multiport memory device for serial communications. Each port may use a plesiosynchronous technique when receiving data and may share the same phase lock loop to control sampling of the received data. The Memory Link architecture may also use a physical layer D-C balancing technique that provides an additional driving of a communications link to offset the running disparity. The Memory Link architecture may also use an improved plesiosynchronous clock technique that inserts and removes special symbols from the received symbols to compensate for variations in clock frequencies between a transmitting and receiving device. Various combinations of the Memory Link architecture allow for the cost of designing, developing, and manufacturing memory-based systems to be reduced and the speed of memory access to be increased.

In one embodiment, the plesiosynchronous clocking technique uses the insertion and removal of symbols by the physical layer of a receiving communications node to compensate for variations in clock frequency between the transmitter and receiver. The receiver maintains a small buffer (e.g., 27 bits of the received data) at the physical layer. When the receiver detects a synchronization symbol, it initializes a start-of-symbol pointer in the buffer. As subsequent bits of data are received, the start-of-symbol pointer is adjusted to account for the variation in clock frequencies of the transmitter and the receiver. In particular, if the transmitter's clock frequency is faster ("an overrun condition"), then the pointer is progressively moved backward in the buffer (i.e., toward the last received bits). Analogously, if the transmitter's clock frequency is slower ("an underrun condition"), then the pointer is progressively moved forwards in the buffer (i.e., toward the first received bits). When the receiver detects a special symbol of a certain type (e.g., a NULL symbol) and the pointer has moved to near the beginning or end of the buffer, then the receiver removes the special symbol from the buffer to account for the overrun condition or inserts a special symbol into the buffer to account for the underrun condition. In this way, the receiver stays synchronized with the transmitter even though their clock frequencies vary. Also, asynchronous clock boundaries are avoided in the receivers.

In the following, aspects of the serial communications architecture are described using block diagrams and logic diagrams. One skilled in the art will appreciate that the serial communications architecture can be implemented using different combinations of logic circuits and/or firmware. In particular, the logic diagrams illustrate processing that may be performed in parallel using duplicate logic circuits (e.g., one for each communications link) or may be performed in serial using a single logic circuit. The particular logic designs can be tailored to meet the cost and performance objectives of the implementation of the serial communications architecture. One skilled in the art will be able to readily design logic circuits based on the following descriptions.

1. Storage Link Architecture

FIG. 1 is a block diagram illustrating components of the Storage Link architecture in one embodiment. The hosts 110 and data store devices 120 are interconnected to switching network 130 via serial communications links 140. The hosts may include computer systems that access the data store devices. The data store devices may include storage area network devices (e.g., disk drives), high-speed memory devices, and other devices for storing data. The Storage Link architecture, however, is designed to support block-oriented data store devices, such as disk drives. The switching network may include multiple switches that are interconnected so that communications paths, especially between hosts and data store devices, can be established.

Each host, data store device, and switch is a communications node that includes one or more communications interfaces 115, 125, and 135 with a transport layer, a link layer, and a physical layer. The hosts and data store devices have an upper layer that communicate to each other via transactions. When transmitting data, the upper layer provides the data for the transaction to the transport layer. The transport layer receives the data of the transaction and generates packets (i.e., packetizes the data) for transmission. The transport layer then provides each code (e.g., each byte) of the packets to the link layer for transmission to the destination. When receiving data, the transport layer receives the codes of transaction from the link layer and identifies the packets. The transport layer then combines the data of the packets of the transaction (i.e., depacketizes the data) and provides the data of the transaction to the upper layer. Each host and data store device may include an application upper layer that provides the data of a transaction to the transport layer to be transmitted to a destination and receives the data of a transaction from the transport layer that was transmitted by a source. Each packet includes a header section and a payload section. The header section identifies the source and destination and a packet type (e.g., data or command). Each switch may include a communications interface for each port of the switch. Each port may be connected to a serial communications link comprising a receive and transmit link. The switches and their interconnecting communications links form the switching network. The transport layer of a switch may not packetize and depacketize the data, rather it may direct packets received via one port to be transmitted via another port to affect the routing of the packets from the source to the destination as indicated in the header section.

The link layer encodes the codes to be transmitted via its communications link into symbols and decodes symbols received via its communications link into codes. The link layer receives codes to be transmitted from the transport layer, encodes those codes into symbols, and provides those symbols to the physical layer. The link layer also receives symbols from the physical layer, decodes those symbols into codes, and provides those codes to the transport layer. The encoding may include mapping the codes to symbols to optimize bit transitions and to ensure DC-balance. The physical layer receives the symbols from the link layer, serializes the symbols, and transmits the serialized symbols via the communications link. The physical layer receives serialized symbols via the communications link, deserializes the symbols, and provides the symbols to the link layer.

Figure 2:
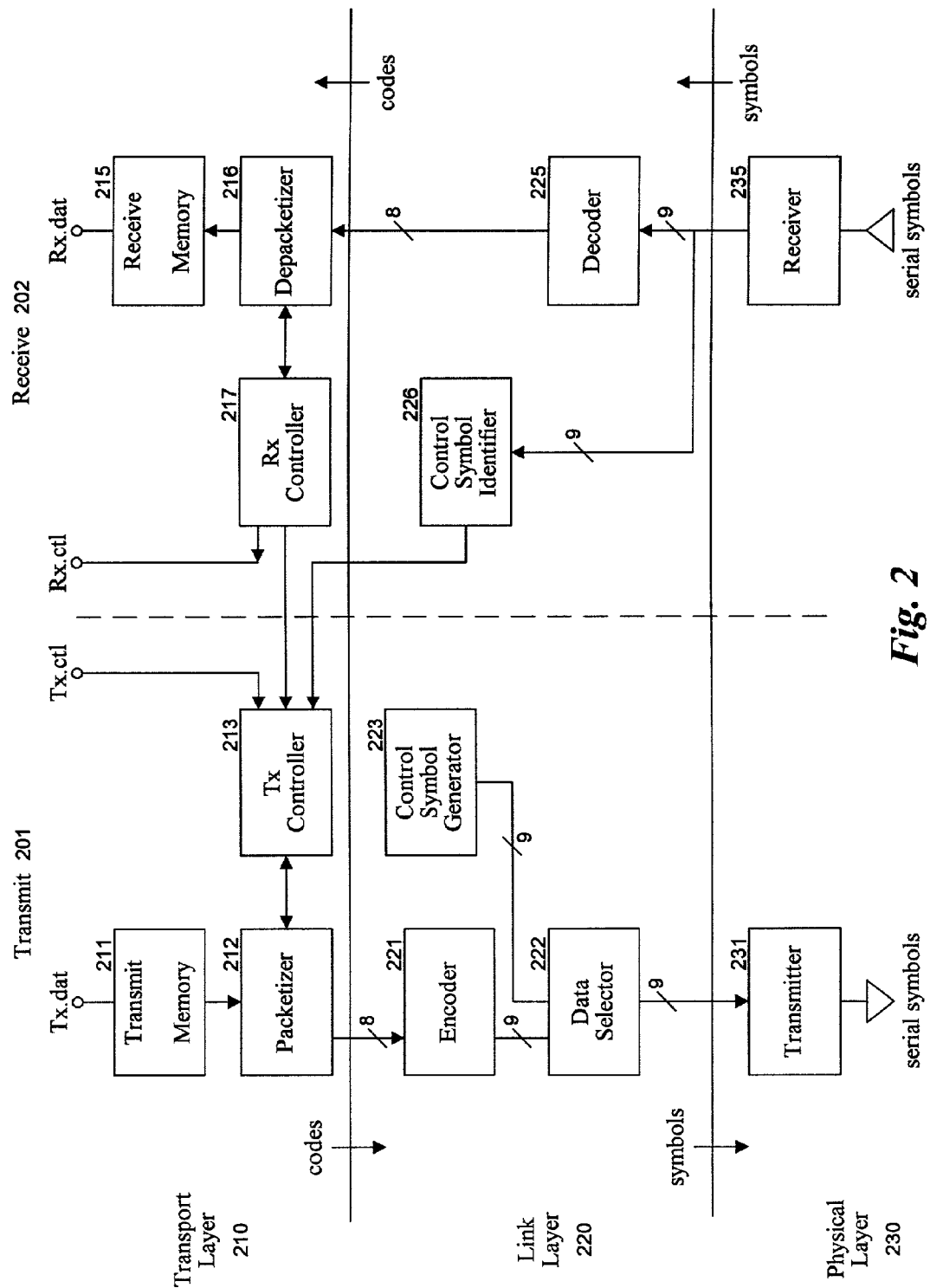
FIG. 2 is a block diagram illustrating components of the transport layer, link layer, and physical layer in one embodiment.

FIG. 2 is a block diagram illustrating components of the transport layer, link layer, and physical layer in one embodiment. Each layer includes transmit components 201 and receive components 202. The transport layer includes transmit components, such as a transmit memory 211, a packetizer 212, and a transmit controller 213, and receive components, such as a receive memory 215, a depacketizer 216, and a receive controller 217. The data of the transaction to be transmitted is stored in the transmit memory. The transmit controller controls the packetizer to retrieve data of a transaction from the transmit memory, packetize the data, and provide each code of the packets to the link layer. The receive controller controls the depacketizer to receive codes provided by the link layer, identify the packets, and store the codes as packets in the receive memory.

The link layer includes transmit components, such as an encoder 221, a data selector 222, and a control symbol generator 223, and receive components, such as a decoder 225 and a control symbol identifier 226. The link layer may be responsible for generating and transmitting and for receiving and identifying, control symbols, synchronization symbols, timing symbols, and so on, as described below in more detail. In one embodiment, however, the physical layer is responsible for detecting control symbols and synchronization symbols. The transport layer may indicate to the link layer when to transmit control symbols, and the link layer may indicate to the transport layer when control symbols are received. For example, the transmit layer may notify the link layer when the receive memory is full. In such a case, the link layer may transmit a control symbol (e.g., XOFF) notifying the other end of the communications link not to transmit any more data. When such transmitted control symbol is received, the link layer of the other end may indicate to its transport layer to stop transmitting data. The data selector selects symbols encoded from codes provided by the transport layer or symbols generated by the control symbol generator. The data selector effectively inserts control symbols and synchronization symbols into the sequence of symbols that are to be transmitted. Various possible encoding techniques for the codes are described below in detail. The data decoder receives symbols from the physical layer and decodes them into codes that are provided to the transport layer. The control symbol identifier identifies control symbols and signals the transport layer as appropriate.

The physical layer includes a transmitter 231 and receiver 235. The transmitter serializes the symbols provided by the link layer and transmits the serialized symbols onto the communications link. The receiver receives the serialized symbols via the communications link, deserializes the symbols, and provides the symbols to the link layer.

The transmit components and the receive components can transmit and receive packets in full duplex mode. That is, a packet received by the transport layer can be transmitted by the transmit components simultaneously with a packet being received by the receive components. As discussed below in detail, the encoding techniques enable transmitting of control symbols by the link layer for link control (e.g., flow control) even while packets are being transmitted in full duplex mode. That is, link control symbols can be inserted into a sequence of symbols generated from codes provided by the transport layer. Thus, a communications link can be simultaneously transmitting and receiving data symbols, and control symbols can be inserted for link control. Prior transmission techniques typically transmitted in half-duplex mode because the receiving link was reserved for transmission of control information. Thus, the Storage Link architecture has a significant bandwidth advantage because of its full-duplex mode.

Figure 3:
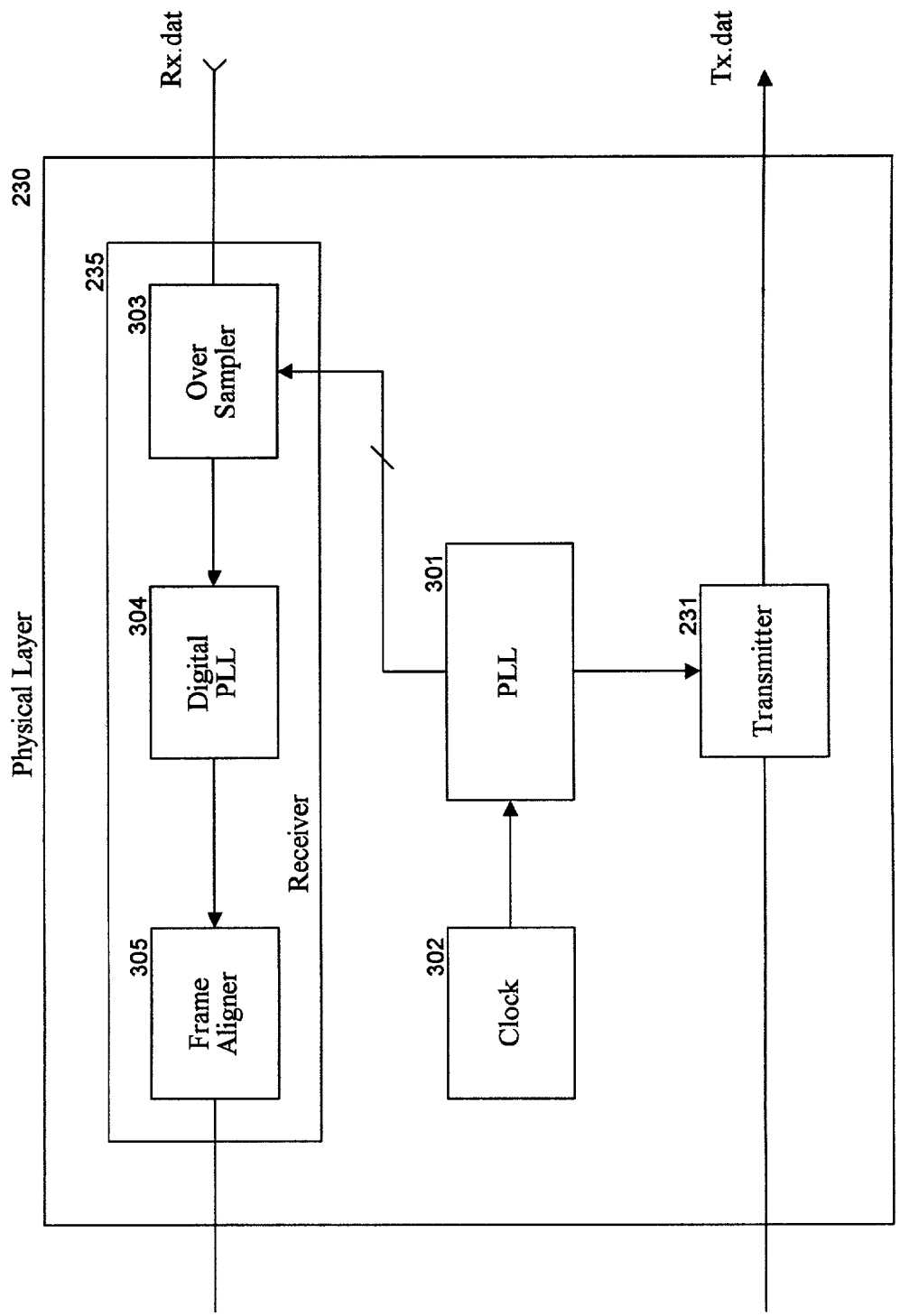
FIG. 3 is a block diagram illustrating components of the physical layer in one embodiment.

FIG. 3 is a block diagram illustrating components of the physical layer in one embodiment. The physical layer uses a plesiosynchronous timing mechanism to control the transmission and reception of the symbols. A plesiosynchronous-based physical layer is described in U.S. Pat. No. 6,229,859, entitled "System and Method for High-Speed Synchronized Data Communication," which is hereby incorporated by reference.

Improvements to the plesiosynchronous timing mechanism are described below in detail. For example, one improvement is the insertion and removal of NULL symbols, which renders the use of elastic buffers unnecessary. Another improvement is the sharing of a single phase lock loop by multiple ports, which avoids the complexity and cost of having one phase lock loop for each port. The physical layer 230 includes a transmitter 231, a receiver 235, a phase lock loop 301, and a clock 302. The phase lock loop provides a timing signal to the transmitter for serial transmission of the symbols and provides multiple timing signals with different phases to the receiver for receiving the serially transmitted symbols. One skilled in the art will appreciate that a delay lock loop, or more generally any multiphase clock generating device, can be used in place of the phase lock loop. The receiver may include an oversampler 303, a digital phase lock loop 304, and a frame aligner 305. The digital phase lock loop selects the best sample by a process known as majority voting. Majority voting counts transitions from one oversampled bit to another. In one embodiment, each bit is oversampled three times and the position with the highest number of transitions is selected. The digital phase lock loop thus identifies the bit values of the received symbols, and the frame aligner aligns the bits into symbols and provides the deserialized symbols.

Figure 4:
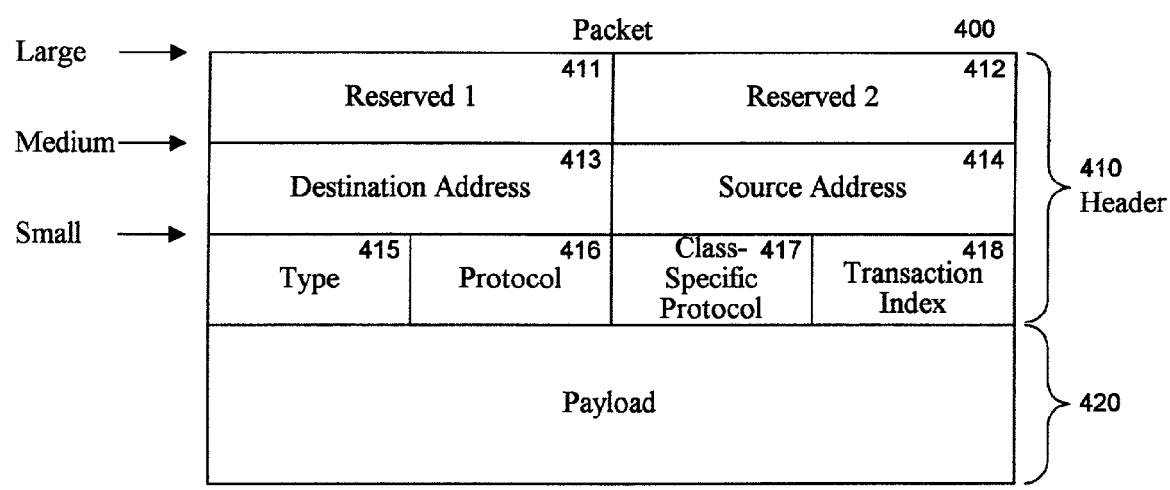
FIG. 4 is a block diagram illustrating the format of a packet in one embodiment.

FIG. 4 is a block diagram illustrating the format of a packet in one embodiment. The packet 400 includes a header section 410 and a payload section 420. The header section includes reserved fields 411 and 412 (e.g., 16 bits each), a destination address field 413 (e.g., 16 bits), a source address field 414 (e.g., 16 bits), a type field 415 (e.g., 8 bits), a protocol field 416 (e.g., 8 bits), a class specific control field ("CSF") 417 (e.g., 8 bits), and a transaction (or queue) index field 418 (e.g., 8 bits). One skilled in the art will appreciate that the actual size of the fields can vary depending on the desired performance characteristics. For example, the destination and source address fields can be limited to 4 bits when there are at most 16 hosts or data store devices. The class-specific control field contains the control field of the interface class (e.g., SCSI, ATA), which may be unused in some interface classes. The protocol field identifies the appropriate protocol for the upper layer and identifies the protocol of the storage media (e.g., SCSI, ATA, or Storage Link). The destination address field identifies the host or data store device to which the packet is to be transmitted. The source address field identifies the host or data store device that originated the transmission of the packet. In one embodiment, the reserved fields may be used in conjunction with the source address field and the destination address field to permit 32-bit addresses. The type field identifies the type of the packet. The types of packets may include a data packet, a command packet, a status packet, and a message packet. The command packet, status packet, and message packet are "control" packets. Control packets are generally much smaller than data packets. The type field further specifies the direction of the packet transmission (i.e., whether it is being transmitted from a host to a data store device, or vice versa) and specifies whether the packet is intended for the physical layer, link layer, transport layer, or application layer. For example, an application layer packet may be a command packet sent from a host device to a data store device requesting that data be retrieved from the data store device. The payload section contains type-specific information. For example, the payload section of a command packet for retrieving data from a data store device may include the starting address of the data to be retrieved and the number of bytes of data to be retrieved. The payload section of a data packet transmitted in response to receiving a command packet may contain the retrieved data in the payload section. The control field contains type-specific information that may be used to control the data store device. The transaction index field identifies a series of packets that correspond to the same transaction. For example, a transaction may be the writing of data to a data store device. A host may transmit the data to be written in multiple packets that form a single transaction. Each packet within the transaction contains the same transaction index so that the data store device can identify that the packets belong to the same transaction. Although not shown, a packet may also include a cyclic redundancy check (CRC) field after the payload section.

In various embodiments, the size of the header portion can vary based on the number of hosts and data store devices that are addressable. For example, if a single host is directly connected to a single data store device, then a small header including the type field, control field, protocol field, a class specification control field and transaction index field would be sufficient. The destination and source address fields and reserved fields would not be needed. When there are either multiple hosts or multiple data store devices, then the destination and source address fields would be included in the header. If more hosts and data store devices are addressable than can be addressed by 16 bits, then the reserved fields can be included in the header. Thus, the size of the header can vary depending on the number of possible sources and destinations. In one embodiment, the transport layer may be configurable to include a small, medium, or large header depending on the number of possible sources and destinations.

A packet that is transmitted on a serial communications link typically comprises in-band symbols with certain desirable characteristics, such as with its number of bit transitions optimized, as described below in more detail. The physical layer continually transmits symbols onto the serial communications link. If a packet is not available to be transmitted, then the link layer provides IDLE symbols to the physical layer for transmission. In one embodiment, an IDLE symbol is an out-of-band symbol, which is a symbol that does not normally appear within a packet because it may not have the same desirable characteristic as an in-band symbol (e.g., bit transitions not optimized). A receiving link layer identifies the start of a packet by a transition from receiving IDLE symbols to receiving in-band symbols. Similarly, a receiving link layer identifies the end of a packet by a transition from receiving in-band symbols to receiving IDLE symbols. In one embodiment, a IDLE symbol is actually a sequence of two out-of-band symbols for reasons described below in detail. More generally, a sequence of two out-of-band symbols is a primitive that is used to exchange control information (e.g., XON and XOFF) between link layers as described below in detail. Because control information is encoded as out-of-band symbols, the control symbols can be inserted into a sequence of in-band symbols and readily detected as control symbols when received. The control symbols can be interspersed with the transmission of symbols of a packet so that one end of a communications link can provide link control information to the other end even while packets are being transmitted in both directions (i.e., full-duplex mode)

1.1 Packet Segmentation

In one embodiment, a packet (e.g., long packets, such as data packets) may be dynamically divided or segmented into multiple packets by a communications node (e.g., a host, data store device, or switch) as the packet is being transmitted from a source to a destination. The dynamic segmentation of packets allows for the efficient transmission of large packets via a single path when the switching network is not congested and allows for the efficient transmission of segmented packets on different paths when congestion prevents use of a single path. In addition, dynamic segmentation may avoid the resending of portions of the payload when segmenting a packet.

A packet may be segmented by a communications node when, for example, the next communications node in the path indicates that it cannot receive any more symbols of a packet. The transmitting communications node may receive an XOFF signal from the receiving communications node (e.g., because of a buffer overflow at the receiving communications node) in the middle of transmitting a packet. The transmitting communications node stops transmitting the packet until an XON signal is received from the receiving communications node or unless it can start transmitting the remainder of the packet on a different communications link (i.e., through a different port). In either case, the transmitting communications node transmits a new header with the remainder of the packet, which results in the segmentation of the packet into a first packet with a first header and a second packet with a second header. The packet segmentation is performed by the transport layer based on signals provided by the link layer (e.g., in response to receiving an XOFF signal).

Figure 5:
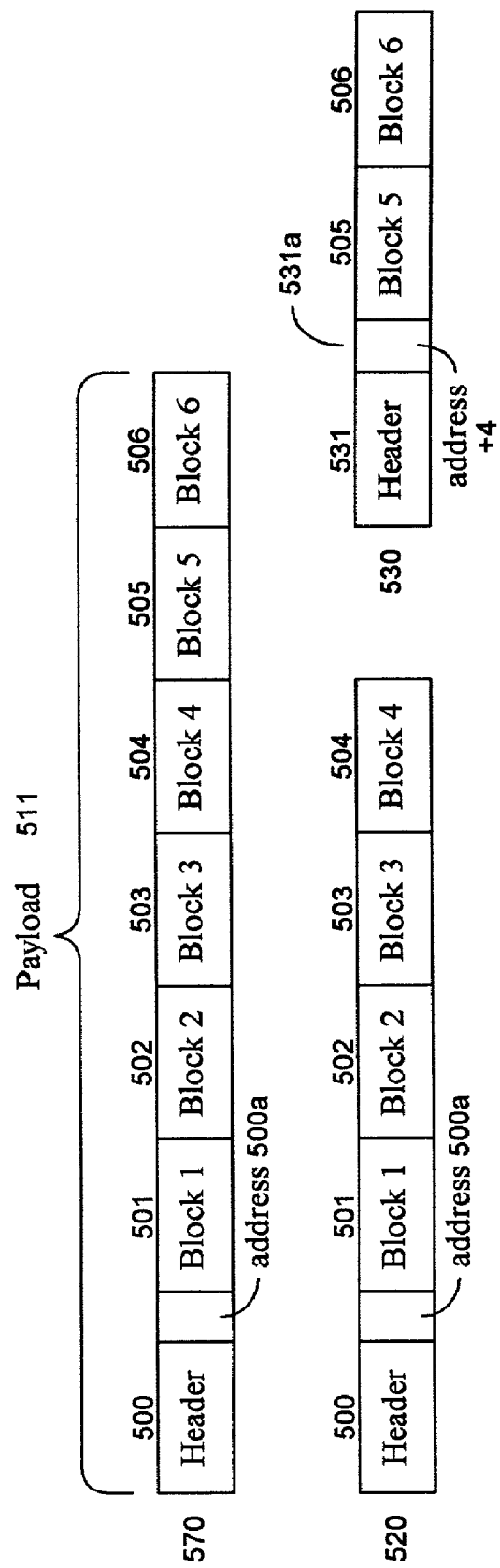
FIG. 5 is a block diagram illustrating the organization of a data packet and a segmented data packet in one embodiment.

FIG. 5 is a block diagram illustrating the organization of a data packet and a segmented data packet in one embodiment. The payload section of a data packet may include a target address and blocks of data to be stored at the target address. For example, if the data store device is a disk drive, then the target address may be a sector address of the disk drive and the blocks of data may each correspond to a sector of data. In one embodiment, the blocks have a fixed size (e.g., the sector size). Packet 510 includes a header section 500 and a payload section 511 that includes an address 500a and blocks 501-506. When a communications node is transmitting packet 510, it may transmit the header section and address 500a and blocks 501-503 of the payload section. During transmission of block 504, the transmitting communications node may receive an XOFF signal from the receiving communications node. (The receiving communications node may transmit an XOFF control primitive.) The transmitting communications node completes the transmission of block 504 and then stops transmitting the packet on that serial communications link. (The link layer then starts transmitting an IDLE symbol on the communications link.) When the transmitting communications node eventually receives an XON signal from the receiving communications node, it transmits a new header section 531 plus a payload section indicating a new address 531a and blocks 505 and 506 to complete the transmitting of the packet. The new address may be represented by an offset that is added to a start address to generate the new address. The new header may contain the same header information as the previously transmitted header, but the address (e.g., as an offset) of the payload section is updated to reflect the starting address at which the remaining blocks of the packet are to be stored. For example, if packet 510 is segmented after block 504 and the starting address for that packet is address 211, then the starting address for the packet containing blocks 505 and 506 is 215 (i.e., 211+4). Packet 510 is thus segmented into packets 520 and 530. When a packet is segmented, the transport layer may route the remaining packet on a different communications link to the destination. The use of different communications links helps to optimize the use of available bandwidth.

In addition to segmenting packets, the transport layer may merge packets that were previously segmented. For example, if packet 520 is currently stored in a receive memory of a switch awaiting transmission and packet 530 is received at the switch, then the transport layer may recognize that the packets are part of the same transaction (e.g., based on source addresses, destination address, and transaction index) and that their blocks are contiguous as indicated by their target addresses. The transport layer can merge packets 520 and 530 to form packet 510. One skilled in the art will appreciate that packets 520 and 530 can be merged regardless of the order in which they were received at the switch. Also, one skilled in the art will appreciate that if a switch is in the process of transmitting packet 520 and packet 530 is received, the packets can be merged by transmitting blocks 505 and 506 immediately after block 504. One skilled in the art will also appreciate that a transport layer can merge packets stored in a transmit memory. In this way, packets received via different ports of a switch can be merged. The merging of packets allows data of the same transaction to be more efficiently transmitted when traffic on the switch network allows.

Figure 6:
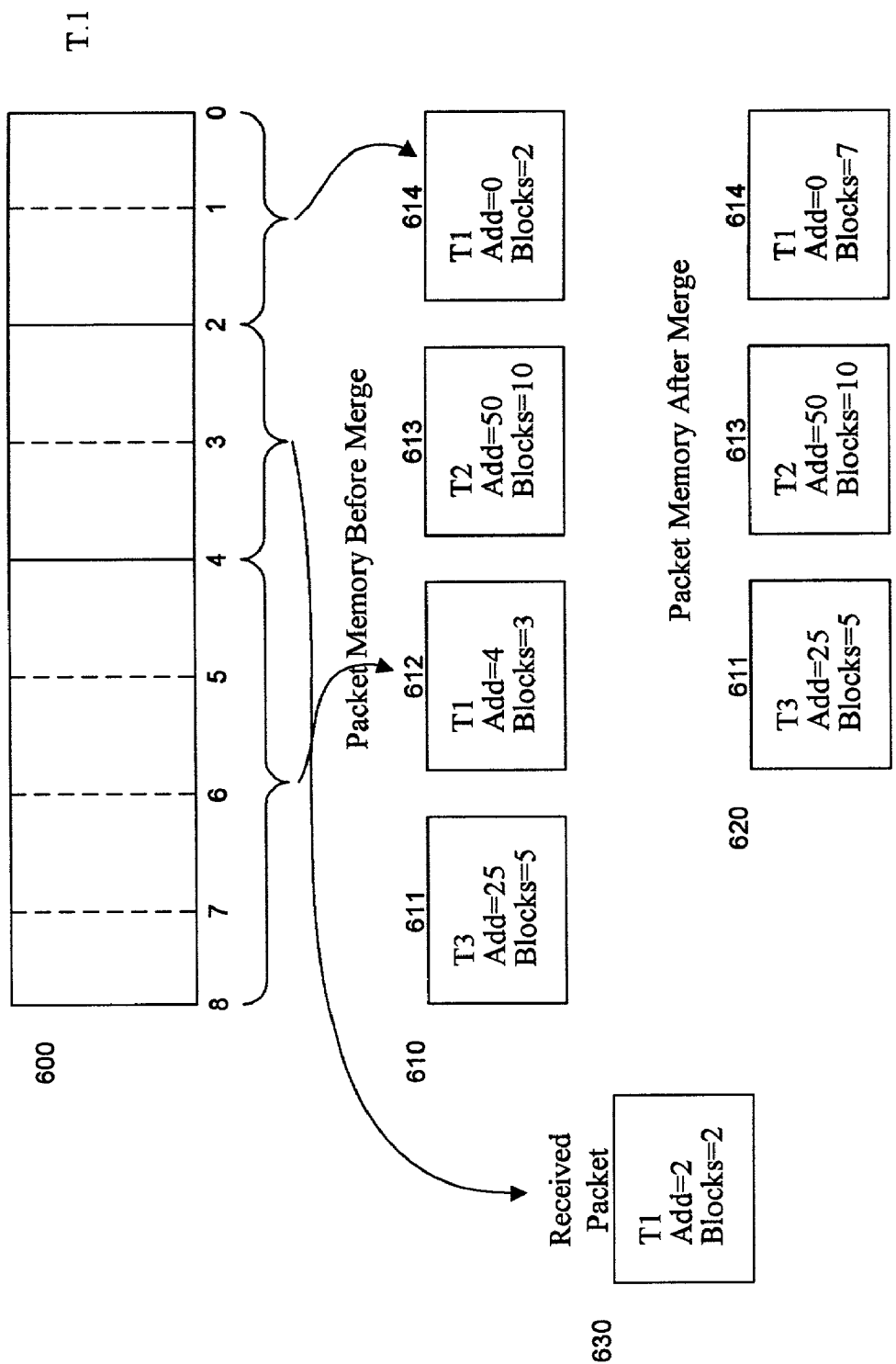
FIG. 6 is a block diagram illustrating a receive packet memory before and after merging of a received packet.

FIG. 6 is a block diagram illustrating a receive packet memory before and after merging of a received packet. Packet 600 forming transaction T1 initially contains 8 blocks. During transmission, it is segmented into packets 614, 630, and 612. Packets 614 and 612 are currently buffered at a switch which then receives packet 630. Because the switch has all three packets, they can be merged into a single packet. Before the merge, packet memory 610 contains 4 packets. Packet 611 is part of transaction T3 and contains 5 blocks of data to be stored starting at address 25. Packet 612 is part of transaction T1 and contains 3 blocks of data to be stored starting at address 4. Packet 613 is part of transaction T2 and contains 10 blocks of data to be stored starting at address 50. Packet 614 is part of transaction T1 and contains 2 blocks of data to be stored starting at address 0. Packets 612 and 614 are both part of transaction T1. These packets, however, are not contiguous packets within transaction T1 and thus cannot be merged together. Packet 630 represents a packet just received that is part of transaction T1 and contains 2 blocks to be stored starting at address 2. Packet 630 is contiguous to both packets 614 and 612. That is, packet 630 can be merged onto the end of packet 614 and packet 612 can be merged onto the end of packet 630. Packet memory 620 contains the packets after the merge. Packets 611 and 613 have been left unchanged. Packet 614, however, has been modified to add the blocks from packet 630 and from packet 612. Packet 614 indicates that is the part of transaction T1 and contains 7 blocks of data to be stored starting at address 0. Packet 612 has been deleted from the packet memory because it has been merged with packet 614, and packet 630 has not been separately added to the packet memory because it has been merged with packet 614.

Figure 7:
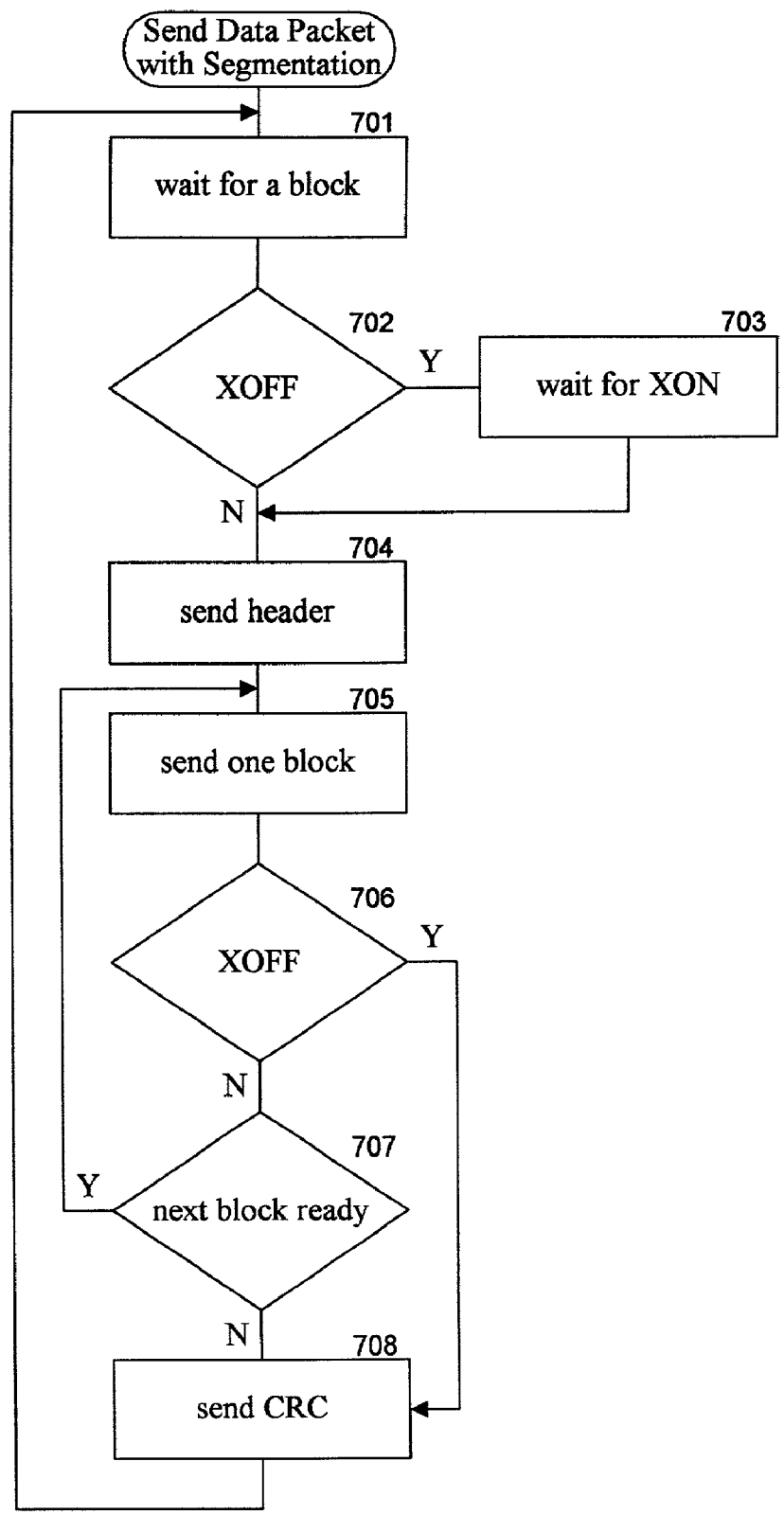
FIG. 7 is a logic diagram illustrating the segmentation of a data packet by the transport layer in one embodiment.

FIG. 7 is a logic diagram illustrating the segmentation of a data packet by the transport layer in one embodiment. In block 701, a component of the transport layer waits for a block of data. In decision block 702, if an XOFF signal has been received, then the component waits for an XON signal in block 703, else the component continues at block 704. In block 704, the component sends the header to the link layer for transmission. In blocks 705-707, the component transmits successive blocks of the packet and segments the packet when an XOFF signal is received from the link layer. In block 705, the component transmits the next block of the packet. In decision block 706, if an XOFF signal is pending as indicated by the link layer, then the component continues to segment the packet at block 708, else the component continues at block 707. In decision block 707, if the next block is ready, then the component loops to block 705 to transmit the next block, else the component segments (or ends) the packet at block 708. In block 708, the component transmits the CRC to end the packet and waits for the next block in 701.

Figure 8:
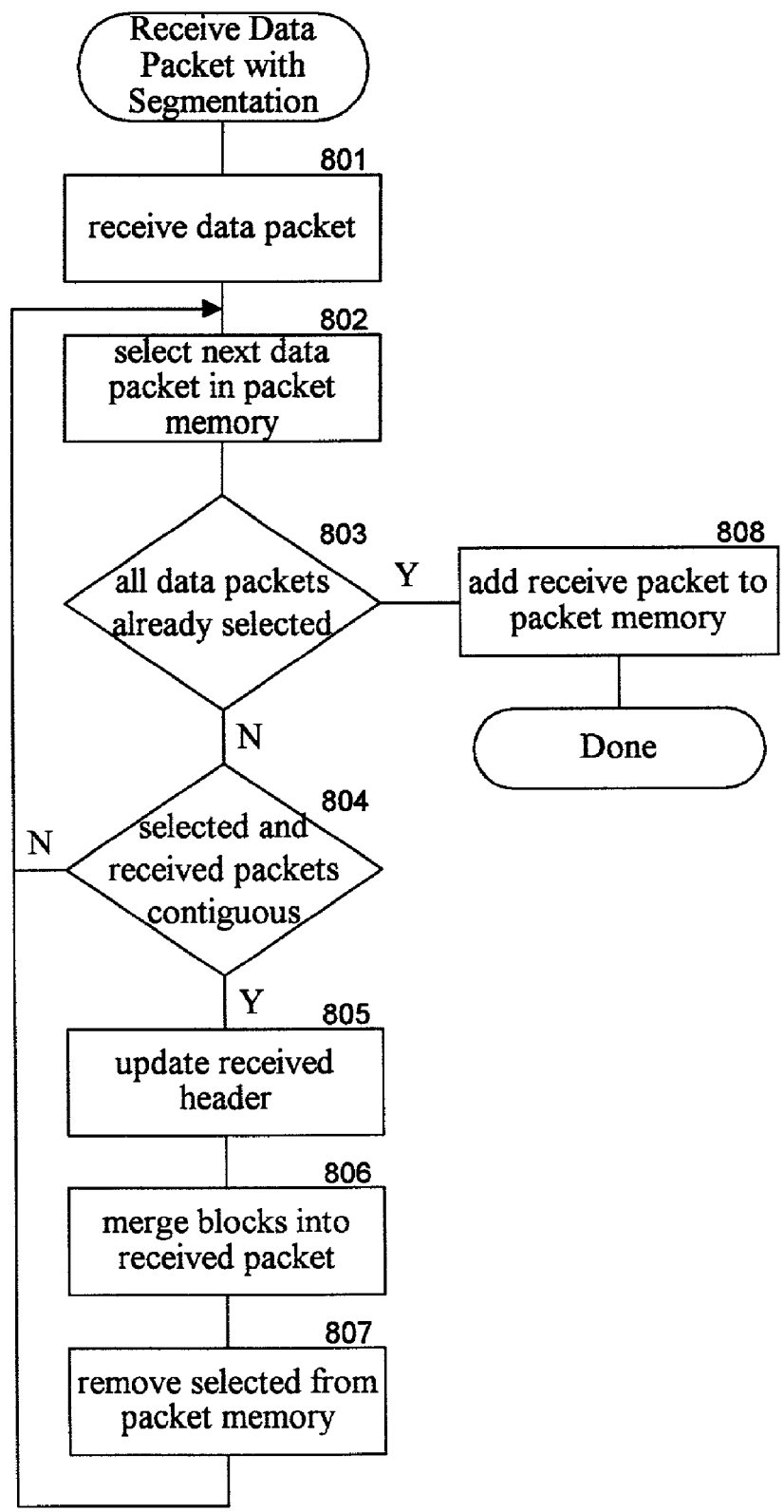
FIG. 8 is a logic diagram illustrating the merging of data packets by the transport layer in one embodiment.

FIG. 8 is a logic diagram illustrating the merging of data packets by the transport layer in one embodiment. In block 801, a component of the transport layer receives a data packet from the link layer. In blocks 802-807, the component checks to see if the data packet can be merged with a previously received data packet that is stored in the receive memory. In block 802, the component selects the next data packet in the receive memory. In decision block 803, if all the data packets of the receive memory have already been selected, then the component continues at block 808, else the component continues at block 804. In decision block 804, if the selected and received data packets are contiguous, then the component continues at block 805, else the component selects the next data packet in the receive memory. In block 806, the component adds the blocks of the selected packet to the receive packet to affect the merging of the blocks. In block 807, the component removes the selected packet from the receive memory. The component then selects the next data packet because there may be another data packet that can be merged at the beginning or end of the received data packet. In block 808, the component adds the received data packet to the receive memory and then completes.

1.2 Synchronization Primitive and Packet Type

In one embodiment, the serial communications architecture defines multiple primitives to operate as synchronization signals. A synchronization signal is typically used by the physical layer to help ensure correct alignment of symbols. A transmitting communications node periodically transmits synchronization primitives so that the receiving communications node can properly align with that synchronization primitive. When a communications node receives a synchronization primitive, it knows that the primitive is correctly aligned on a symbol boundary. The use of multiple synchronization primitives allows for encoding packet type within a synchronization primitive. In particular, the transport layer provides the packet type to the link layer. The link layer can then transmit a synchronization primitive that indicates packet type immediately before the packet itself. The receiving communications node can take the appropriate action based on the packet type encoded in the synchronization primitive without having to parse the packet header. Indeed, the packet header may not need to separately include the packet type. The use of a synchronization primitive with encoded packet type may be well adapted to use in an environment where the transmission time of a packet through the switching network may be long relative to the time needed to store the packet at the data store device. For example, the time to transmit a packet through the switching network may be longer than the time needed to store the data of the packet in a memory-based data store device. The rapid detection of packet type through a synchronization primitive, rather than through a packet header, can reduce the processing time of a switch. Also, when a synchronization primitive encodes the packet type, then the link layer, rather than the transport layer, can detect packet type, which can enhance the overall processing speed.

Figure 9A:
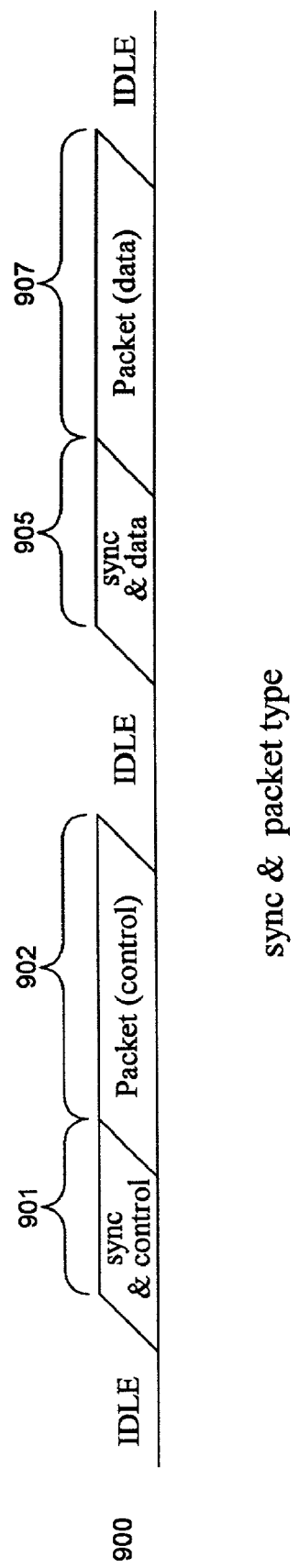
FIG. 9A is a diagram illustrating the use of a synchronization primitive encoded with the packet type in one embodiment.

FIG. 9A is a diagram illustrating the use of a synchronization primitive encoded with the packet type in one embodiment. Serial link content diagram 900 indicates the information transmitted on a serial link over a period of time. Initially, an IDLE primitive is transmitted onto the communications link. (An IDLE primitive may be a synchronization primitive that does not encode any packet type.) Immediately prior to transmitting control packet 902 (e.g., command, status, or message packets), the transport layer of the transmitting communications node signals the link layer that a control packet is to be transmitted next. The link layer then transmits a synchronization primitive 901 encoded with a packet type of control. After the packet has been transmitted, the link layer of the transmitting communications node starts transmitting the idle primitive. Immediately before the transport layer transmits data packet 904, it notifies the link layer that a data packet is to be transmitted. The link layer transmits a synchronization primitive 903 encoded with a packet type of data. After the data packet is transmitted, the link layer starts transmitting the IDLE primitive. The receiving communications node uses the synchronization primitive encoded with packet type to align its symbol boundaries and to rapidly identify the packet type. This alignment and identification can occur in the physical and link layers.

As described above, the primitives are pairs of out-of-band symbols. (In the following, a symbol is assumed to have nine bits.) In one embodiment, when the in-band symbols are transition maximized, then the symbols of the control primitives have three transitions each and the symbols of the synchronization primitives have two transitions each. When the in-band symbols are transition minimized, then the symbols of the control primitives have five transitions each and the synchronization primitives have one symbol with five transitions and another symbol with seven transitions.

Table 1 illustrates control primitives in one embodiment when the in-band symbols are transition maximized. Each control primitive comprises two symbols in which the first symbol is a polarity inversion of the second symbol. As a result, the disparity (described below) of each control primitive is 0. The control primitives such as XON, XOFF, preempt, and continue are selected from this table of control primitives.

TABLE 1

Control primitives in transition maximization mode

| 0. | 000010111-111101000 |
|---|---|
| 1. | 000011011-111100100 |
| 2. | 000011101-111100010 |
| 3. | 000100111-111011000 |

TABLE 1-continued

Control primitives in transition maximization mode

| 4. | 000110011-111001100 |
|---|---|
| 5. | 000111001-111000110 |
| 6. | 001000111-110111000 |
| 7. | 001100011-110011100 |
| 8. | 001110001-110001110 |
| 9. | 010000111-101111000 |
| 10. | 011000011-100111100 |
| 11. | 011100001-100011110 |
| 12. | 100001110-011110001 |
| 13. | 100011100-011100011 |
| 14. | 100111000-011000111 |
| 15. | 101110000-010001111 |
| 16. | 110000110-001111001 |
| 17. | 110001100-001110011 |
| 18. | 110011000-001100111 |
| 19. | 110110000-001001111 |
| 20. | 111000010-000111101 |
| 21. | 111000100-000111011 |
| 22. | 111001000-000110111 |
| 23. | 111010000-000101111 |

Table 2 illustrates control primitives in one embodiment when the in-band symbols are transition minimized.

TABLE 2

Control primitives in transition minimization mode

| 0. | 000010101-111101010 |
|---|---|
| 1. | 000100101-111011010 |
| 2. | 000101001-111010110 |
| 3. | 000101011-111010100 |
| 4. | 000101101-111010010 |
| 5. | 000110101-111001010 |
| 6. | 001000101-110111010 |
| 7. | 001001001-110110110 |
| 8. | 001001011-110110100 |
| 9. | 001001101-110110010 |
| 10. | 001010001-110101110 |
| 11. | 001010011-110101100 |
| 12. | 001011001-110100110 |
| 13. | 001100101-110011010 |
| 14. | 001101001-110010110 |
| 15. | 010000101-101111010 |
| 16. | 010001001-101110110 |
| 17. | 010001011-101110100 |
| 18. | 010001101-101110010 |
| 19. | 010010001-101101110 |
| 20. | 010010011-101101100 |
| 21. | 010011001-101100110 |
| 22. | 010100001-101011110 |
| 23. | 010100011-101011100 |
| 24. | 010110001-101001110 |
| 25. | 011000101-100111010 |
| 26. | 011001001-100110110 |
| 27. | 011010001-100101110 |
| 28. | 100001010-011110101 |
| 29. | 100010010-011101101 |
| 30. | 100010100-011101011 |
| 31. | 100010110-011101001 |
| 32. | 100011010-011100101 |
| 33. | 100100010-011011101 |
| 34. | 100100100-011011011 |
| 35. | 100100110-011011001 |
| 36. | 100101000-011010111 |
| 37. | 100101100-011010011 |
| 38. | 100110010-011001101 |
| 39. | 100110100-011001011 |
| 40. | 101000010-010111101 |
| 41. | 101000100-010111011 |
| 42. | 101000110-010111001 |
| 43. | 101001000-010110111 |
| 44. | 101001100-010110011 |
| 45. | 101010000-010101111 |
| 46. | 101011000-010100111 |

TABLE 2-continued

Control primitives in transition minimization mode

| | |
|---|---|
| 47. | 101100010-010011101 |
| 48. | 101100100-010011011 |
| 49. | 101101000-010010111 |
| 50. | 110001010-001110101 |
| 51. | 110010010-001101101 |
| 52. | 110010100-001101011 |
| 53. | 110100010-001011101 |
| 54. | 110100100-001011011 |
| 55. | 110101000-001010111 |

The synchronization primitives are distinct from the control primitives. The synchronization primitives are selected to have the characteristic that when two synchronization primitives are transmitted sequentially the receiving device can unambiguously identify the synchronization primitives regardless of what is transmitted before or after the synchronization primitives. The synchronization primitives have a unique number of transitions that is not found in any control primitive or in-band symbol. In one embodiment, the synchronization primitive can be detected by looking for a sequence of symbols with that number of transitions. In one embodiment, the synchronization primitives are selected to start with a falling edge (i.e., "10"), a rising edge (i.e., "01"), a high level (i.e., "11"), or a low level (i.e., "00"). The selection of the start of the synchronization primitives is referred to as the "synchronization detection mode." Table 3 contains synchronization primitives in transition maximization mode that start with a falling edge and a rising edge. Each symbol in Table 3 contains two transitions resulting in synchronization primitives with four transitions. Table 4 contains synchronization primitives in transition minimization mode that start with a low level and a high level. Each synchronization primitive in Table 4 has 13 transitions. The high-level and low-level synchronization primitives have five transition in one symbol, seven transitions in the other symbol, and one transition from their first to second symbol.

TABLE 3

| | Falling Edge | Rising Edge |
|---|---|---|
| 0 | 100000001-100111111 | 011000000-011111110 |
| 1 | 100000011-100011111 | 011100000-011111100 |
| 2 | 100000111-100001111 | 011110000-011111000 |
| 3 | 100001111-100000111 | 011111000-011110000 |
| 4 | 100011111-100000011 | 011111100-011100000 |
| 5 | 100111111-100000001 | 011111110-011000000 |

TABLE 4

| | High Level | Low Level |
|---|---|---|
| 0 | 110101000-110101010 | 001010101-001010111 |
| 1 | 110100010-110101010 | 001010101-001011101 |
| 2 | 110001010-110101010 | 001010101-001110101 |
| 3 | 110100100-110101010 | 001010101-001011011 |
| 4 | 110010100-110101010 | 001010101-001101011 |
| 5 | 110101010-110101000 | 001010111-001010101 |
| 6 | 110101010-110100010 | 001011101-001010101 |
| 7 | 110101010-110001010 | 001110101-001010101 |
| 8 | 110101010-110100100 | 001011011-001010101 |
| 9 | 110101010-110010100 | 001101011-001010101 |

Table 5 lists the transition distribution of the low and high polarity symbols of the synchronization primitives.

TABLE 5

| Sync Detect Mode | Transition Distribution in Low Polarity | Transition Distribution in High Polarity | Total # of Transitions in a Sync Primitive |
|---|---|---|---|
| Falling edge ("10") | one "10" and one "01" | one "10" and one "01" | 4 |
| Rising edge ("01") | one "01" and one "10" | one "01" and one "10" | 4 |
| High level ("11") | one "11" and two "00" | one "11" and no "00" | 13 |
| Low level ("00") | one "00" and no "11" | one "00" and two "11" | 13 |

In one embodiment, the synchronization primitives are detected by buffering three symbols (e.g., 27 bits). The synchronization primitives are selected so that any time the buffer has exactly three of the synchronization detection mode bits (e.g., "10" for falling edge) that are each 9 bits apart then the bits are at the beginning of a synchronization symbol. The bit buffer contains 27 bits, A[8:0], B[8:0], and C[8:0], in which bit A[8] was received first and bit C[0] was received last. In this example, the content of bits A[6]: B[7] represent synchronization symbol "100000001" and B[6]: C[7] represent synchronization symbol "100111111." The starting points of the synchronization symbols ("synchronization markers") are A[6], B[6], and C[6].

Figure 9C:
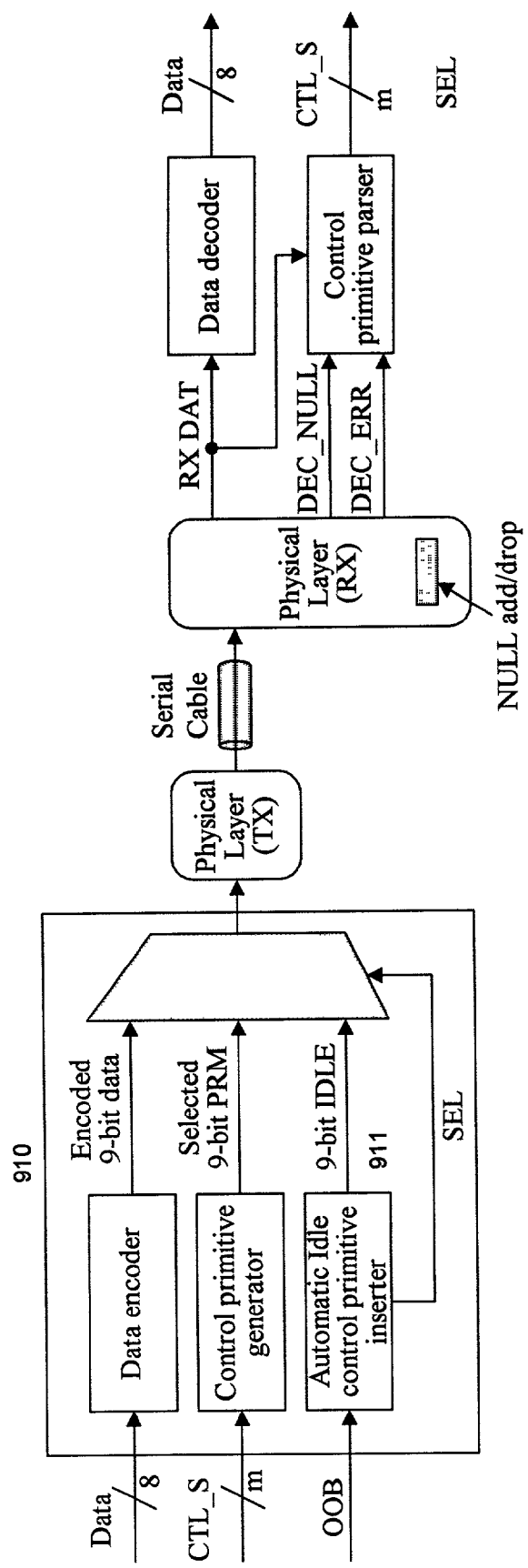
FIG. 9C is a block diagram illustrating a component of a link layer for inserting a synchronization symbol into a stream of symbols.

FIG. 9C is a block diagram illustrating a component of a link layer for inserting a synchronization symbol into a stream of symbols. The link layer 910 is provided with the bits of the code ("Data") to be transmitted and with an indication of a control primitive ("CTL-S") to transmit. The idle inserter 910 of the link layer automatically inserts an IDLE primitive (e.g., synchronization primitive) to ensure that not too may data symbols have been sent without sending a synchronization primitive. In one embodiment, the transmitter may send an IDLE primitive after every block of a packet. If packets are short, the inter-packet gap ("IPG") is sufficient for clock compensation. That is, the receiver will receive synchronization primitives often enough to maintain proper synchronization. If a packet is long, however, the link layer can periodically insert a synchronization primitive to ensure that the receiver maintains proper synchronization. The multiplexer of the link layer selects the appropriate symbol to send to the physical layer.

1.3 Transmission Order Based on Packet Type

In one embodiment, a communications node transmits packets of certain types before packets of other types regardless of the order in which the packets are received or generated by the communications node. For example, a switch may transmit control packets (e.g., command packets, status packets, and message packets) before transmitting data packets. The transmitting of control packets before data packets may help ensure that the control packets are not unnecessarily delayed by data packets, which may have a tendency to be quite large. For example, a command packet requesting a read from a data store device may be transmitted before a data packet even through the control packet was received after the data packet. The data store device can thus start processing the read request without having to wait until the data packet is transmitted. A communications node may store control packets and data packets in separate areas of the packet memory and only select packets from the data packet area when the control packet area is empty. Alternatively, the communications node may use various algorithms to select control or data packets to be transmitted. For example, the algorithm may select a data packet that has been in the packet memory for certain amount of time even though there may be a control packet in the control area. In this way, a sequence of many control packets will not delay the data packet more than that certain amount of time. One skilled in the art will appreciate that there may be multiple packet types with different transmission orders. For example, a status packet might be transmitted before a command packet, and a command packet might be transmitted before a data packet.

Figure 10:
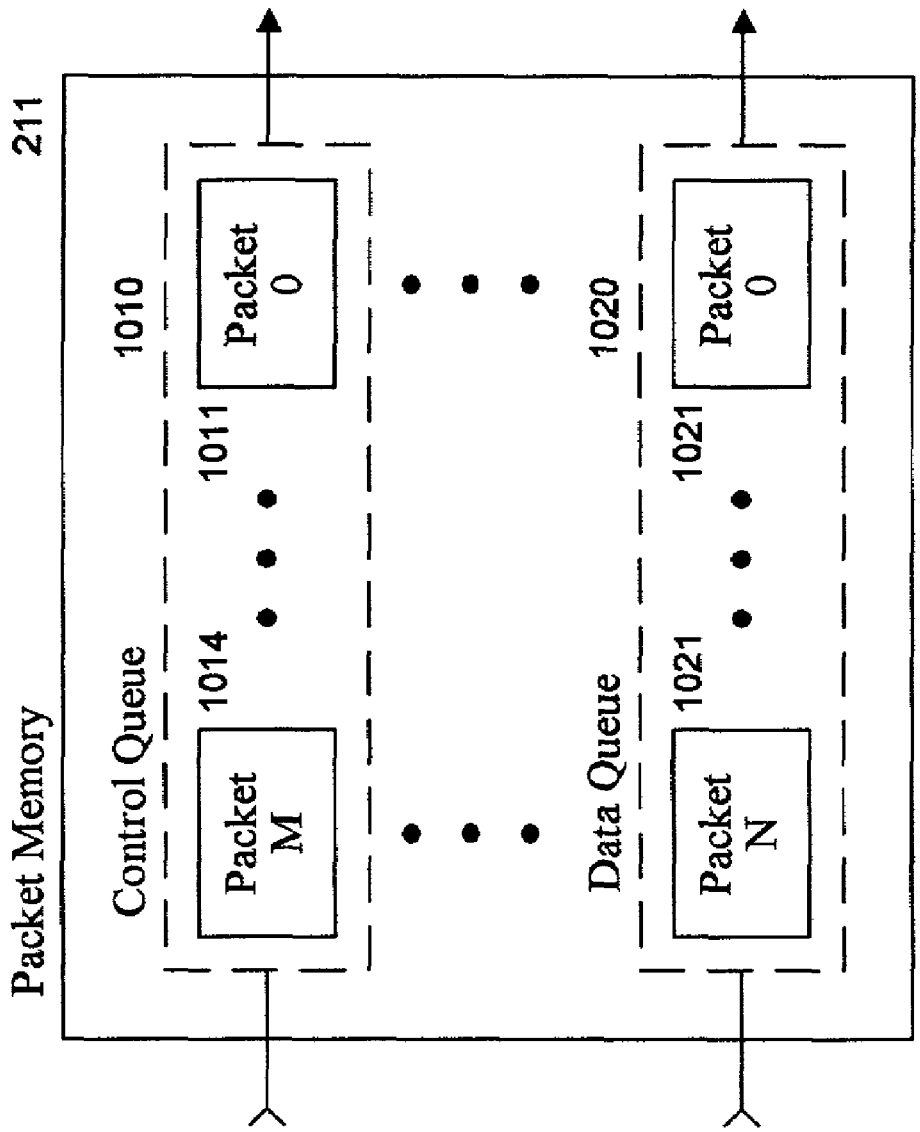
FIG. 10 is a block diagram illustrating an organization of a packet memory in one embodiment.

FIG. 10 is a block diagram illustrating an organization of a packet memory in one embodiment. The transmit packet memory 211 may include control queue 1010 and data queue 1020. The control queue contains the control packets 1011, and the data queue contains the data packets 1021. Packets to be transmitted are stored either in the control queue or the data queue based on packet type (which may be encoded in a synchronization primitive). When a transmitting communications node is ready to transmit the next packet, it retrieves the next packet from the control queue. If the control queue is empty, then the transmitting communications node retrieves the next packet from the data queue.

Figure 11:
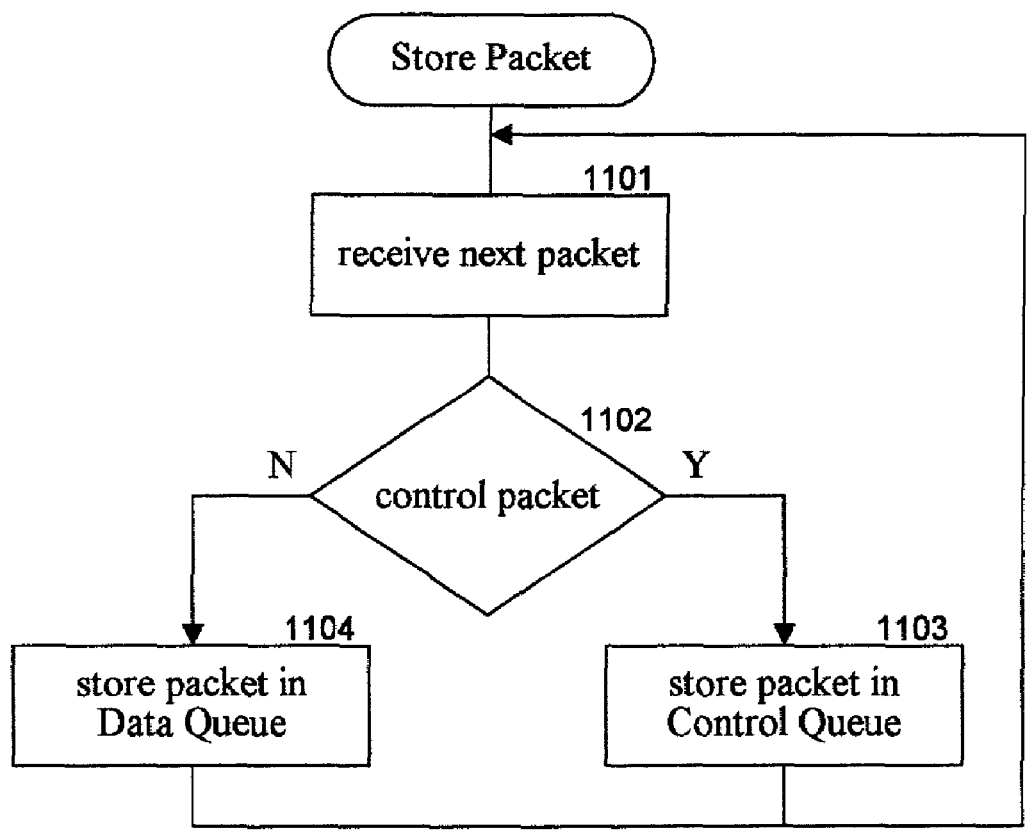
FIG. 11 is a logic diagram illustrating the process of storing packets in a transmit packet memory in one embodiment.

FIG. 11 is a logic diagram illustrating a process of storing packets in a transmit memory in one embodiment. Similar logic can be used to store packets in the receive memory of a communications node. In block 1101, a component of the transport layer receives the next packet from an upper layer. In decision block 1102, if the received packet is a control packet, then the component continues at block 1103, else the component continues at block 1104. The component may determine the type of the packet either from the type field of the packet header or, when the packet is received from another communications node, from a synchronization primitive encoded with the packet type. When the link layer detects a synchronization primitive designating packet type, it signals the transport layer so that the type of packet can be used when the packet is stored in the receive memory, retrieved from the receive memory, stored in the transmit memory, and retrieved from the transmit memory. In block 1103, the component stores the packet in the control queue. In block 1104, the component stores the packet in the data queue. The component then retrieves the next packet.

Figure 12:
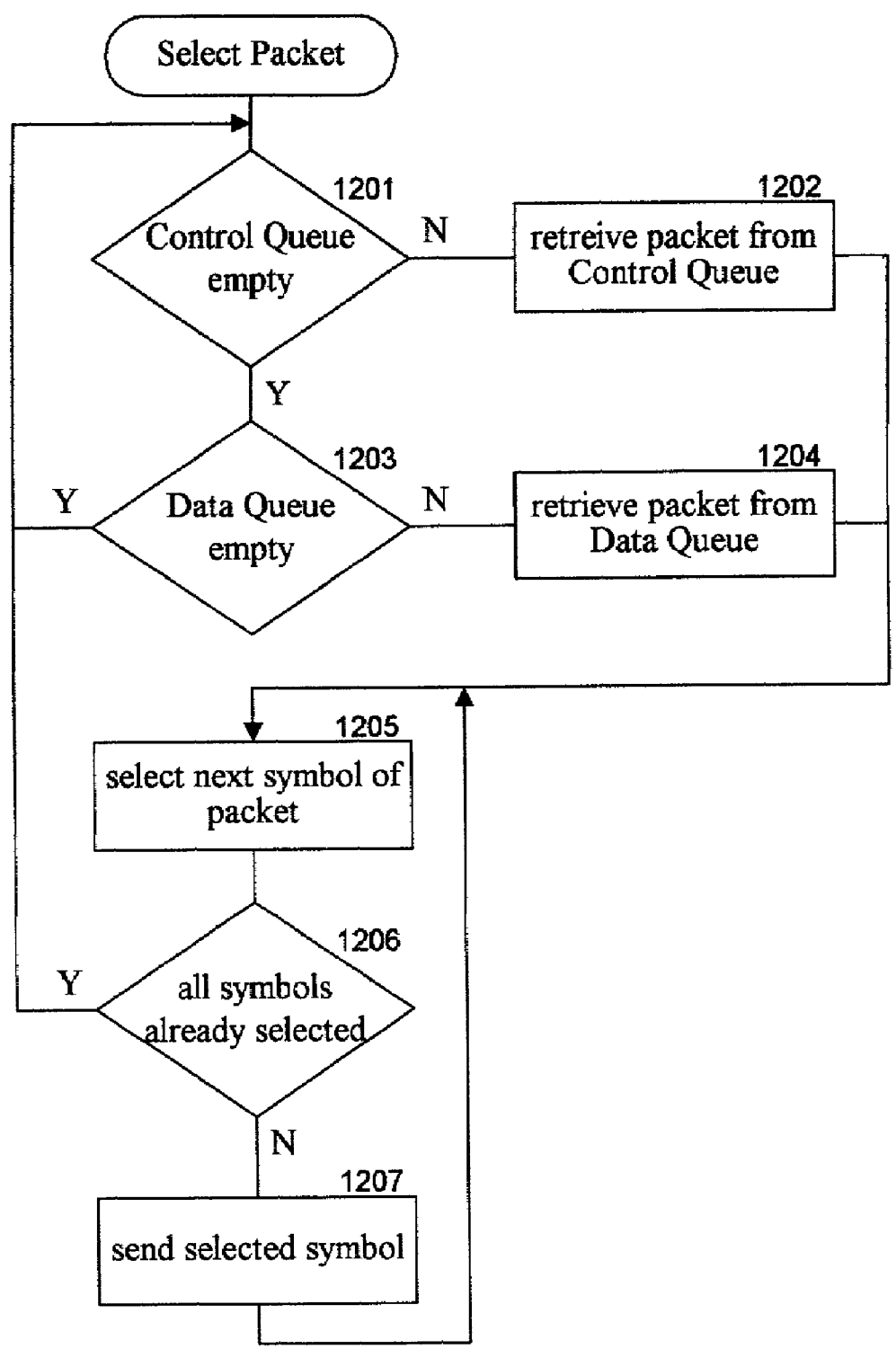
FIG. 12 is a logic diagram illustrating the transport layer processing of packets stored in the packet memory in one embodiment.

FIG. 12 is a logic diagram illustrating the transport layer processing of packets stored in the packet memory in one embodiment. In decision block 1201, if the control queue is empty, then the component continues to block 1203, else the component retrieves a control packet from the control queue in block 1202 and continues at block 1205. In decision block 1203, if the data queue is empty, then the component again checks for a packet in the control queue, else the component retrieves a packet from the data queue in block 1204 and continues at block 1205. In blocks 1205-1207, the component selects the codes of the retrieved packet. In block 1205, the component selects the next code of the retrieved packet. In decision block 1206, if all codes have already been selected, then the component continues at block 1201 to check for the next packet, else the component continues at block 1207. In block 1207, the component provides the selected code to the link layer and then continues at block 1205 to select the next code of the packet.

1.4 Packet Preemption

In one embodiment, a communications node may preempt or interrupt the transmission of a packet when a packet with a higher priority is to be transmitted on the same communications link. Packet preemption helps ensure that data store devices receive control packets as soon as possible without being slowed by network congestion as a result of data packets. In particular, the transmission of a data packet, which may be large, may be preempted so that a control packet, which is typically small, may be transmitted. When a data packet is to be preempted, the transport layer of the communications node stops providing the codes of the data packet to the link layer, signals the link layer to transmit a preempt primitive, and then starts providing the code of the control packet to the link layer for transmission as a preempting packet. When the preempting packet has been completely transmitted, the transport layer of the communications node signals the link layer to transmit a continue primitive and then resumes providing the remainder of the codes of the data packet to the link layer. The link layer of the receiving communications node detects the preempt primitive while it is receiving the codes of the data packet and signals its transport layer. The transport layer then starts storing the subsequent codes as a control packet. When the link layer detects the continue primitive, it signals the transport layer, which continues receiving the preempted data packet. The preempt and continue primitives, which are control primitives, serve to delimit transmission of a preempting packet. One skilled in the art will appreciate that packet preemption could be nested to any level. For example, a status packet might preempt a command packet that already preempted a data packet.

Figure 13:
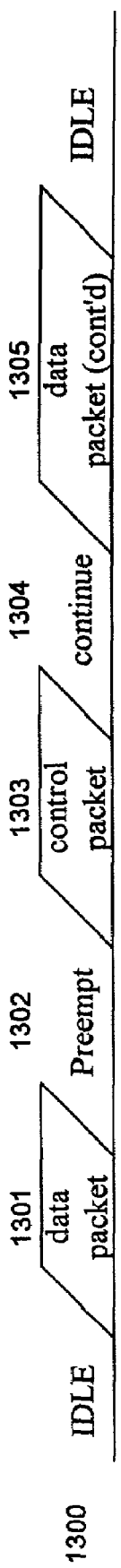
FIG. 13 is a diagram illustrating the preemption of a packet in one embodiment.

FIG. 13 is a diagram illustrating the preemption of a packet in one embodiment. Serial link content diagram 1300 illustrates a data packet that is preempted by a control packet. Initially, the transmitting communications node transmits the first portion of data packet 1301. When the packet is to be preempted, the communications node then transmits the preempt primitive 1302. After transmitting the preempt primitive, the transmitting communications node transmits the preempting control packet 1303. After the control packet is transmitted, the communications node transmits the continue primitive 1304, and then resumes transmitting the remainder of the preempted data packet 1305.

Figure 14:
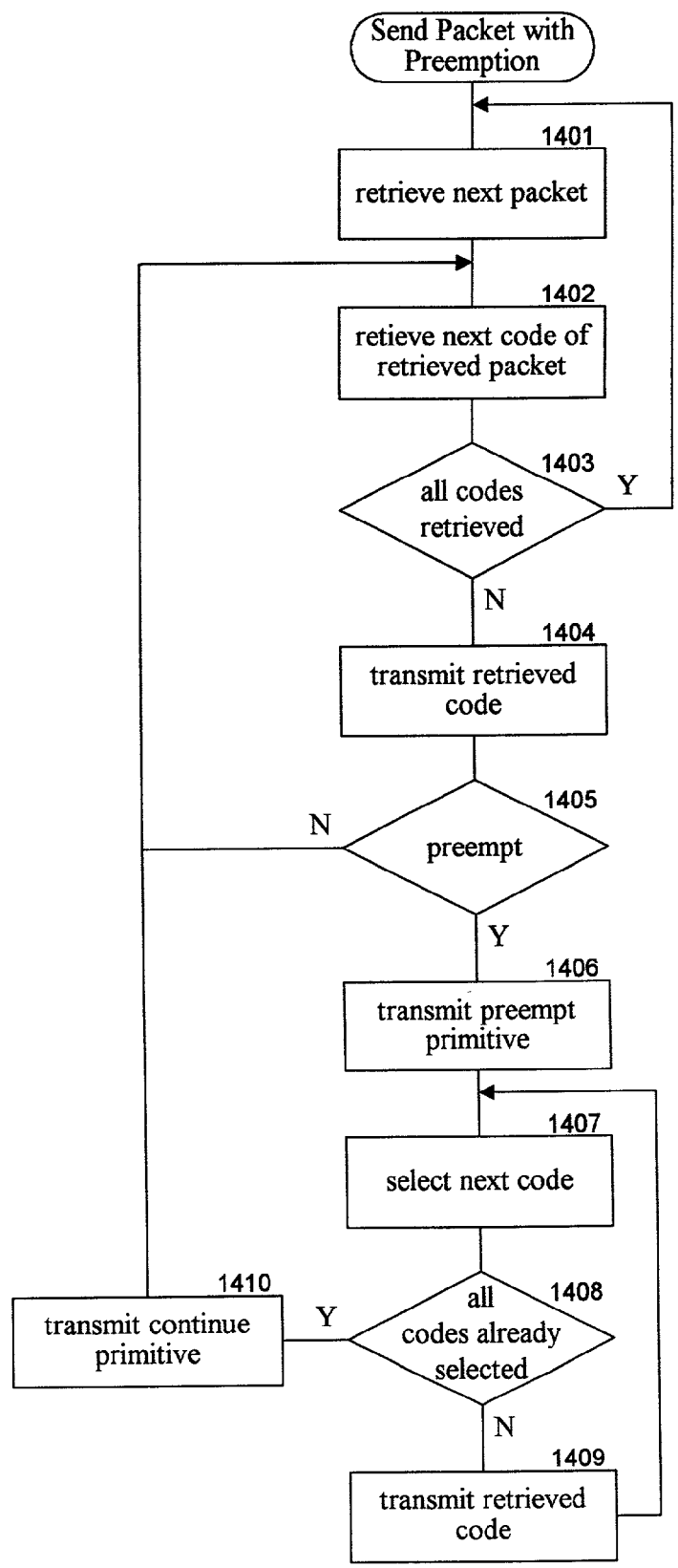
FIG. 14 is a logic diagram illustrating the processing of packet preemption by a transmitting communications node in one embodiment.

FIG. 14 is a logic diagram illustrating the processing of packet preemption by a transmitting communications node in one embodiment. In block 1401, the component of the transport layer retrieves the next packet from the transmit memory. In block 1402, the component retrieves the next code of the retrieved packet. In decision block 1403, if all the codes have already been retrieved from the packet, then the component continues at block 1401 to retrieve the next packet, else the component continues at block 1404. In block 1404, the component provides the retrieved code to the link layer. In decision block 1405, if a preempt signal has been raised (e.g., as a result of being provided a control packet by an upper layer), then the component continues at block 1406, else the component continues at block 1402 to retrieve the next code of the packet. In block 1406, the component notifies the link layer to transmit a preempt primitive. In blocks 1407-1409, the component provides each code of the preempting packet to the link layer. In block 1407, the component selects the next code of the preempting packet. In decision block 1408, if all the codes of the preempting packet have already been selected, then the component continues at block 1410, else the component continues at block 1409. In block 1409, the component provides the selected code to the link layer and then continues at block 1407 to select the next code of the preempting packet. In block 1410, the component signals the link layer to transmit a continue primitive and then continues processing the preempted packet at block 1402.

Figure 15:
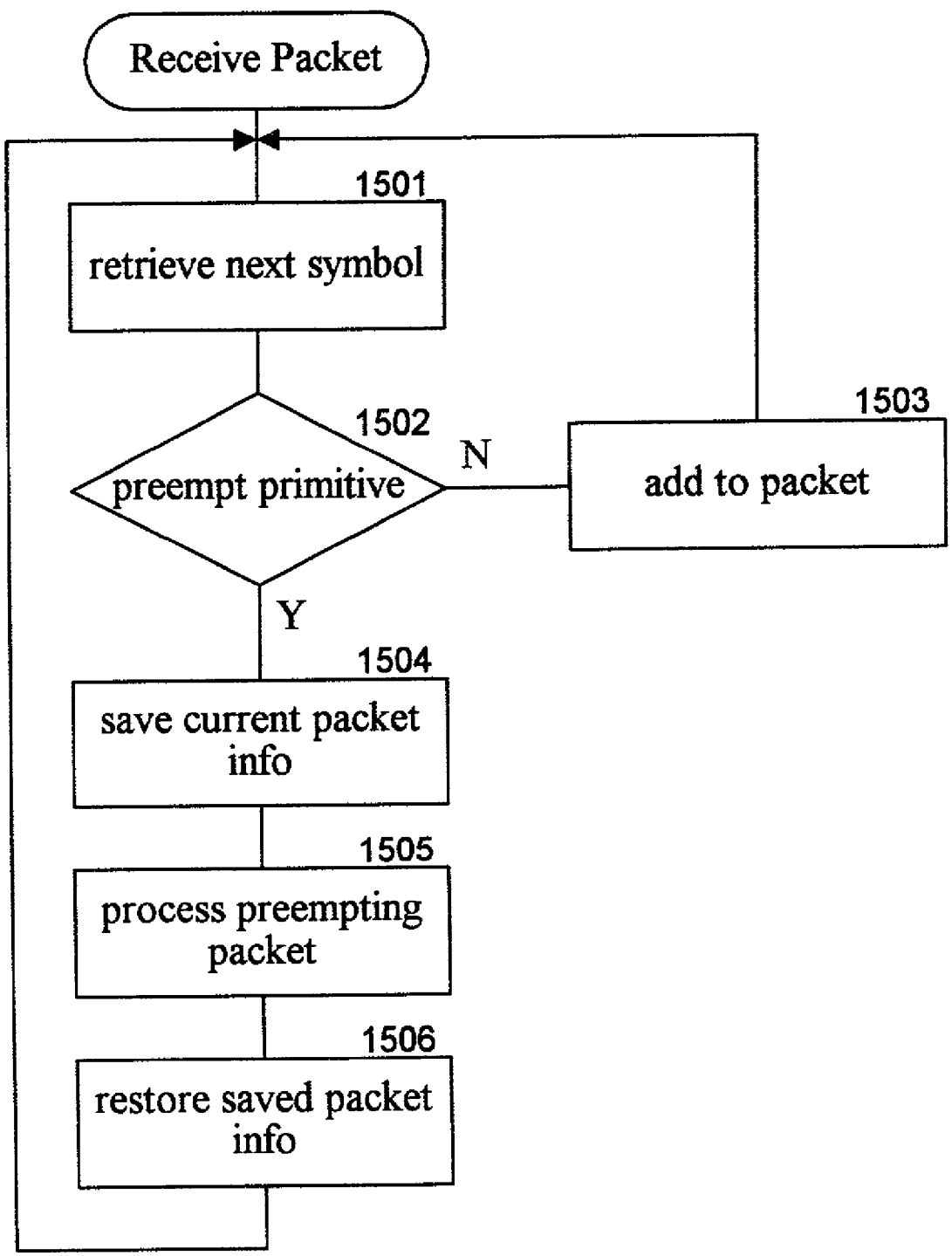
FIG. 15 is a logic diagram illustrating the processing of packet preemption by a receiving communications node in one embodiment.

FIG. 15 is a logic diagram illustrating processing of packet preemption by a receiving communications node in one embodiment. In block 1501, the component of the transport layer retrieves the next code from the link layer. In decision block 1502, if the link layer signals that a preempt primitive has been received, then the component continues at block 1504, else the component continues at block 1503. In block 1503, the component adds the code to the current packet and retrieves the next code in block 1501. In block 1504, the component saves current packet information so that it can continue storing codes in the packet after the preemption is complete. In block 1505, the component processes the preempting packet. The processing includes receiving each code and storing the codes in a preempting packet until the link layer indicates that it received a continue primitive. In block 1505, the component restores the saved packet information so that subsequent received codes can be stored in the preempted packet. The component then selects the next code of the preempted packet in block 1501.

1.5 Asymmetric Packet Ordering

In one embodiment, the serial communications architecture may guarantee that packets (in particular packets of the same transaction) transmitted from a host to a data store device are received at the data store device in the order in which they were transmitted from the host. In contrast, the serial communications architecture might not guarantee that packets transmitted from a data store device to a host are received at the host in the same order that they were transmitted from the data store device. The guarantee of order in one direction, but not in the other direction, is referred to as asymmetric packet ordering. Because the packets are received at the data store device in order, the data store device does not need the hardware or software necessary to reorder packets that are received out-of-order. As a result, the overall cost of the data store device can be reduced. The guarantee of order may be provided by requiring that all packets of the same transaction transmitted from a host to a data store device travel on the same path. In contrast, packets of the same transaction transmitted from a data store device to a host may each travel on different paths. Because the packets transmitted from a host to a data store device travel along the same path, the actual time to transmit the packets may take longer than if alternate paths could be used. For example, one communications link in the path may become congested with no alternative but to wait for the congestion to end, whereas if an alternate path was used, the remaining packets could be routed to avoid the congestion; thus, the packets would arrive sooner, but possibly out-of-order. In one embodiment, the serial communications architecture may only guarantee the order of packets transmitted from a host to a data store device within each transaction. Packets within a transaction have a sequential order. The guarantee of order within a transaction may be provided by requiring that all the packets of each transaction to be transmitted from a host to a data store device along the same path. The packets of different transactions can, however, be transmitted along different paths. In this way, a packet within a later transmitted transaction may arrive at the data store device before a packet of an earlier transmitted transaction. A host may be a computer system running application programs, and the data store device may be a disk drive. In such an environment, the speed at which data is transmitted to a disk drive may not be as important as the speed at which the data is transmitted to the computer system. In particular, when an application program writes data to a disk drive, the data is normally cached by the computer system before transmission to the disk drive so that the application program can continue its processing without having to suspend its execution. In contrast, when an application program reads data from a disk drive, the application normally suspends its execution until the data is received. Thus, the speed of transmitting data from the disk drive is more important than the speed of transmitting data to a disk drive because it can reduce the time a program is suspended. The asymmetric packet ordering takes advantage of this variation in the need for speed.

Figure 16:
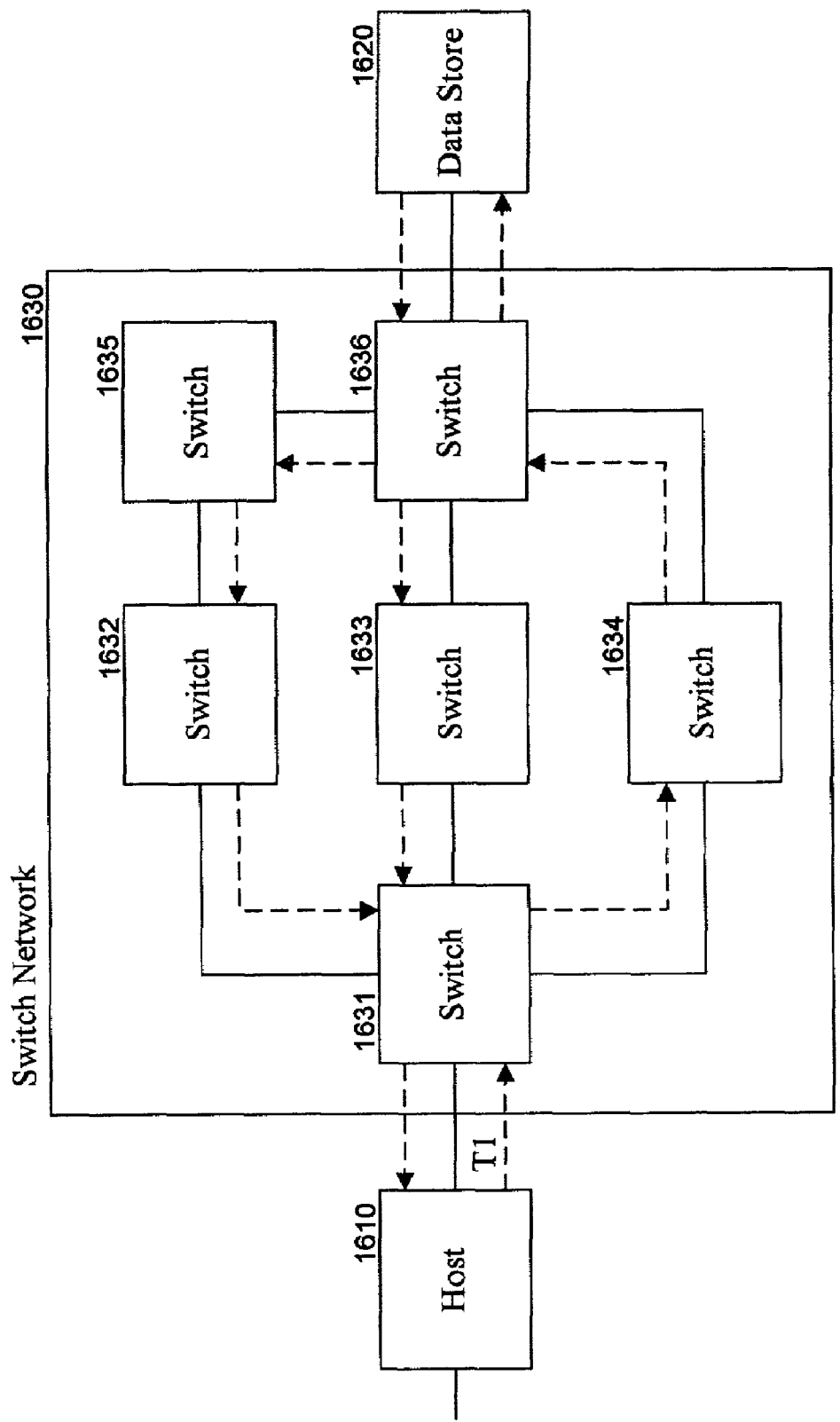
FIG. 16 is a block diagram illustrating asymmetric packet ordering in one embodiment.

FIG. 16 is a block diagram illustrating asymmetric packet ordering in one embodiment. Packets of the same transaction, transmitted from a host 1610 to a data store device 1620 all travel along the same path: switch 1631, switch 1634, and switch 1636. Since the data packets are processed in a first-in-first-out manner by each switch, packet ordering is preserved in transit. In contrast, packets of the same transaction transmitted from a data store device 1620 to a host 1610 may travel along two different paths: (1) a path including switch 1636, switch 1633, and switch 1631 and (2) path including switch 1636, switch 1635, switch 1632, and switch 1631. Packets traveling on different paths may arrive out-of-order at the host.

Figure 17:
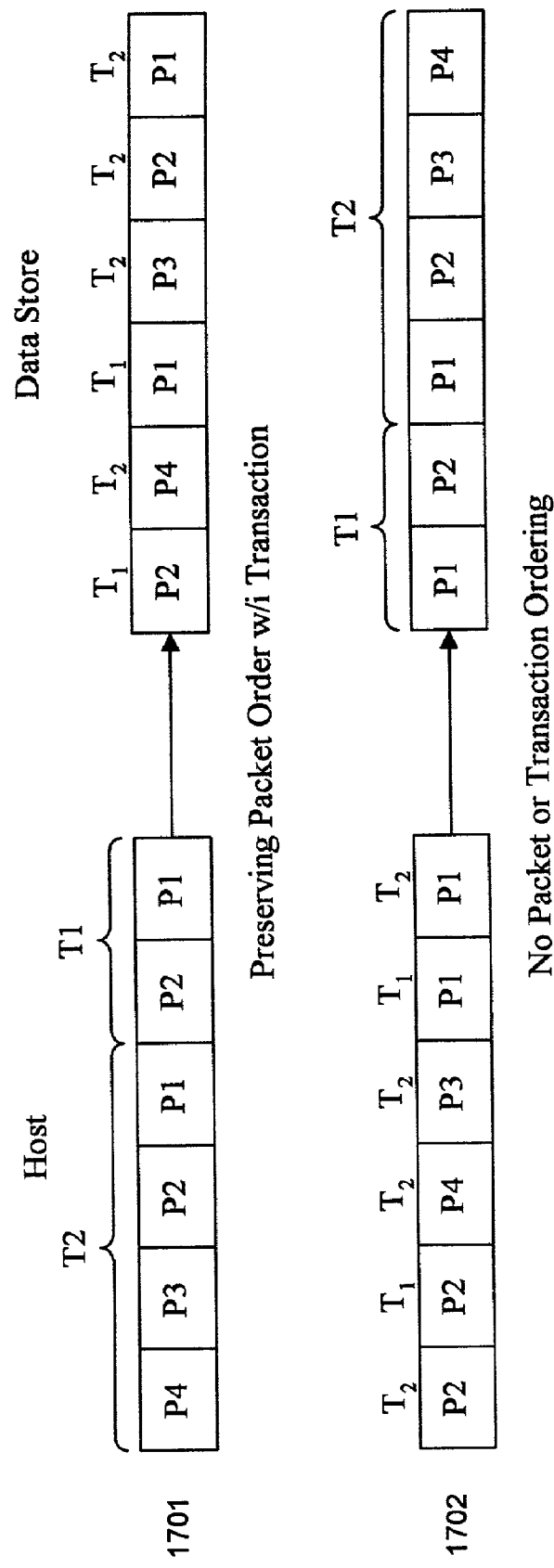
FIG. 17 is a diagram illustrating transaction-based asymmetric packet ordering in one embodiment.

FIG. 17 is a diagram illustrating transaction-based asymmetric packet ordering in one embodiment. Illustration 1701 illustrates preserving packet ordering within a transaction transmitted from a host to a data store device. In this example, transaction 1 includes packets 1 and 2 and transaction 2 includes packets 1, 2, 3, and 4. Transaction 1 is transmitted from the host before transaction 2. The data store device received the packets of each transaction in order within their transaction, but some of the packets of transaction 2 arrived before the some of the packets of transaction 1. For example, packet 1 of transaction 2 arrived before packet 1 of transaction 1, but after packet 1 of transaction 2. Illustration 1702 illustrates transmitting without preserving packet ordering within a transaction. In this example, transactions 1 and 2 are transmitted from the data store device to the host. The host receives the packets of the transactions out of order. For example, packet 2 of transaction 2 arrived before packet 1 of transaction 2.

Figure 18:
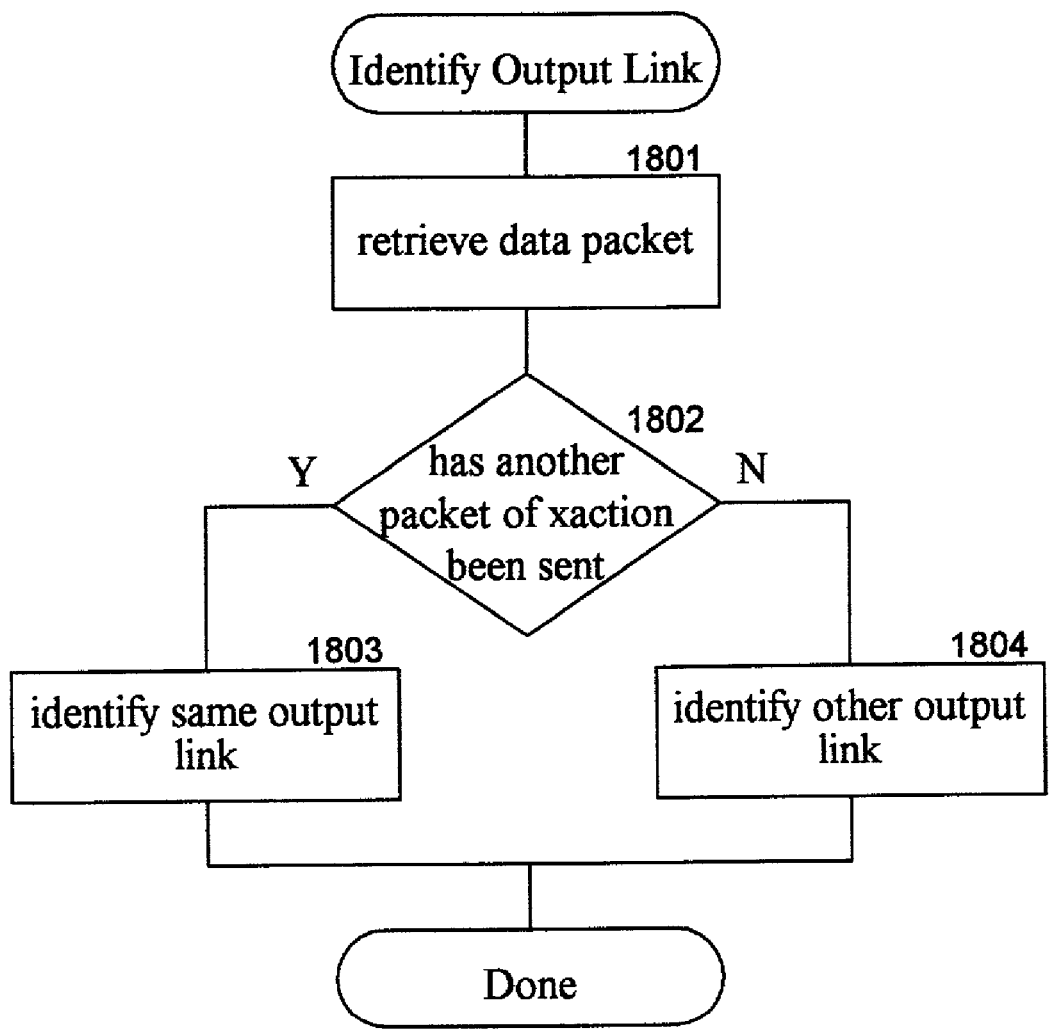
FIG. 18 is a logic diagram illustrating processing by a switch that ensures packet ordering within a transaction in one embodiment.

FIG. 18 is a logic diagram illustrating processing by a switch that ensures packet ordering within a transaction in one embodiment. In block 1801, a component of the switching layer retrieves the next data packet to be routed. In decision block 1802, if another packet of the same transaction has been transmitted by the switch, then the component identifies the same communications link in block 1803, else the component identifies a communications link for the first packet of that transaction.

1.6 Host Error Handling

In one embodiment, the communications nodes detect errors but do not attempt to correct or handle the errors. Rather, communications nodes forward error messages to the communications node that initiated the transaction associated with the error. For example, a host may request a data store device, such as a disk drive, to provide data stored at the data store device. If an error occurs (e.g., a CRC error) while the data is being transmitted from the data store device to the host, the communications node (e.g., a switch) that detects the error transmits an error message to the initiating host. The initiating host can then handle to the error as appropriate. For example, the initiating host may retransmit the request to retrieve the data from the data store device. Because the communications node (e.g., data store device or switch) does not attempt to handle errors, the complexity of these communications nodes is reduced. Although the handling of the error by the initiating host may be slow, the slowness may be acceptable because errors are expected to be relatively uncommon.

Figure 19A:
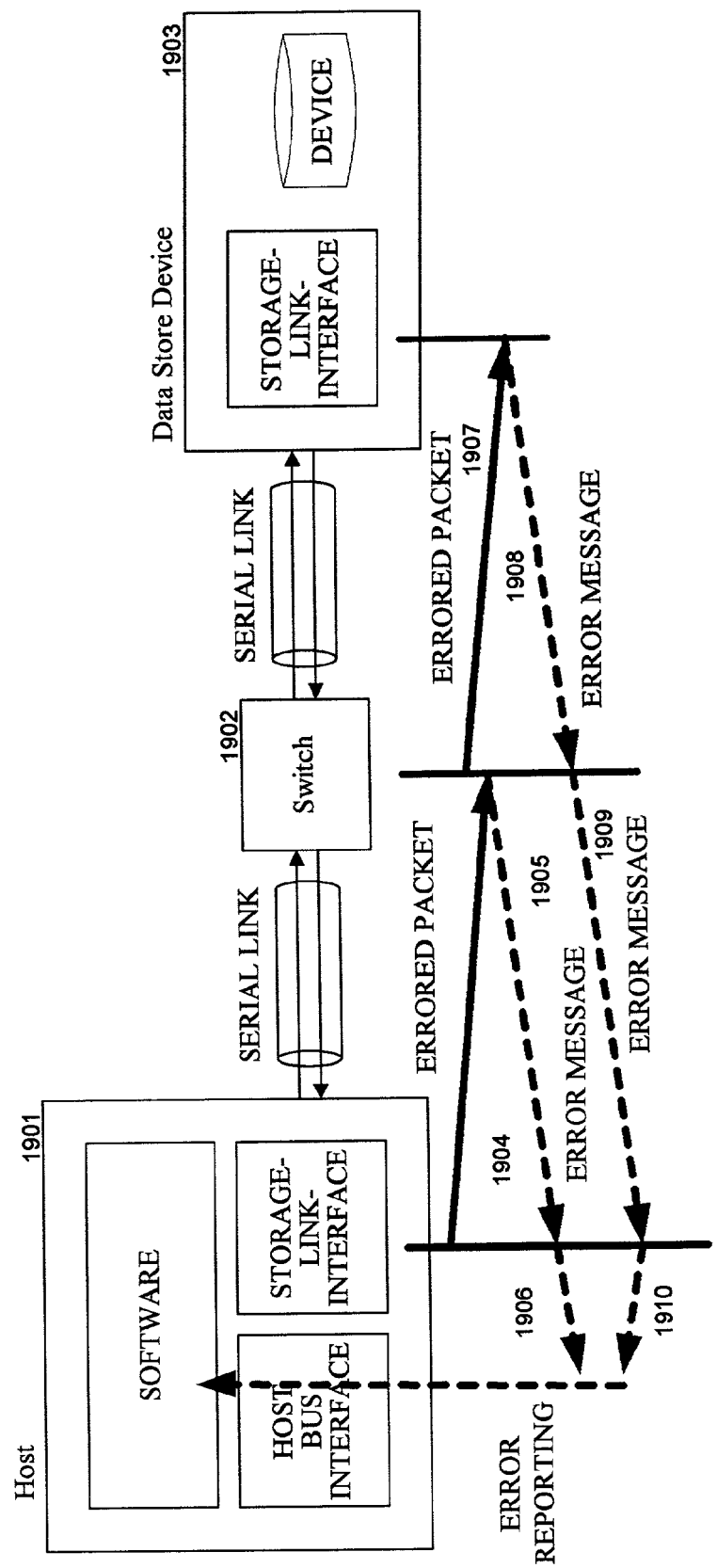
FIG. 19A is a block diagram illustrating error handling during transmission from a host to a data store device in one embodiment.

FIG. 19A is a block diagram illustrating the handling of errors during transmission from a host to a data store device in one embodiment. The host 1901 transmits a packet 1904 to switch 1902. The switch detects an error, transmits an error message packet 1905 to the host reporting the error, and suppresses further transmission of the packet to the data store device 1903. When the host receives the error message packet, it forwards an error message 1906 to the upper layer for processing. Similarly, when the data store device detects an error in the transmission of packet 1907 from the switch, it transmits an error message packet 1908 reporting the error to the switch, which is then transmitted as an error message packet 1909 to the host, and the error message 1910 is eventually reported to the upper layer of the host.

Figure 19B:
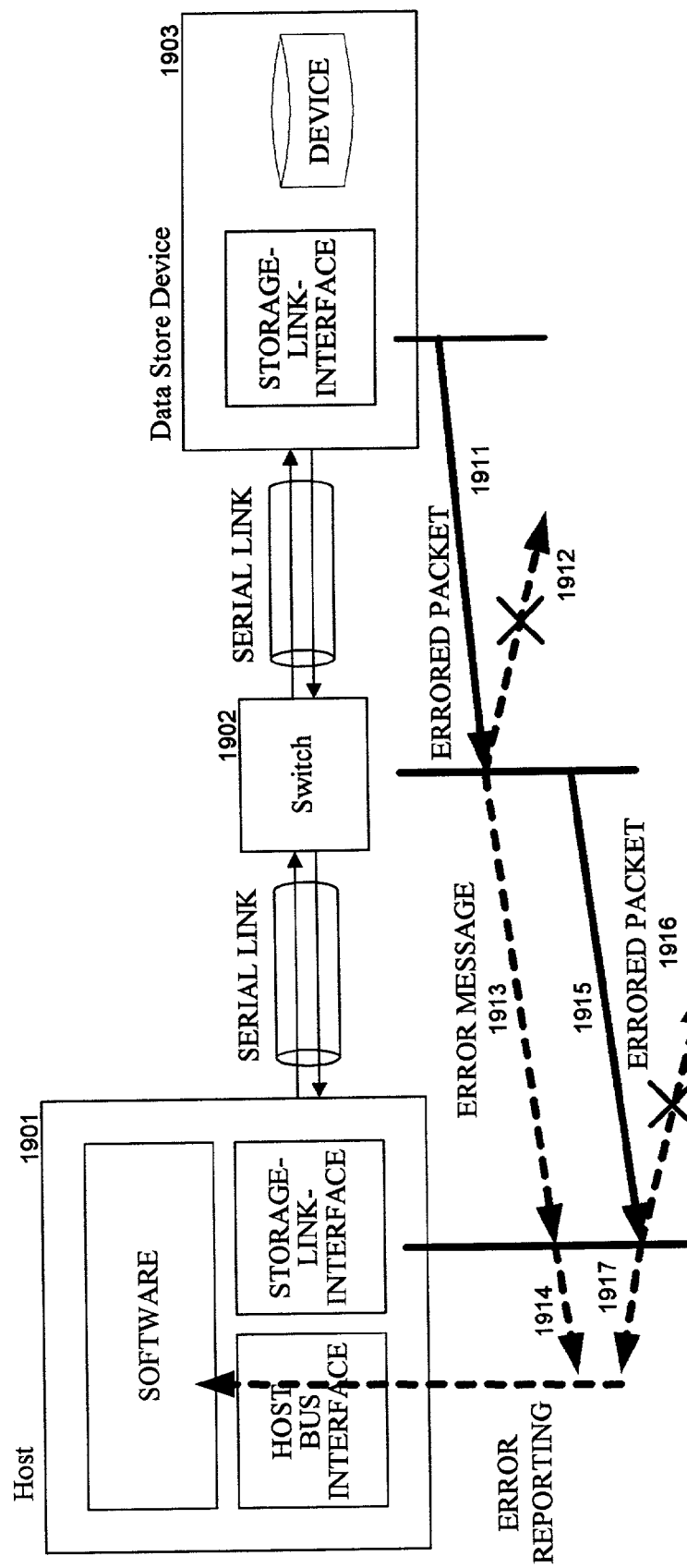
FIG. 19B is a block diagram illustrating the handling of errors during the transmission from a data store device to a host in one embodiment.

FIG. 19B is a block diagram illustrating the handling of errors during the transmission from a data store device to a host in one embodiment. The switch 1902 detects an error in the transmission of packet 1911 from the data store device 1903. Rather than transmitting an error message packet 1912 to the data store device, the switch transmits an error message packet 1913 to the host 1901 that initiated the transaction of the packet 1911 for which the error was detected. Upon receiving the error message packet, the host forwards an error message 1914 to an upper layer for handling. Similarly, when the host detects an error in transmission of packet 1915, it does not transmit error message packet 1916 to the switch 1902, rather it forwards an error message 1917 to the upper layer. As can be seen from FIGS. 19A and 19B, the switches and data store devices merely generate and forward error message packet, and do not perform error handling to correct the error.

Figure 19C:
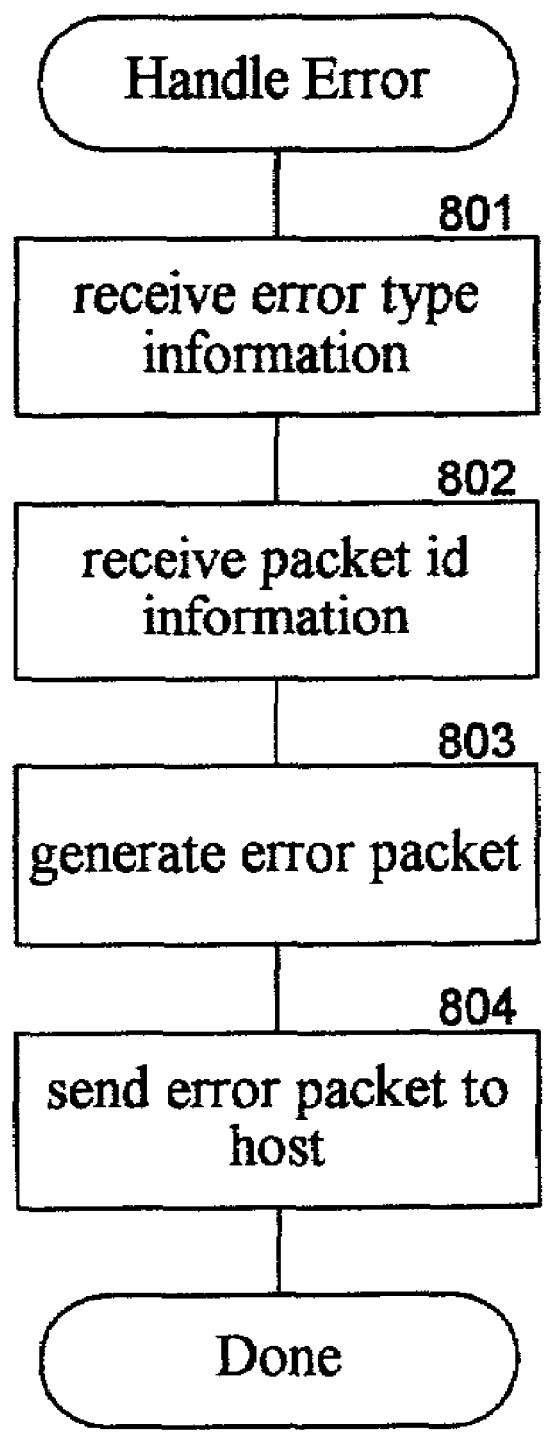
FIG. 19C is a logic diagram illustrating the processing of a communications node detecting an error in one embodiment.

FIG. 19C is a logic diagram illustrating the processing of a communications node detecting an error in one embodiment. In block 1921, a component of a transport layer receives an error signal from the link layer such as from a line indicating a CRC error. In block 1922, the component retrieves packet identifier information associated with the error. The packet identifier information includes the address of the initiating host. In block 1923, the component generates an error packet to transmit to the initiating host. In block 1924, the component transmits the error packet to the initiating host.

1.7 Transition Control & Selective Block Inversion

In one embodiment, the link layer of a communications node encodes codes into symbols in order to optimize transition control and to ensure DC-balance. Transition control may be optimized to either maximize or minimize the number of transitions in symbols that are to be transmitted. A transition is defined as a bit value of 1 followed by a bit value of 0 or a bit value of 0 followed by a bit value of 1. When the number of transitions is maximized, clock information may be more accurately derived from the transmitted symbols. When the number of transitions is minimized, overall electromagnetic interference may be minimized. One skilled in the art will appreciate that the link layer may be designed to minimize or maximize transitions depending on the overall design objectives. In the following, the described encoding technique attempts to maximize the number of transitions in symbols to be transmitted. In an alternate embodiment, the transitions can be maximized at times and minimized at other times to balance the objectives of deriving a clock signal and reducing electromagnetic interference.

The encoding technique in one embodiment encodes an 8-bit code based on the number of transitions in that code. The maximum possible number of transitions in an 8-bit code is seven and occurs when the bit values alternate between 0 and 1 (e.g., "10101010"). The minimum possible number of transitions in an 8-bit code is zero and occurs when all the bit values are the same (e.g., "11111111"). To maximize the number of transitions, the encoding technique inverts the bit value of alternate bits in each code with less than four transitions. This alternate bit inversion, also referred to as transition inversion, results in a code that previously had "n" transitions to now have |n-7| transitions. For example, the result of alternate bit inversion of a code with zero transitions (e.g., "11111111") is a code with seven transitions (e.g., "01010101"), and the result of alternate bit inversion of the code with three transitions (e.g., "00010111") is a code with four transitions (e.g., "10111101"). The encoding technique adds a ninth bit (i.e., a transition inversion indicating bit) to the 8-bit code to indicate whether the alternate bits of the code were inverted, which results in a 9-bit symbol. For example, a bit value of 0 in the ninth bit indicates that the code did not have its alternate bits inverted, and a bit value of 1 in the ninth bit indicates that the code did have its alternate bits inverted. The symbol "010111101" has a bit value of 0 in its ninth bit, which indicates that alternate bits were not inverted. In contrast, the symbol "110111101" has a bit value of 1 in its ninth bit, which indicates that alternate bits were inverted. One skilled in the art will appreciate that the ninth bit can be stored at any bit position within the symbol. In this description, the ninth bit is represented as the most significant bit of the symbols.

When a symbol is received at a communications node, the ninth bit is used to determine whether the symbol needs to have its alternate bits inverted to decode the symbol. Since the symbol "010111101" has a bit value of 0 in its ninth bit, its alternate bits were not inverted and the resulting decoded code is "10111101." Conversely, since the symbol "110111101" has a bit value of 1 in its ninth bit, its alternate bits were inverted and the resulting decoded code is "00010111." All the symbols generated by alternate bit inversion encoding are referred to as "in-band symbols" because they are 9-bit symbols with at least four transitions. All 9-bit symbols with three or less transitions are referred to as "out-of-band symbols." This alternate bit inversion encoding technique generates only in-band symbols.

FIG. 20 illustrates an alternate bit inversion encoding technique in one embodiment. The left column represents the 8-bit codes, and the right column represents the 9-bit symbols. The alternate bit inversion encoding technique is referred to as an 8b/9b encoding, which is a more efficient encoding than standard 8b/10b encodings. Transition control encoding is described in U.S. Pat. No. 5,999,571, entitled "Transition-Controlled Digital Encoding and Signal Transmission System," which is hereby incorporated by reference.

The encoding technique may also help ensure DC-balance by using selective block inversion encoding on symbols that have been transition optimized. Selective block inversion refers to an encoding technique that inverts certain bit values in a block of symbols to help ensure DC-balance is maintained. In one embodiment, selective block inversion may perform polarity inversion (i.e., inverting each bit of a symbol) on all but one symbol of a block to help ensure DC-balance and transition inversion on that one symbol in the block to indicate that the other symbols of the block have been polarity inverted. Although the encoding technique performs selective block inversion on blocks of four symbols, one skilled in the art will appreciate that a block can contain any number of symbols. Conventional encoding techniques, in contrast, typically process only one symbol at a time when attempting to ensure DC-balance. Because the selective block inversion encoding technique evaluates DC-balance over multiple symbols, DC-balance is more likely assured and there is essentially no bandwidth used to indicate whether a symbol has been inverted.

The selective block inversion encoding technique tracks the running disparity on symbol boundaries of the symbols that have been transmitted so far. The running disparity represents the difference in the overall number of 1-bit values and 0-bit values of the symbols that have been transmitted on the communications link. For example, if 452 1-bit values and 448 0-bit values have been transmitted (e.g., 100 symbols), then the running disparity is +4 (e.g., in the 1-direction or positive). If 448 1-bit values and 452 0-bit values have been transmitted, then the running disparity is −4 (e.g., in the 0-direction or negative). If the number of 1-bit values and 0-bit values are equal, then the running disparity is 0 (e.g., neutral). To determine whether to perform selective block inversion on a block of symbols, the encoding technique compares the running disparity of the symbols transmitted so far to the block disparity of that block. Block disparity is the difference between number of 1-bit values and 0-bit values of the symbols of a block. If the running disparity and the block disparity are both positive or both negative, then the encoding technique performs block inversion on that block.

The encoding technique inverts a block by inverting alternate bits of the first symbol in the block (i.e., transition inversion) and inverting all the bits of the other symbols in the block (i.e., polarity inversion). The inverting of the alternate bits of the first symbol results in an out-of-band symbol that is used to indicate whether the following block has been block inverted. When a block of symbols is received, the receiving communications node can determine whether the block has been block inverted by checking the first symbol of the block. If the first symbol of the block is an in-band symbol, then the block has not been block inverted. If the first symbol of the block is an out-of-band symbol, then the block has been block inverted. If the block has been block inverted, then the decoding technique undoes the alternate bit inversion of the first symbol by inverting alternate bits of the first symbol and undoes the bit inversion of the other symbols by inverting all of the bits of the other symbols. One skilled in the art will appreciate that the symbol used to indicate whether the block is block inverted need not be the first symbol of the block, but rather can be any symbol of the block so long as the receiving communications node can identify which symbol indicates selective block inversion.

Figure 21A:
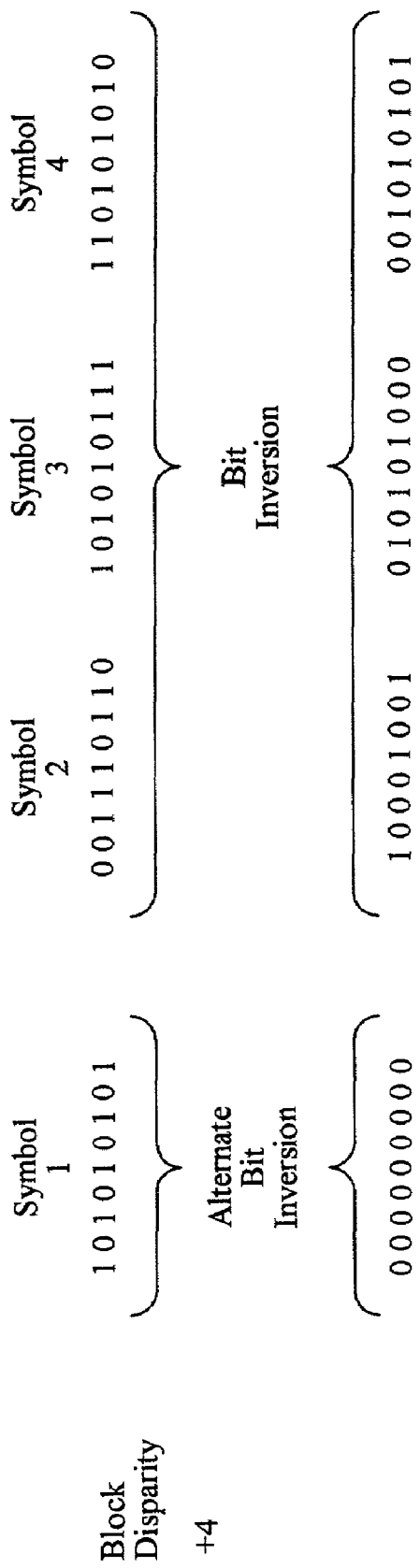
FIG. 21A is a diagram illustrating the selective block inversion encoding technique in one embodiment.

FIG. 21A is a diagram illustrating the selective block inversion encoding technique in one embodiment. In this example, a block is defined as having four symbols. One skilled in the art will appreciate that a block can have any number of two or more symbols. In this example, the block disparity is +6, because there are 21 1-bit values and 15 0-bit values in the block. If the running disparity is positive, then the encoding technique performs block inversion. The first symbol of the block has its alternate bits inverted, and the remaining symbols of the block have all their bits inverted. The resulting symbols have a block disparity of −4. Thus, the DC-balance would be improved by transmitting the inverted block, rather than the noninverted block. The encoding technique may alternatively only perform block inversion when the running disparity is outside a certain range. For example, if the running disparity is between −100 and +100, then no selective block inversion is performed. If outside the range, then selective block inversion is performed. One skilled in the art will appreciate that this range can be selected based on various characteristics of the communications link such as transmission rate or maximum transmission distance.

Figure 21B:
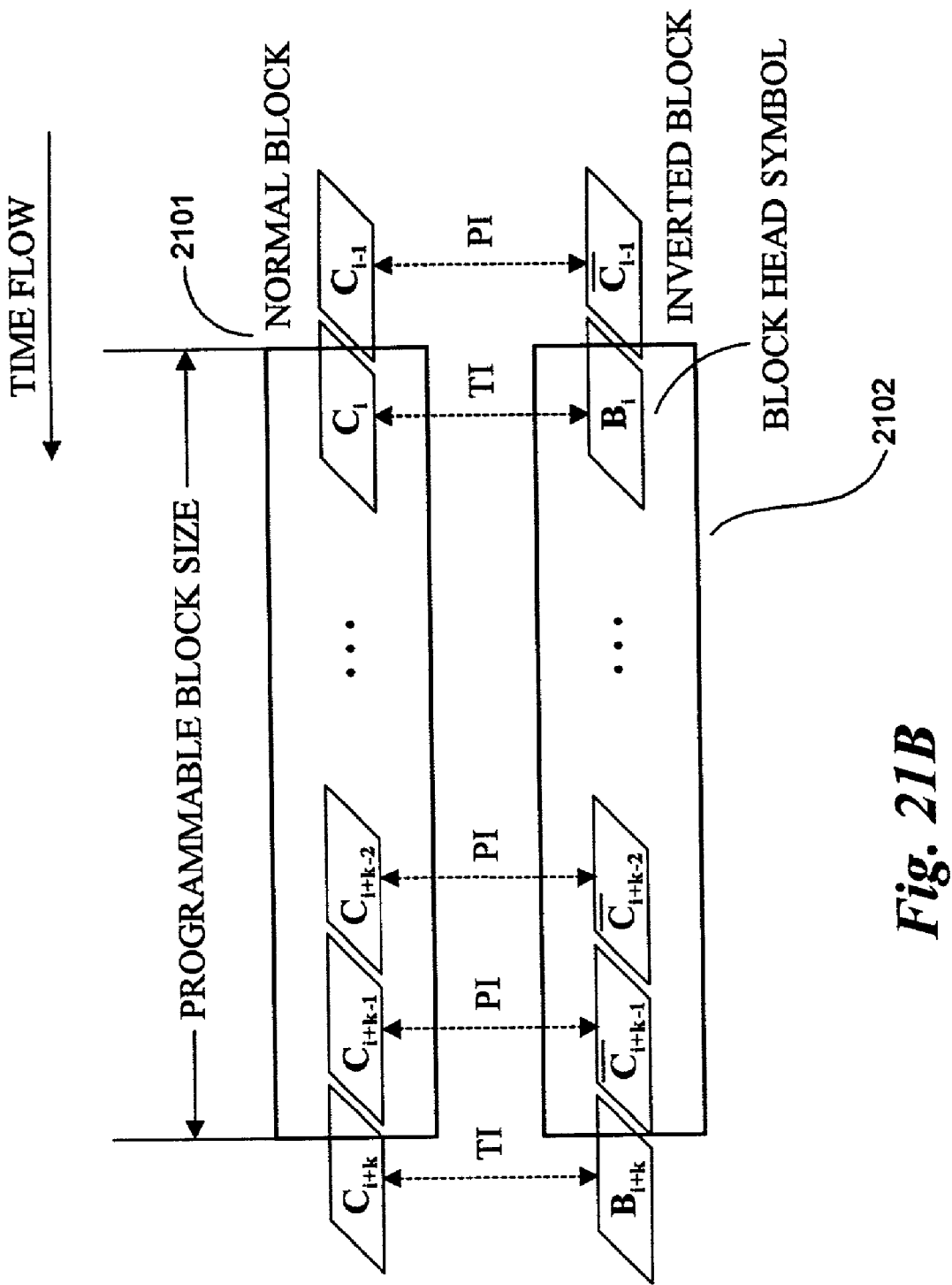
FIG. 21B is a block diagram illustrating selective block inversion with a programmable block size in one embodiment.

FIG. 21B is a block diagram illustrating selective block inversion with a programmable block size in one embodiment. In this example, the block size is represented by the variable "k." The selective block inversion encoding technique processes k sequential symbols at a time as indicated by blocks 2101 and 2102. The transition from block 2101 to 2102 illustrates selective block inversion for transmission, and the transition from block 2102 to 2101 illustrates the undoing of selective block inversion upon reception. To perform block inversion, the block header symbol Ci is transition inverted (T1) resulting in symbol Bi and the symbol Ci+1 to symbol Ci+k−1 are polarity inverted (SI) resulting in symbol $\overline{C_{i+1}}$ to symbol $\overline{C_{i+k-1}}$. To undo block inversion, the block header symbol Bi is transition inverted resulting in symbol Ci and the symbols $\overline{C_{i+1}}$ to symbol $\overline{C_{i+k-1}}$ are polarity inverted resulting in symbol Ci+1 and symbol Ci+k+1.

Figure 21C:
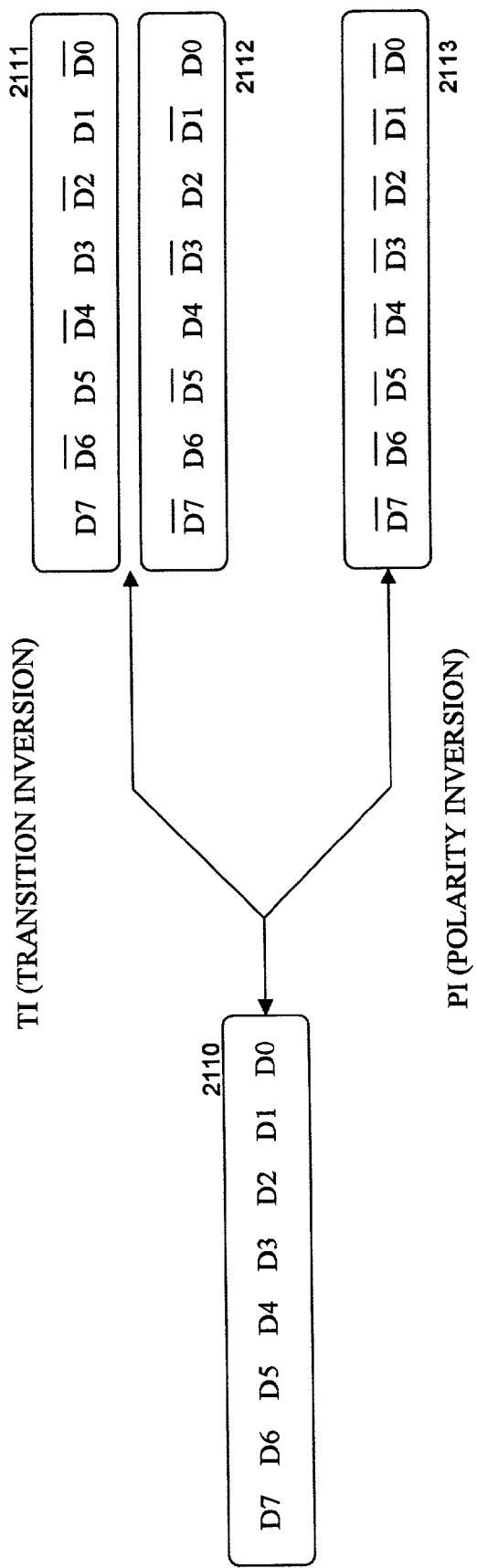
FIG. 21C is a block diagram illustrating transition inversion and polarity inversion in one embodiment.

FIG. 21C is a block diagram illustrating transition inversion and polarity inversion in one embodiment. In this example, 8-bit codes are inverted. The code 2110 may be transition inverted in two ways to generate codes 2111 and 2112. Code 2111 results from inverting alternate bits starting with the first bit, and code 2112 results from inverting alternate bits starting with the second bit. The code 2110 is polarity inverted by inverting each bit to generate code 2113. The same process is applied to codes 2111, 2112, and 2113 to generate code 2110.

As discussed above, a primitive is a sequence of two out-of-band symbols. Thus, a receiving communications node can distinguish between a primitive and the first symbol of an inverted block because a primitive is a sequence of two out-of-band symbols and one out-of-band symbol by itself represents the first symbol of an inverted block.

Figure 22:
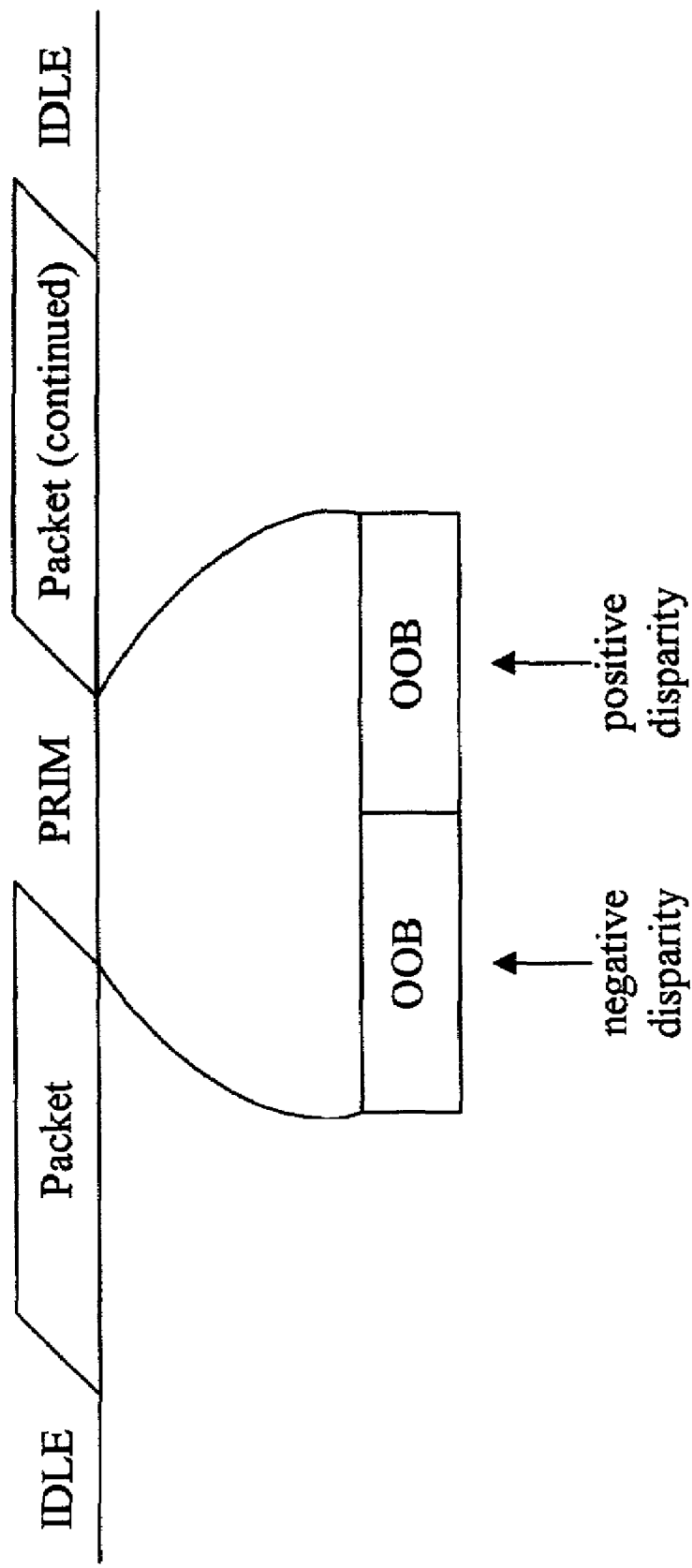
FIG. 22 is a diagram illustrating the format of a primitive in one embodiment.

FIG. 22 is a diagram illustrating the format of a primitive in one embodiment. A primitive is defined as a sequence of two out-of-band symbols. The out-of-band symbols are preferably selected to have minimal impact on DC-balance. In particular, the disparity of a primitive is selected to be as close to 0 as possible. To achieve this disparity, one symbol of the primitive may have a negative disparity and the other symbol of the primitive may have any positive disparity. (A symbol with an odd number of bits cannot have a 0 disparity.) When the disparity of a primitive is 0, then the primitive can be transmitted at any time without affecting the running disparity and thus with minimal impact on the DC-balance. In one embodiment, the first symbol of a primitive has the negative disparity (i.e., negative polarity) and the second symbol has the positive disparity (i.e., positive polarity), or vice versa. The receiving communications node can detect a transmission error when a sequence of two out-of-band symbols has an improper ordering for their disparity or both symbols have either a positive or a negative disparity. When a primitive has minimal or no effect on DC-balance, then the complexity of the transmitting communications node may be reduced because the logic to calculate the running disparity need not include primitives in the calculation.

Figure 23:
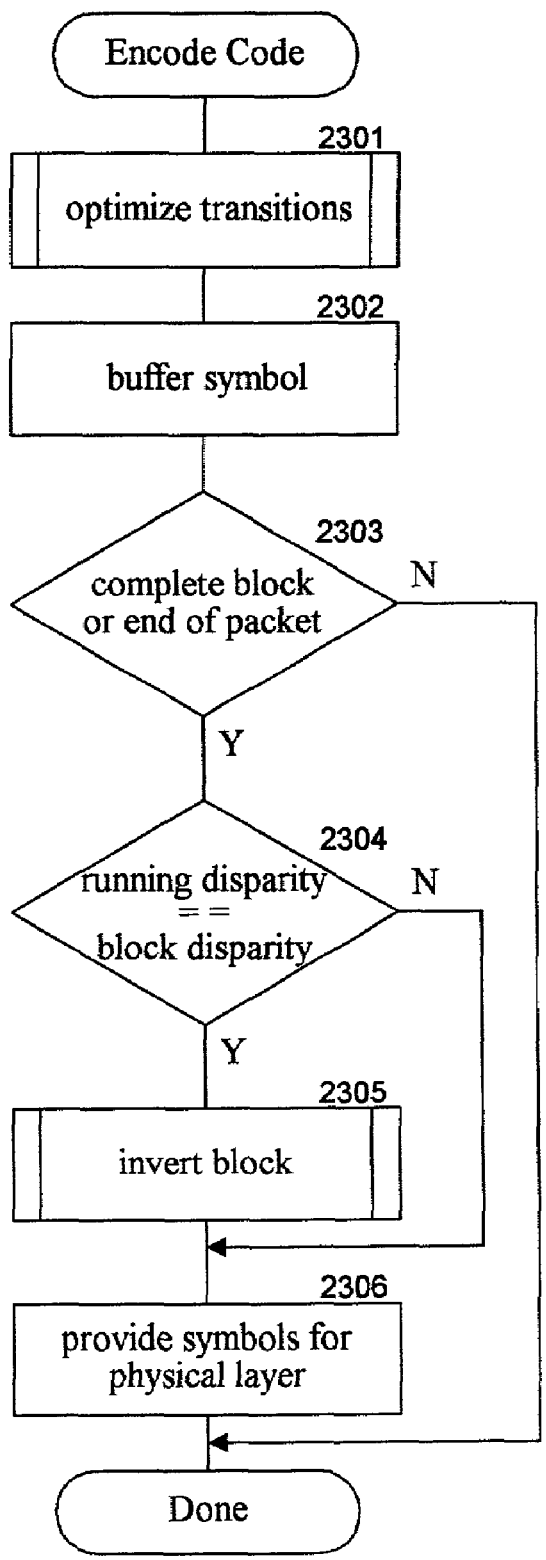
FIG. 23 is a logic diagram illustrating transition control and selective block inversion encoding in one embodiment.

FIGS. 23-28 are logic diagrams illustrating encoding and decoding techniques in one embodiment. FIG. 23 is a logic diagram illustrating transition control and selective block inversion encoding in one embodiment. A component of the link layer receives codes to be transmitted one code at a time from the transport layer. In block 2301, the component performs transition control optimization to generate a symbol from the code. In block 2302, the component buffers the symbols until a complete block of symbols has been buffered. In decision block 2303, if a complete block of symbols has been buffered, then the component continues at a block 2304, else the component waits to receive the next code. In decision block 2304, if the running disparity is equal to the block disparity, then the component continues at block 2305, else the component continues at block 2306. In block 2305, the component performs block inversion on the symbols of the block. In block 2306, the component provides the symbols of the buffer to the physical layer and then waits to receive the next code from the transport layer.

Figure 24:
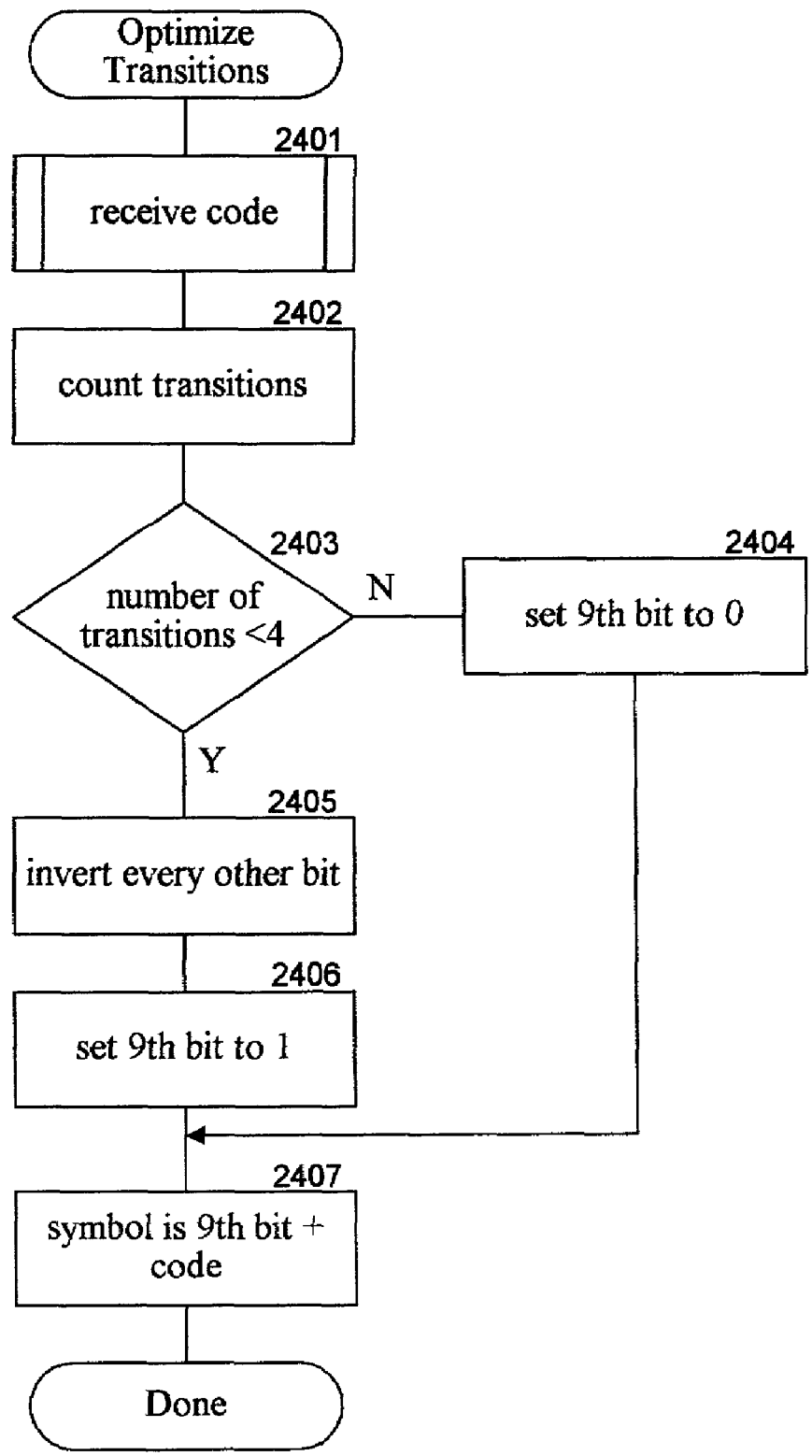
FIG. 24 is a logic diagram illustrating transition control optimization in one embodiment.

FIG. 24 is a logic diagram illustrating transition control optimization in one embodiment. In block 2401, the component receives a code for transition optimization. In block 2402, the component counts the number of transitions in the received code. In block 2403, if the number of transitions is less than four (assuming an 8-bit code), then the component continues at block 2405, else the component continues at block 2404. In block 2404, the component sets the ninth bit to a 0-bit value. In block 2405, the component performs alternate bit inversion on the received code by inverting every other bit. In block 2406, the component sets the ninth bit to a 1-bit value. In block 2407, the component generates the symbol as the ninth bit value plus the code.

Figure 25:
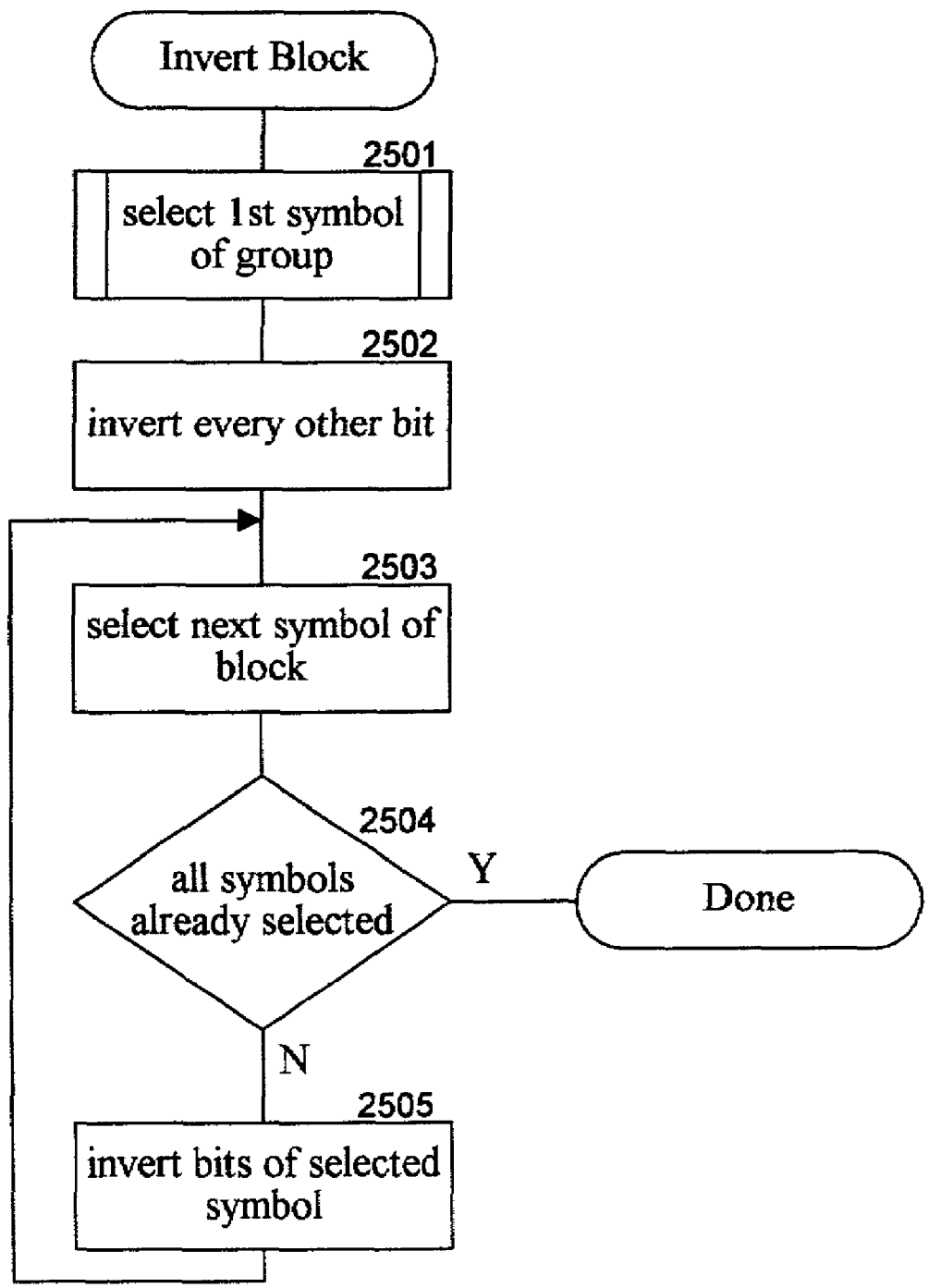
FIG. 25 is a logic diagram illustrating block inversion in one embodiment.

FIG. 25 is a logic diagram illustrating block inversion in one embodiment. In block 2501, the component selects the first symbol of the block. In block 2502, the component performs alternate bit inversion on the selected symbol by inverting alternate bits. In block 2503, the component selects the next symbol of the block. In decision block 2504, if all the symbols have already been selected, then the component completes, else the component continues at block 2505. In block 2505, the component inverts the selected symbol by inverting the value of each bit in the selected symbol. The component then selects the next symbol of the block.

Figure 26:
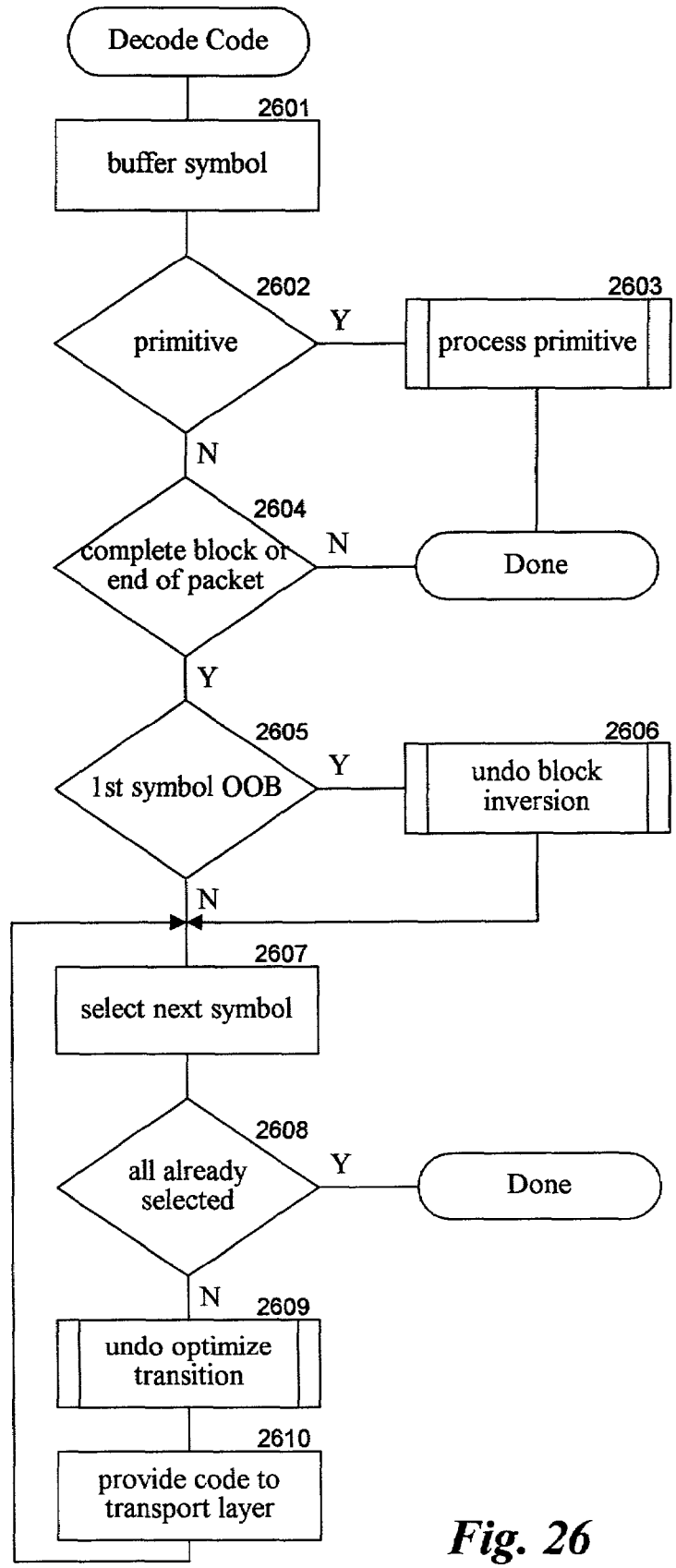
FIG. 26 is a logic diagram illustrating transition control and selective block inversion decoding in one embodiment.

FIG. 26 is a logic diagram illustrating transition control and selective block inversion decoding in one embodiment. The component of the link layer is provided with one symbol at a time by the physical layer. In block 2601, the component stores the symbol in a buffer. In decision block 2602, if the buffer contains a primitive, then the component continues at block 2603 to process the primitive, else the component continues at block 2604. In block 2604, if the buffer contains a complete block, then the component continues at block 2605, else the component waits for the next symbol. In decision block 2605, if the first symbol in the buffer is an out-of-band symbol, then the transmitting communications node inverted the block and the component continues at block 2606, else the component continues at block 2607. In block 2606, the component undoes the block inversion of the block. In block 2607, the component selects the next symbol of the block. In decision block 2608, if all the symbols have already been selected, then the component waits for the next symbol, else the component continues at block 2609. In block 2609, the component undoes the optimization of the transitions of the selected symbol to generate the corresponding code. In block 2610, the component provides the code to the transport layer and then processes the next symbol of the block.

Figure 27:
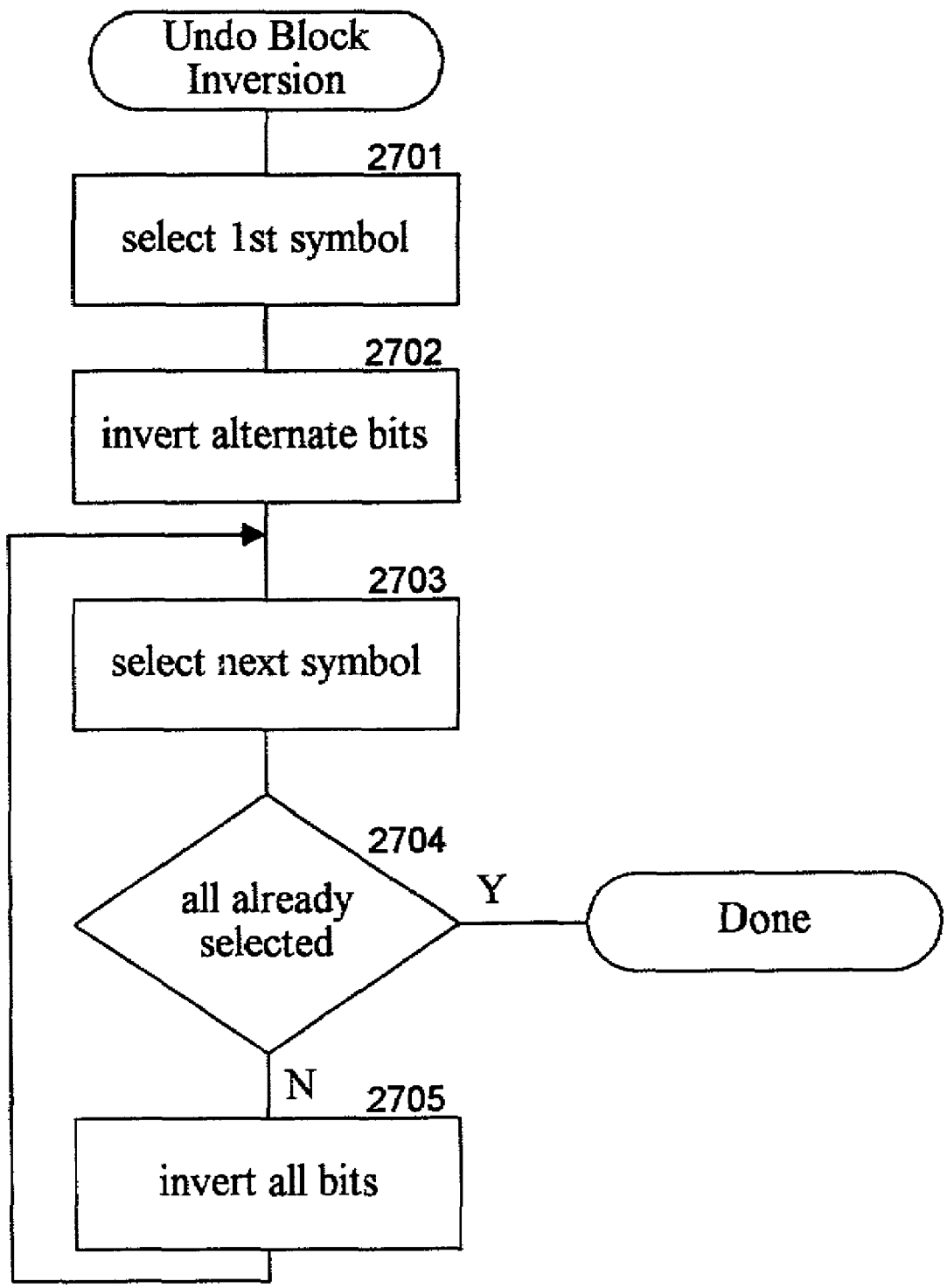
FIG. 27 is a logic diagram illustrating the undoing of block inversion in one embodiment.

FIG. 27 is a logic diagram illustrating the undoing of block inversion in one embodiment. In block 2701, the component selects the first symbol of the block. In block 2702, the component inverts alternate bits of the selected symbol. In block 2703, the component selects the next symbol of the block. In decision block 2704, if all the symbols have already been selected, then the component completes, else the component continues at block 2705. In block 2705, the component inverts all the bits of the selected symbol and then processes the next symbol of the block.

Figure 28:
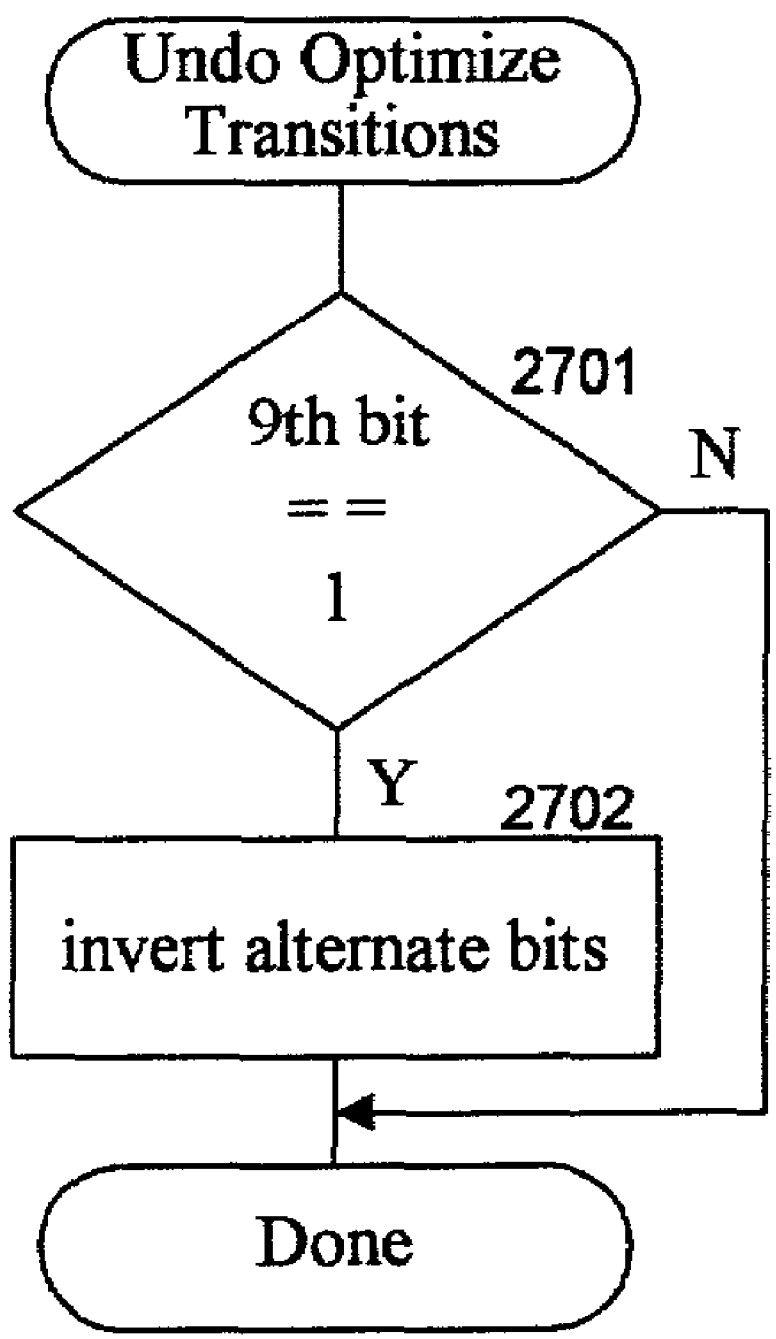
FIG. 28 is a logic diagram illustrating the undoing of transition control optimization in one embodiment.

FIG. 28 is a logic diagram illustrating the undoing of transition control optimization in one embodiment. In decision block 2801, if the ninth bit of the symbol is one, then the component inverts alternate bits of the symbol in block 2802. The component then outputs the resulting code.

Figure 29:
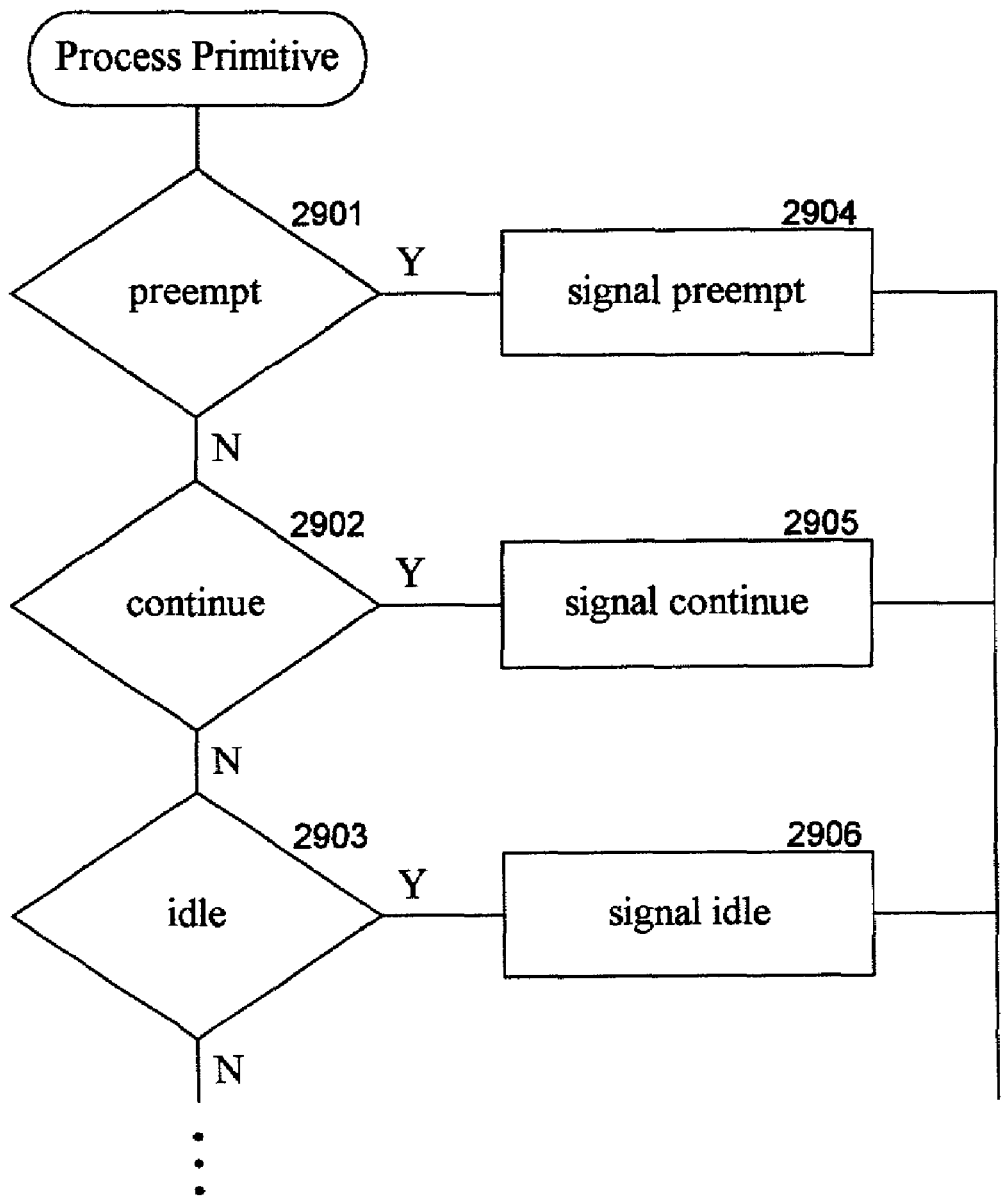
FIG. 29 is a logic diagram illustrating the processing of a primitive in one embodiment.

FIG. 29 is a logic diagram illustrating the processing of a primitive in one embodiment. Although not shown, the component may ensure that the disparity of the symbols of the primitive are in the correct order. In decision blocks 2901-2903, the component decodes the primitive. In blocks 2904-2906, the component raises a signal indicating the primitive that has been received. In one embodiment, the signals may be provided to the transport layer to control the packetizing of the received codes.

2. Memory Link Architecture

In one embodiment, various transport layer, link layer, and physical layer techniques can be used to provide a serial communications architecture that is well suited to support memory-based data store devices, especially multiport memory devices with random access memory. This architecture that is adapted to memory devices is referred to as "Memory Link." A multiport memory device provides multiple serial communications ports that can be connected to different hosts (e.g., any memory accessing device, such as a memory controller). Each host can independently access the memory of the memory device to read and write data. The memory may be organized into memory banks that can be simultaneously accessed by the same or different hosts. Many applications can advantageously use a multiport memory device. For example, an asynchronous transfer mode ("ATM") switch can use a multiport memory device to replace a crossbar switch. The ATM switch may have multiple input ports that store received data in the multiport memory device and multiple output ports that retrieve data from the multiport memory device. A multiport memory device may include a switch for dynamically interconnecting the memory to the ports so that each port can selectively access each memory bank. Alternatively, the ports may access memory using time-division multiplexing techniques.

Because of the way memory is typically accessed, the physical layer, link layer, and transport layer might be simplified as compared to the layers needed in a more general data store device, such as a disk drive. Each port of a multiport memory device is typically directly connected to a host. In such a case, packets do not need to specify a source and a destination and the headers are thus simplified. In addition, packet types can be encoded in synchronization primitives to further simplify the packet header. The transport layer of a port in a multiport memory device can be simplified or eliminated because (1) routing to another device is not needed, (2) minimal or no parsing of the header may be needed, and (3) preemption and priority ordering of packets may not be needed. In addition, the link layer may be simplified by the use of physical layer DC-balancing, rather than the use of the selective block inversion to achieve DC-balance. Physical layer DC-balancing can be used with a multiport memory device because the distance between the host and the multiport memory device is typically relatively short.

The physical layer may also be simplified because a single multiphase clock generating device, such as an analog phase lock loop ("PLL"), or a delay lock loop, can be used to provide clocking for the transmitter and receiver for each port of the multiport memory device. The use of a single multiphase clock generating device can greatly reduce the area of a multiport memory chip used by the physical layer. A single-chip, multiport memory device has traditionally been infeasible because of the need to have multiple analog phase lock loops. The physical layer may also use plesiosynchronous null insertion techniques as described below to compensate for variations in the frequency between clocks of the hosts and the clock of the multiport memory device. The multiport memory device may transmit control information using out-of-band symbols as described above. Also, commands for accessing the memory device may be encoded in synchronization symbols.

Figure 30:
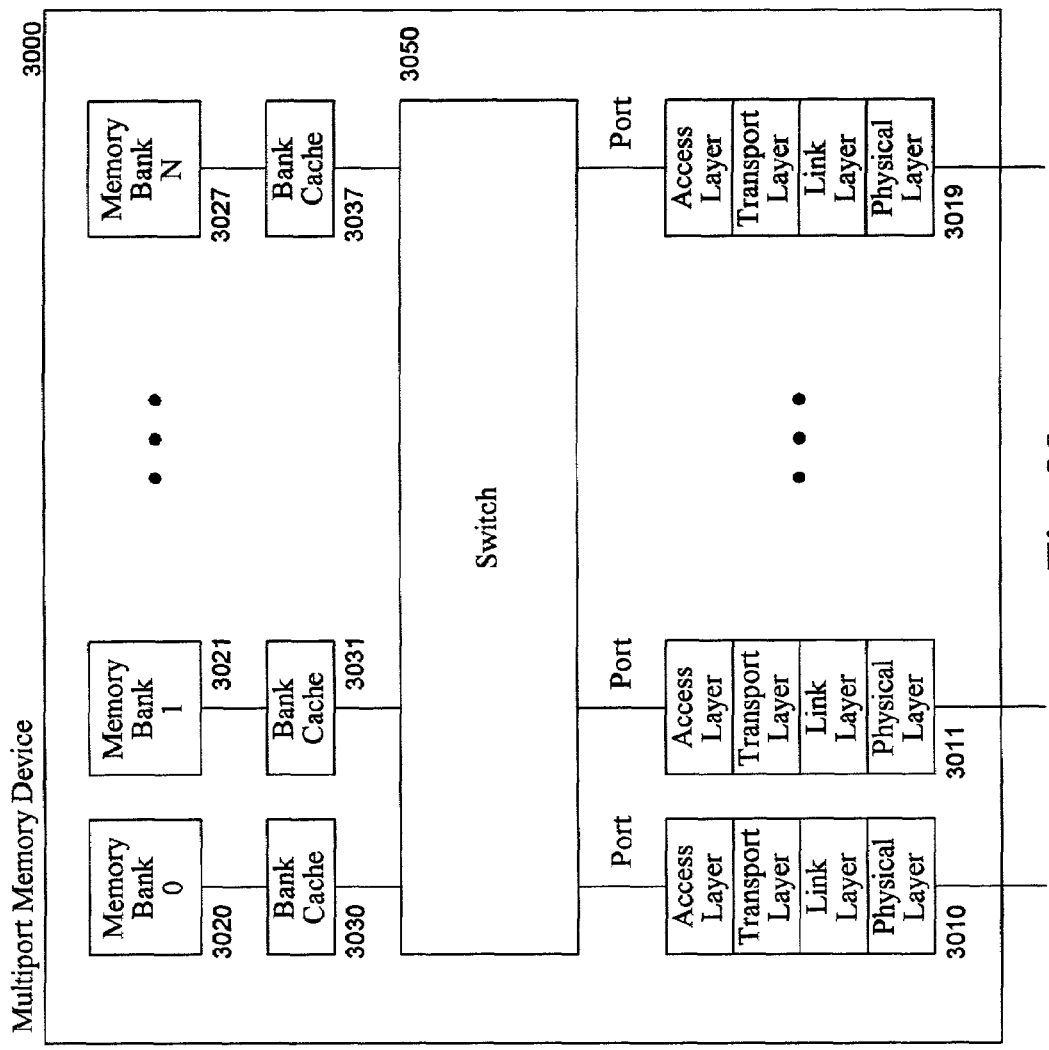
FIG. 30 is a block diagram illustrating the overall architecture of a multiport memory device in one embodiment.

FIG. 30 is a block diagram illustrating the overall architecture of a multiport memory device in one embodiment. The multiport memory device 3000 includes multiple ports 3010-3019. Each port includes a physical layer, a link layer, a transport layer (optional), and an access layer. The access layers are connected to switch 3050. The multiport memory device includes memory with memory banks 3320-3027. Each memory bank has associated bank cache 3030-3037. The bank caches are connected to the switch. A switch arbiter (not shown) is responsible for connecting the ports to the bank caches as needed to process the memory access requests. Each port can be independently and simultaneously connected to memory banks. Alternatively, access of the ports to the memory banks can be time-division multiplexed. With time-division multiplexing, each port has its allotted time period for communicating with the memory bank. A clock signal with a different phase for each port can be used to coordinate the access. The physical layer, link layer, and transport layer may be implemented to provide various combinations of the functions described above (e.g., transition control optimization and synchronization primitives encoded with packet types). The access layer receives commands and data from the transport layer, directs the arbiter to connect the port to the appropriate memory bank, and transmits commands and data to the memory bank. The access layer also receives data from the memory banks and provides the data to the transport layer for transmission to the host.

Figure 31:
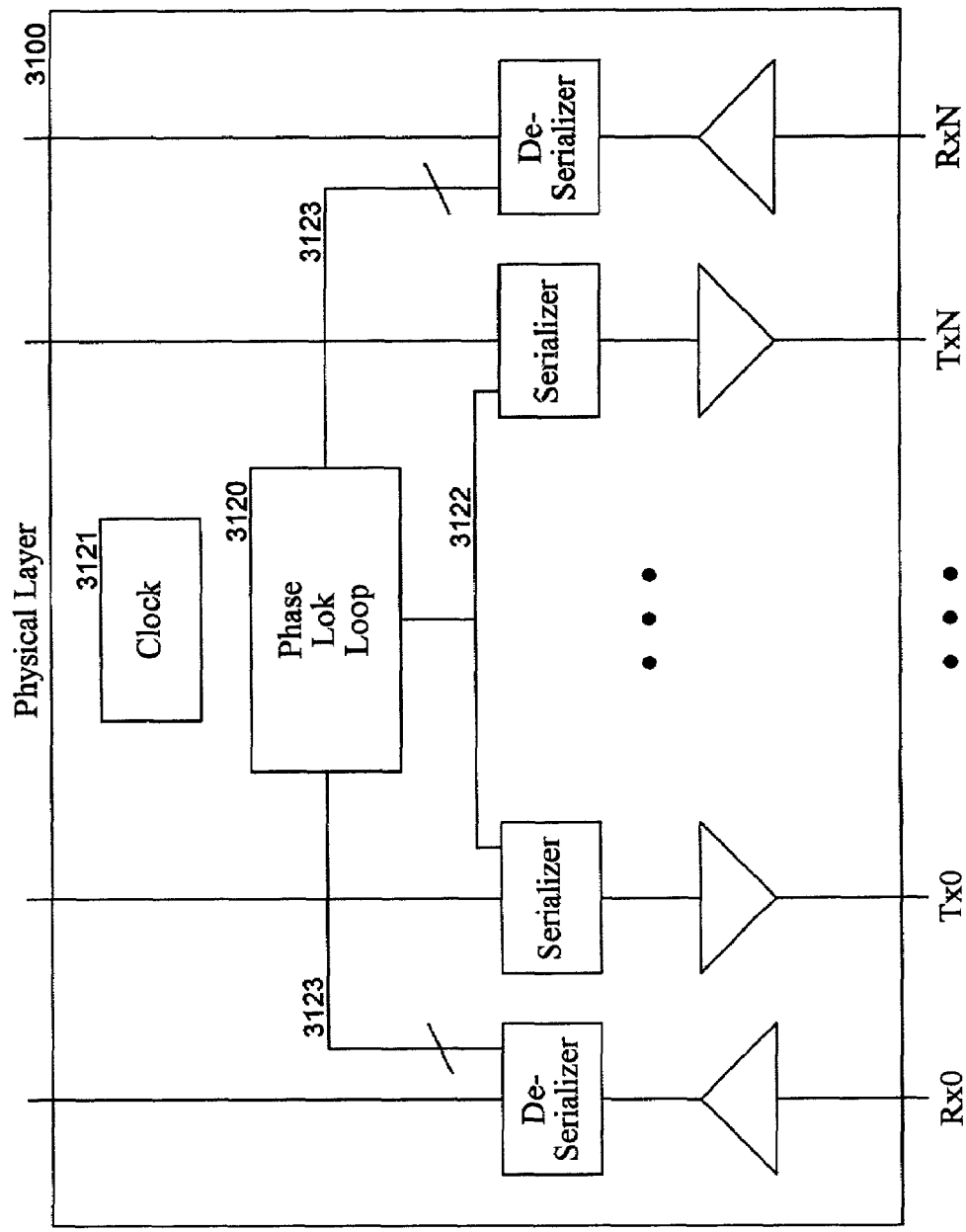
FIG. 31 is a block diagram illustrating the use of a single phase lock loop for the physical layer of a multiport memory device in one embodiment.

FIG. 31 is a block diagram illustrating the use of a single phase lock loop for the physical layer of a multiport memory device in one embodiment. The physical layer 3100 of the multiport memory device includes multiple ports 3110-3119. Each port includes a serial communications line connected to a transmitter and another serial communications line connected to a receiver that comprise the serial communications link. Each port also includes a serializer and deserializer. The phase lock loop 3120 receives a clock signal from clock 3121. The phase lock loop outputs a clock signal 3122 and phase shifted clock signals 3123. The clock signal 3122 provides clocking information for the serializer. The phase shifted clock signals 3123 are provided to the deserializers to control the sampling of the input data.

FIG. 32 is a block diagram illustrating contents of a bank cache in one embodiment. Each bank cache includes an input queue 3201 and an output queue 3202. Each entry of the input queue includes a port field, a read/write field, an address field, and a data field. The port field identifies the port (e.g., 3) that provided the command. The read/write field identifies whether the access is a read or a write (i.e., R or W). The address field identifies the memory address to be accessed (e.g., 1000). The address field may be latched from the address bus. The data field includes the data to be written to memory. Each entry of the output queue includes a valid field, a port field, and a data field. The valid field indicates whether the entry contains valid data (e.g., 0 or 1). If a memory bank has multiple sections as described below, then the valid field may have a bit indicating whether the data of each section is valid. The port field identifies the port (e.g., 3) to which the data is to be transmitted. The data field contains the data retrieved from memory. Each memory bank successively retrieves entries from the input queue and then performs the requested access. When the access is to read data from memory, the memory bank also adds entries to the output queue. The memory bank adds an entry to the output queue on every possible read cycle. The valid field is used to indicate whether the entry contains valid data.

Figure 33:
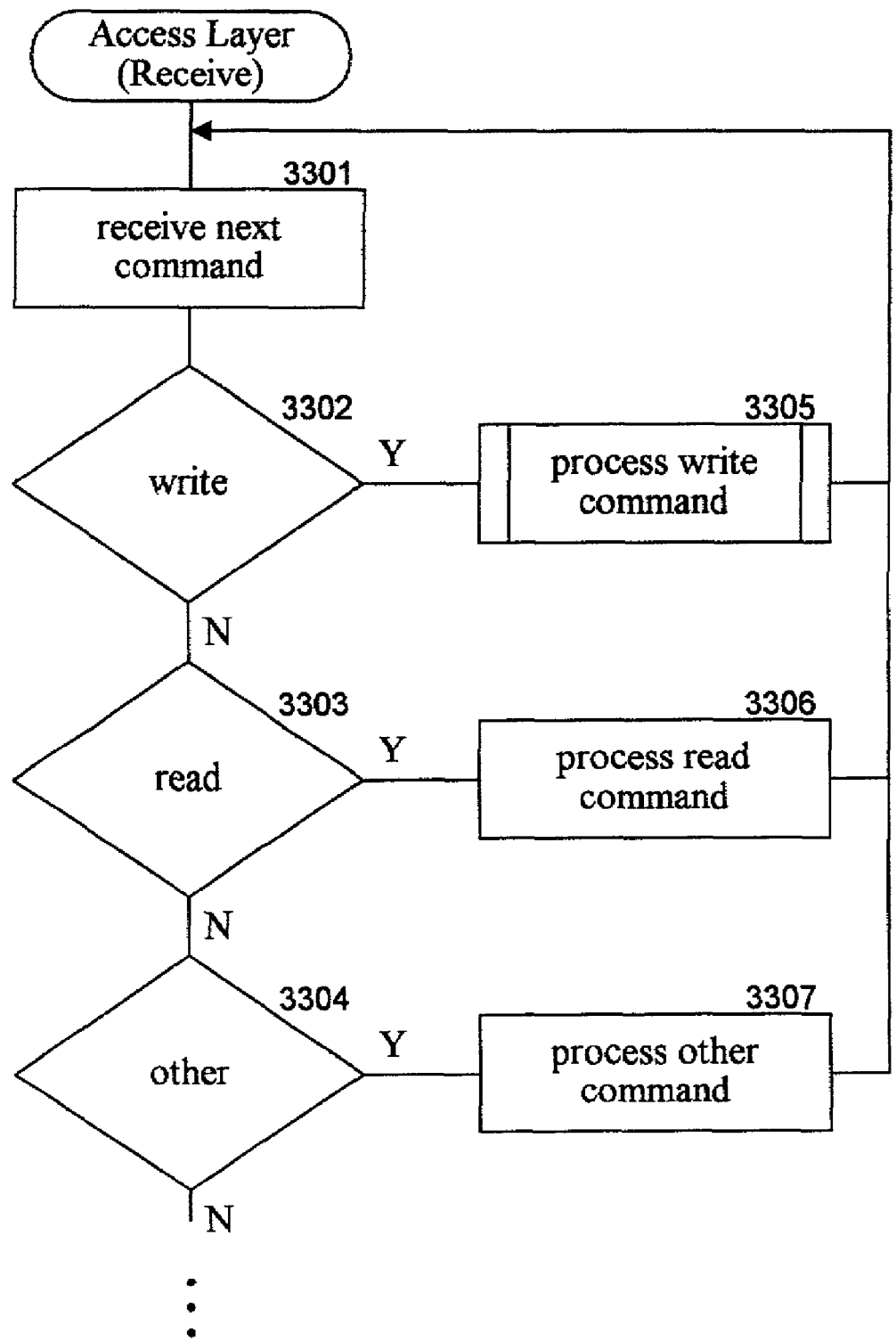
FIG. 33 is a logic diagram illustrating processing of the access layer when it receives data from a host in one embodiment.

FIG. 33 is a logic diagram illustrating processing of the access layer when it receives data from a host in one embodiment. In block 3301, a component of the access layer receives the next command from the transport layer. In decision block 3302-3304, the access layer parses the command. In block 3305-3307, the component performs the processing associated with that command.

Figure 34:
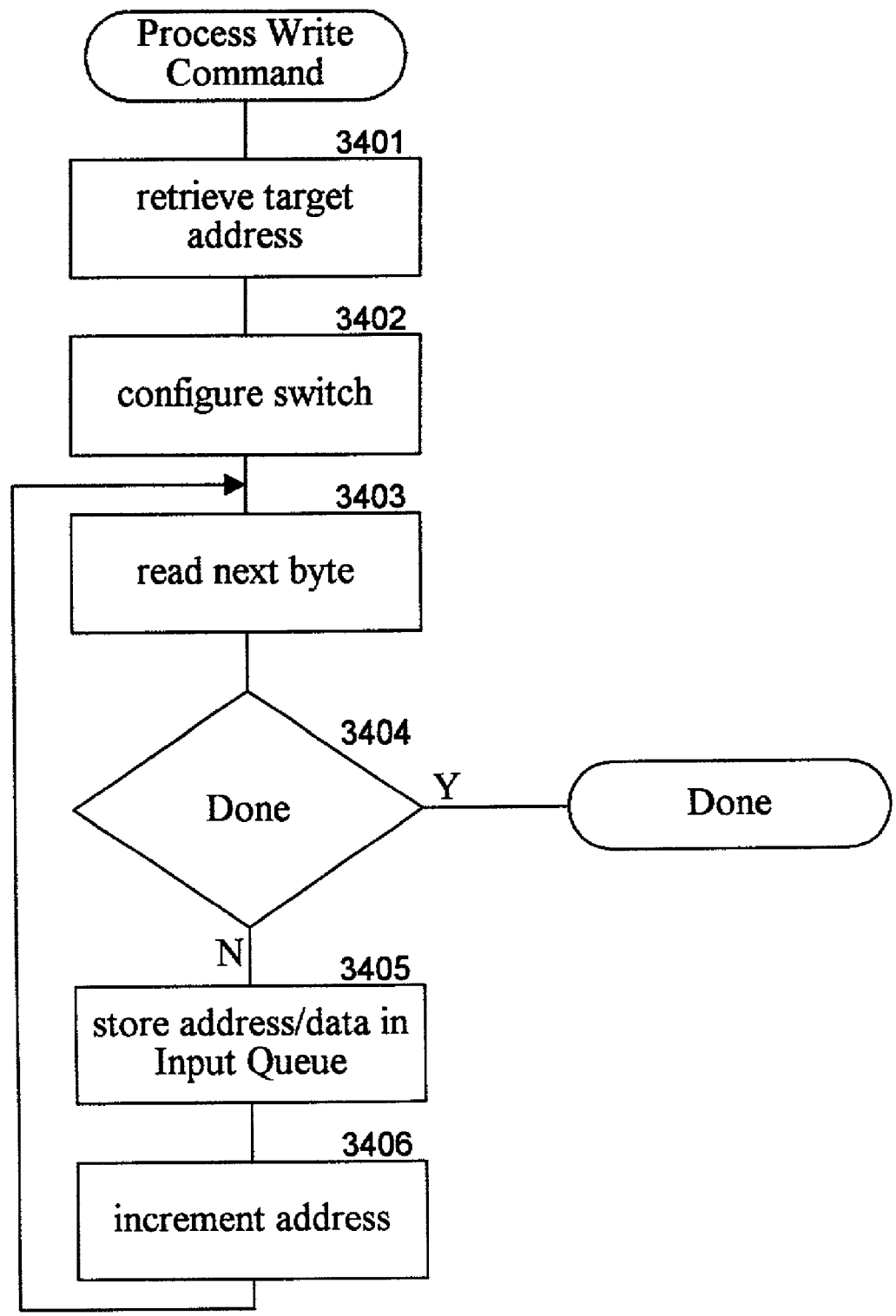
FIG. 34 is a logic diagram illustrating the processing of a write command by the access layer in one embodiment.

FIG. 34 is a logic diagram illustrating the processing of a write command by the access layer in one embodiment. In block 3401, the component retrieves the target address for the write command. In block 3402, the component requests the arbiter to configure the switch to connect the port with the appropriate memory bank. In block 3403, the component retrieves the next byte (i.e., code) from the transport layer. In decision block 3404, if all the bytes have already been retrieved, then the write is complete, else the component continues at block 3405. In block 3405, the component stores an entry into the input queue of the memory bank. The component may need to buffer multiple bytes depending on the width of the word. In block 3406, the component increments the address and then reads the next byte. One skilled in the art will appreciate that when time-division multiplexing is used, the component supplies the data to the input queue during its allotted time period.

Figure 35:
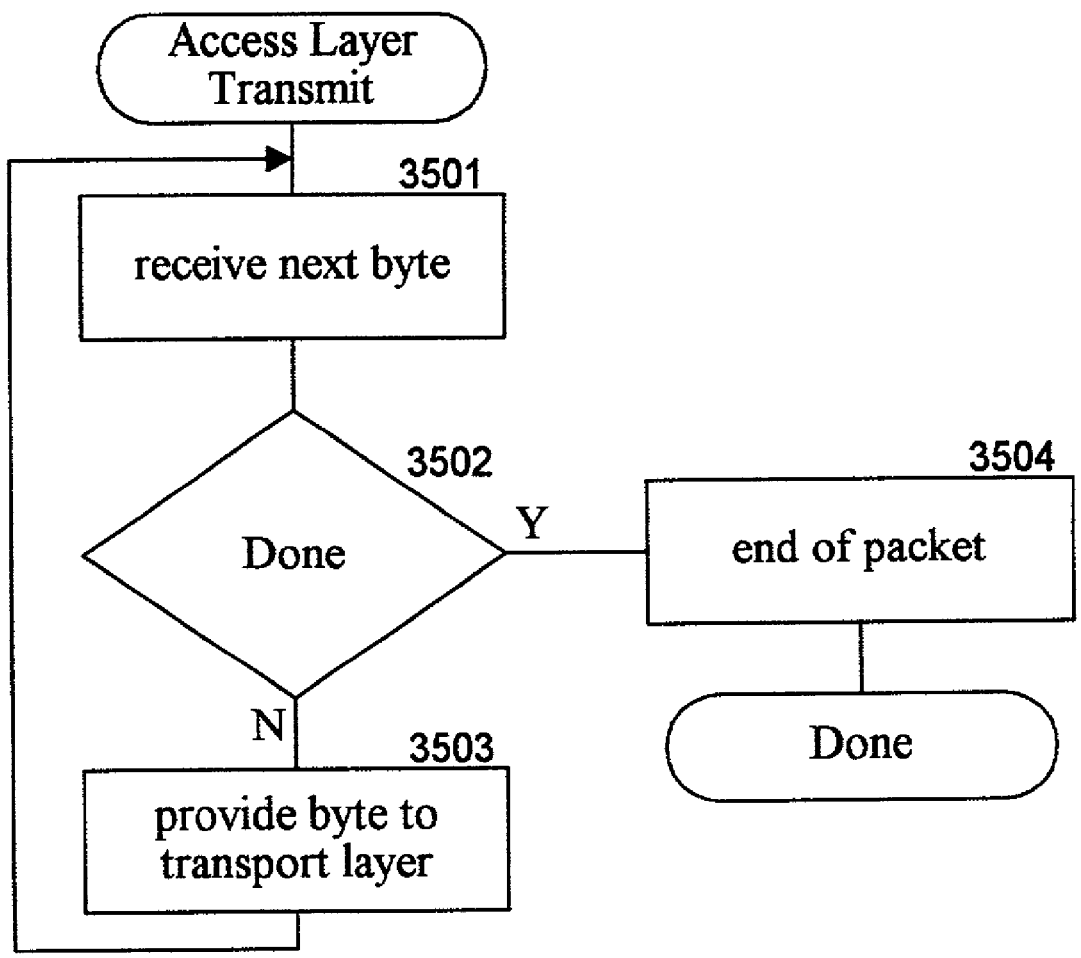
FIG. 35 is a logic diagram illustrating processing of the access layer when it is to provide data to the transport layer in one embodiment.

FIG. 35 is a logic diagram illustrating processing of the access layer when it is to provide data to the transport layer in one embodiment. In block 3501, the component receives the next byte from the switch. In decision block 3502, if all the bytes have already been received, then the component continues at block 3504, else the component continues at block 3503. In block 3503, the component provides the byte to the transport layer and then proceeds to receive the next byte. In block 3504, the access layer signals the end of the read to the transport layer.

2.1 Multisection Memory Banks

Figure 36:
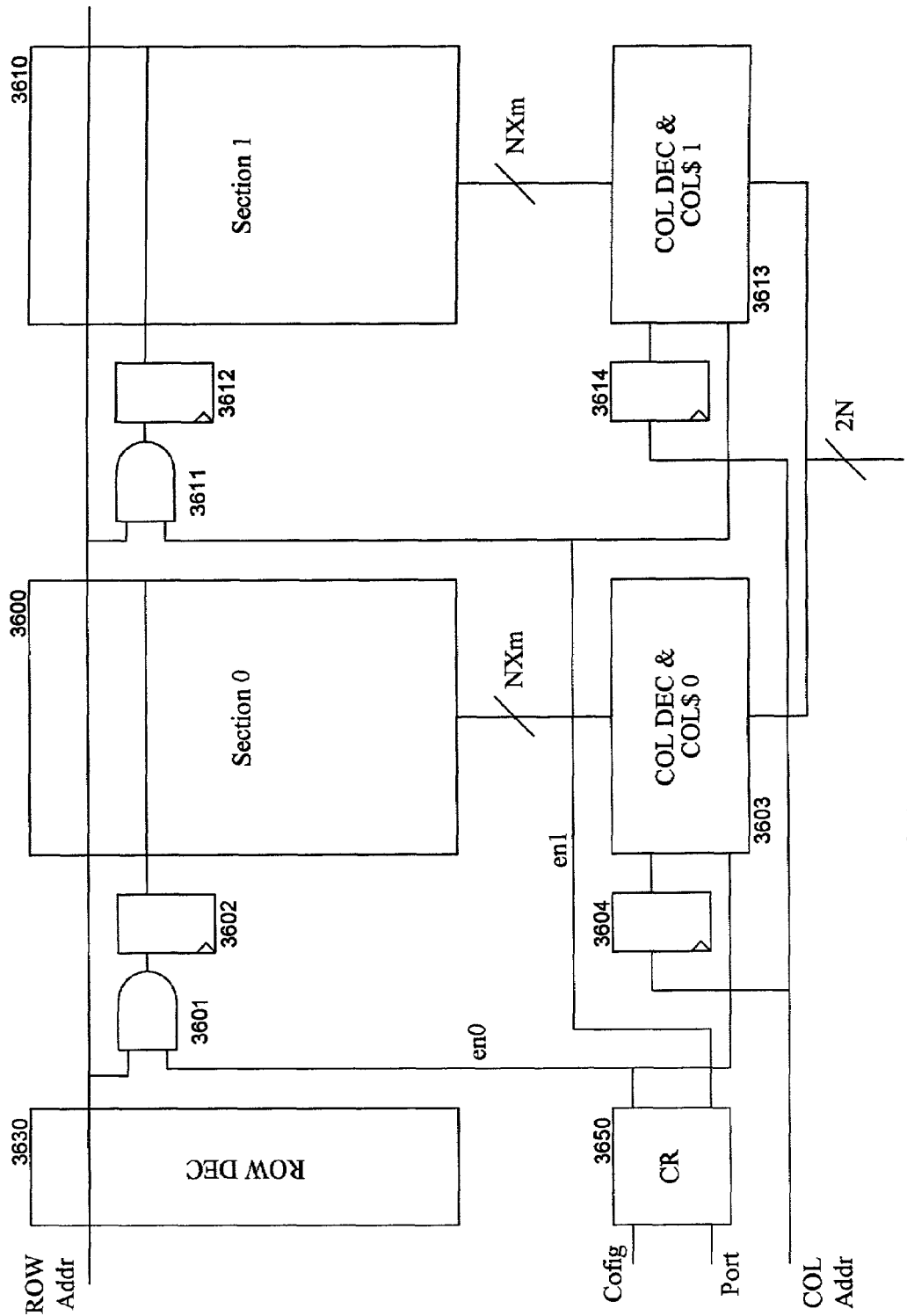
FIG. 36 is a block diagram of a multisection memory bank in one embodiment.

FIG. 36 is a block diagram of a multisection memory bank in one embodiment. A multisection memory bank can significantly reduce power consumption of a memory device. A multisection memory bank subdivides each row (or word) of data in a memory bank into multiple sections. The enabling of sections can be configured on a port-by-port basis. When a section is disabled, then the amount of power consumed by the memory bank during an access is much less than if the section was enabled. In this way, each port can specify only the needed sections which can result in a significant reduction in the power consumption because only the needed sections are enabled during access. The data for all the rows for each subdivision of a memory bank is stored in a section (or a page). For example, a memory bank may have a word width of 64 bits. Such a multisection memory bank may be divided into two sections of 32 bits each that can be accessed independently and simultaneously based on configurable parameters. If a host only needs a 32-bit word, then only one section needs to be enabled whenever that host accesses the memory bank.

As shown in FIG. 36, the multisection memory bank includes section 3600 and section 3610 each of which is 32 bits wide. Each wordline of each section includes an AND gate 3601, 3611 that is connected to a corresponding line of the row decoder 3630 and to a section enable line from configuration register 3650. The row decoder decodes the row portion of the address and enables the appropriate wordline when the corresponding section is enabled. For example, if the row portion of the address is eight bits, then the row decoder enables one of 256 wordlines. The AND gate enables the wordline for its section only when that section is enabled for the port. If a port only accesses section 3600, then whenever an access for the port is processed, section 3600 is enabled and section 3610 is disabled. Each wordline of each section may also include a sequence of latches 3602, 3612 for buffering signals. The number of latches needed depends on row access latency, column access latency, and desired level of simultaneous access. Each section also includes a column decoder and column cache 3603, 3613. The column decoder latches data into the column cache based on the column address provided by the sequence of latches 3104, 3114 for buffering column address. Because the wordlines are only enabled on a section-by-section basis and because retrieved data is only latched on a section-by-section basis, the power requirements of a multisection memory bank is lower than a memory bank that does not have multiple sections. When data is retrieved from a multisection memory bank, the valid field of the output queue indicates the divisions of the word that are valid. For example, if data is retrieved from only section 0, then the valid field may contain "10." If data is retrieved from both sections 0 and 1, then the valid field may contain "11." One skilled in the art will appreciate that a memory bank may be subdivided into a number of sections. Also, a multisection memory bank may simultaneously perform multiple access commands so long as the commands do not access the same wordline of the same section. Thus, the processing of a command to access wordline 10 of section 0 may overlap with the processing of a command to access wordline 11 of section 0. Also, the processing of a command to access wordline 10 of section 0 may be overlapped with the processing of a command to access wordline 10 of section 1. Thus, increasing the number of sections of a memory bank can increase the amount of parallel processing that can be performed.

2.2 Physical Layer DC-Balancing

In one embodiment, DC-balancing of the communications link is handled at the physical layer in memory link. The performing of DC-balancing at the physical layer can help reduce the cost and complexity of the link layer. To help ensure DC-balance, the physical layer uses a variable strength line driver that can drive a standard strength or increased strength 0-bit value or 1-bit value onto the communications link. When the running disparity is zero or positive (i.e., in the 1-direction) and a 1-bit value is to be transmitted, then a standard strength 1-bit value is driven. Similarly, when the running disparity is zero or negative (i.e., in the 0-direction) and a 0-bit value is to be transmitted, then a standard strength 0-bit value is driven. In contrast, when the running disparity is negative and a 1-bit value is to be transmitted, then an increased strength 1-bit value (i.e., a 1-bit voltage value) is driven. This increased strength 1-bit value tends to offset the effects of a negative running disparity. Similarly, when the running disparity is positive and a 0-bit value is to be transmitted, then an increased strength 0-bit value (i.e., a 0-bit voltage value) is driven. This increased strength 0-bit value tends to offset the effects of a positive running disparity. The use of a variable-strength line driver is especially useful in controlling DC-balance over short transmission distances. In such a case, physical layer DC-balancing can be used in lieu of link layer DC-balancing.

Figure 37A:
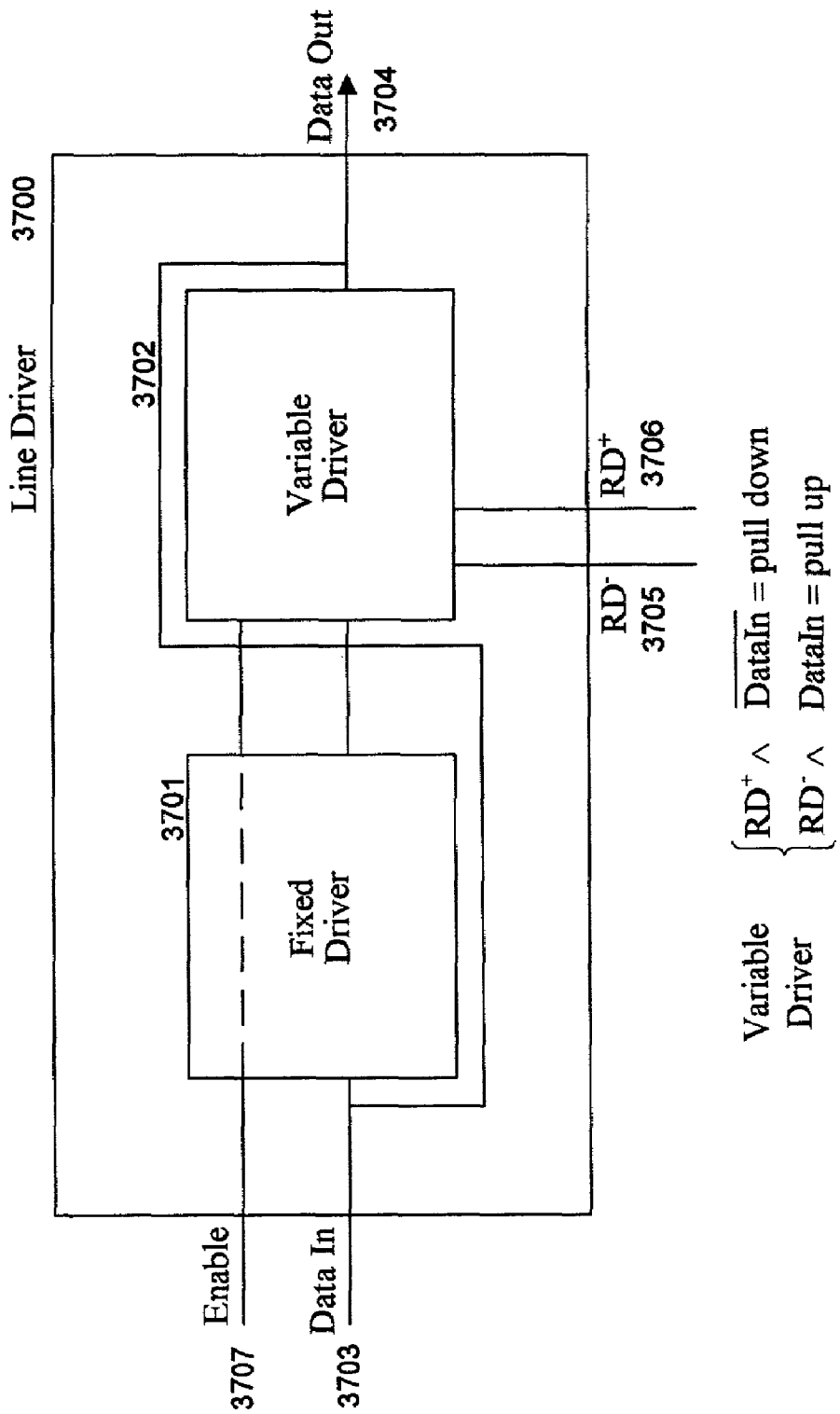
FIG. 37A is a block diagram illustrating a variable strength line driver in one embodiment.

FIG. 37A is a block diagram illustrating a variable strength line driver in one embodiment. A variable strength line driver 3700 includes a fixed-strength component (or portion) 3701 and a variable-strength component 3702. The variable-strength line driver has 4 inputs: data in 3703, negative running disparity signal (RD−) 3705, positive running disparity signal (RD+) 3706, and enable signal 3707. The variable-strength line driver has one output: data out 3704. The fixed-strength component outputs a standard strength 0-bit value or 1-bit value depending on data in. The variable-strength component pulls up, pulls down, or has no effect on data out, depending on the running disparity and data in. If the running disparity is positive and data in is a 0-bit value, then the variable-strength component pulls down data out. If the running disparity is negative and data in is a 1-bit value, then the variable-strength component pulls up data out. More generally, the running disparity signals may indicate when the running disparity is sufficiently negative or sufficiently positive to activate the variable-strength component.

Figure 37B:
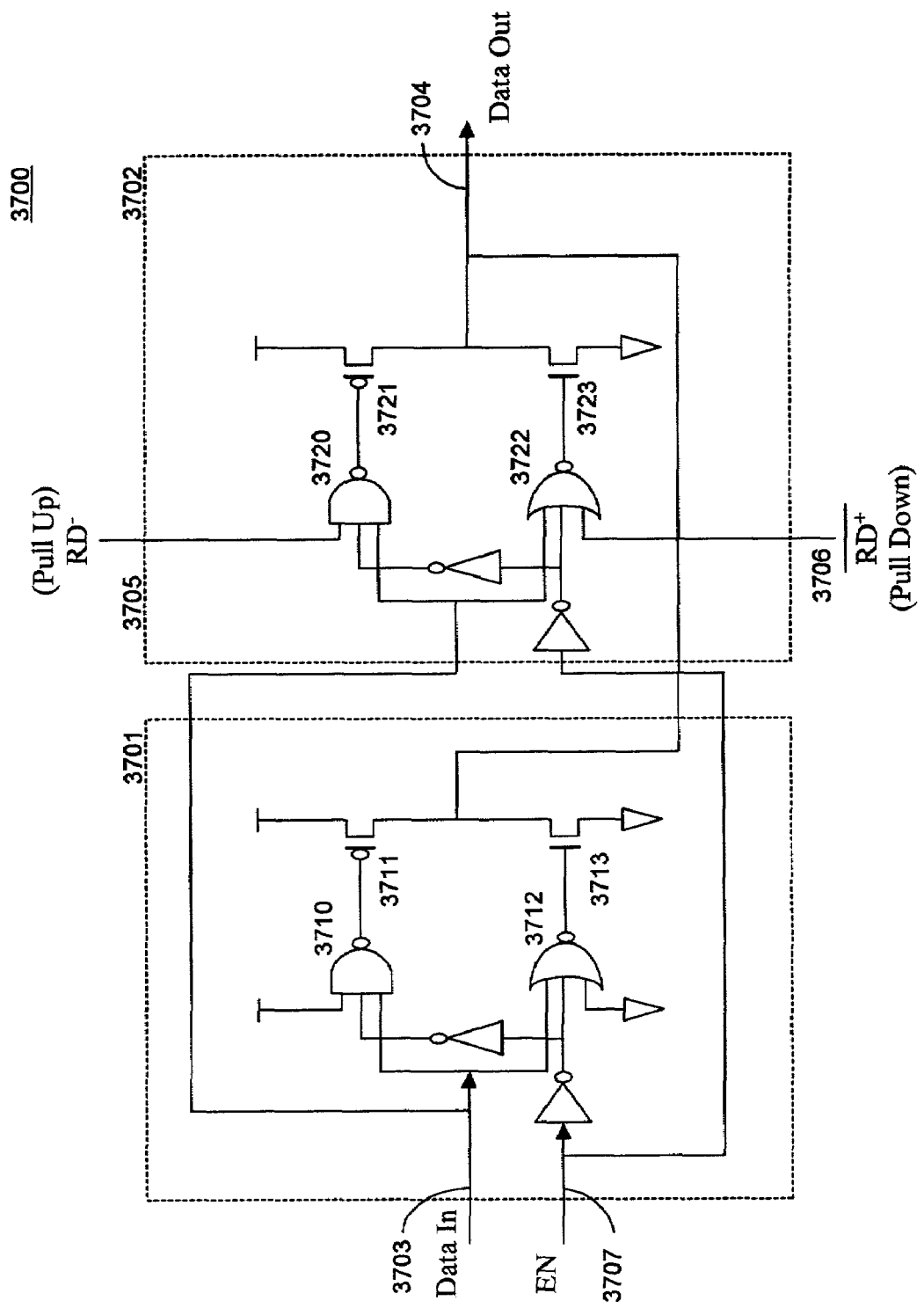
FIG. 37B is a block diagram illustrating the circuit of a variable-strength line driver in one embodiment.

FIG. 37B is a block diagram illustrating the circuit of a variable-strength line driver in one embodiment. The fixed-strength component 3701 and the variable-strength component 3702 employ the same logic to activate their pull-up and pull-down transistors. One skilled in the art will appreciate that the transistors may be selected to achieve the overall desired physical layer characteristics of the communications link. NAND gate 3710 is used to control pull-up transistor 3711, and NOR gate 3712 is used to control pull-down transistor 3713. When the data in is a 1-bit value and the driver is enabled, NAND gate 3710 outputs a 0, which turns on pull-up transistor 3711. When the data in is a 0-bit value and the driver is enabled, NOR gate 3712 outputs a 1, which turns on pull-down transistor 3713. The variable-strength component has similar control logic, except that pull-up transistor 3721 is activated only when the running disparity is negative and except that the pull-down transistor 3723 is activated only when the running disparity is positive.

3. Plesiosynchronous Clocking With Null Insertion/Removal

In one embodiment, the serial communications architecture specifies that NULL symbols or NULL primitives are inserted into or removed from a stream of symbols to account for variations in clock frequency between the transmitting and receiving communications nodes when using plesiosynchronous clocking. If a transmitting communications node transmits at a slightly higher frequency than the receiving communications node receives, then the receiving communications node traditionally needs to buffer the received symbols to handle such an overrun. For example, if both communications nodes use clocks with a frequency of 100 Hz with a maximum variation of 1%, then it is possible that the transmitting communications node transmits at 101

Hz and the receiving communications node receives at 99 Hz. In such a case, the receiving communications node will receive an extra 2 bits approximately every second, assuming 1 bit is transmitted every clock cycle. Receiving communications nodes typically have an elastic buffer for storing and aligning these extra bits on symbol boundaries. Similarly, an underrun occurs when a transmitting communications node transmits data at a slightly lower rate than the receiving communications node receivers. The handling of an underrun can also be costly and complex. These underrun and overrun conditions were typically handled at the link layer. These complexities and costs may, however, be avoided by the physical layer of a receiving communications node periodically inserting or removing NULL symbols or NULL primitives from the received stream of symbols at a rate sufficient to compensate for variations in clock frequencies.

Figure 38A:
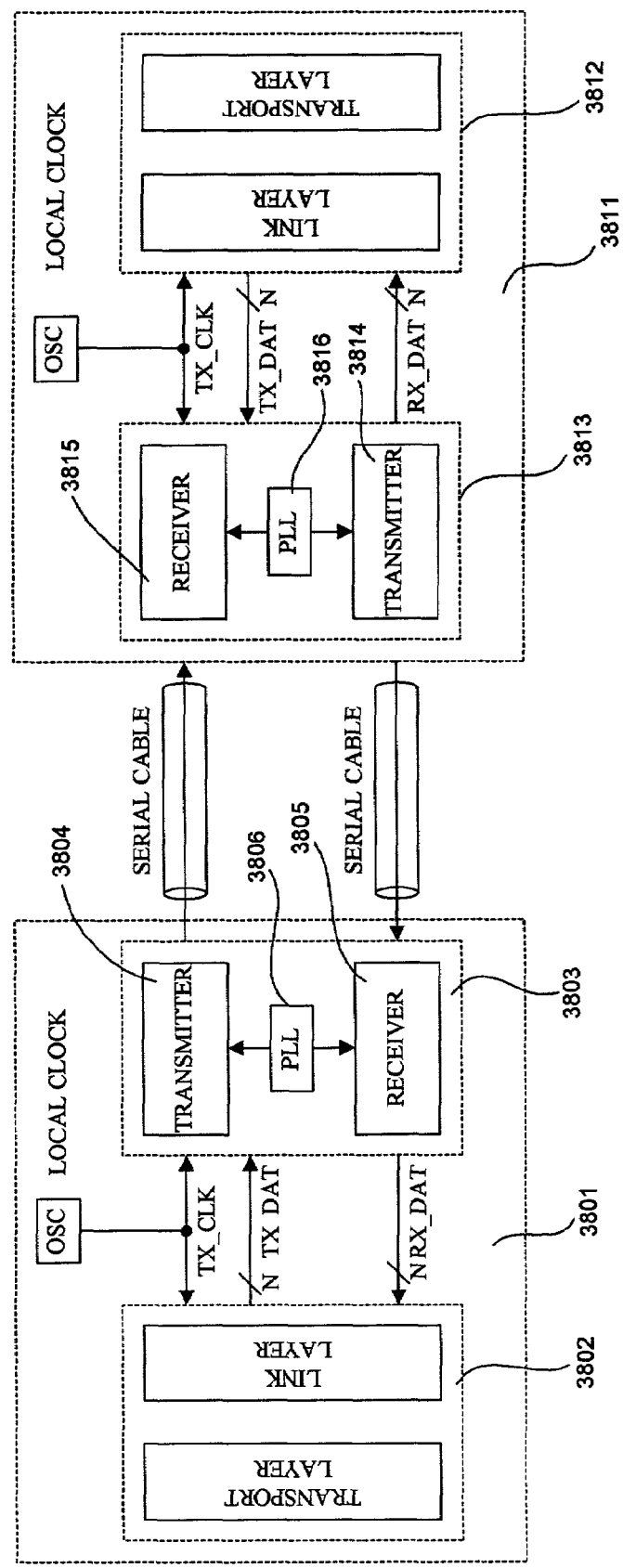
FIG. 38A is a block diagram of a plesiosynchronous communications system in one embodiment.

FIG. 38A is a block diagram of a plesiosynchronous communications system in one embodiment. Communications node 3801 and communications node 3811 are connected via a bidirectional serial link. The transport layer and the link layer 3802, 3812 may be implemented in a single digital ASIC chip with other interface logic such as PCI bus interface logic. The physical layer 3803 and 3813 may be built in a separated custom analog chip.

The link layer provides symbols (i.e., N-bit encoded data) to be transmitted to the physical layer via TX_DAT lines. The link layer is provided symbols received by the physical layer via the RX_DAT lines. In one embodiment, the TX_DAT and RX_DAT lines are both synchronized to the local clock, and the setup/hold time relation between TX_DAT and RX_DAT are the same to setup/hold time relationship to the local clock. Both the transmitter 3804, 3814 and receiver 3805, 3815 of the physical layer share the same phase lock loop ("PLL") 3806, 3816. This overall architecture is described in U.S. Pat. No. 6,229,859, entitled "System and Method for High-Speed, Synchronized Data Communication."

Figure 38B:
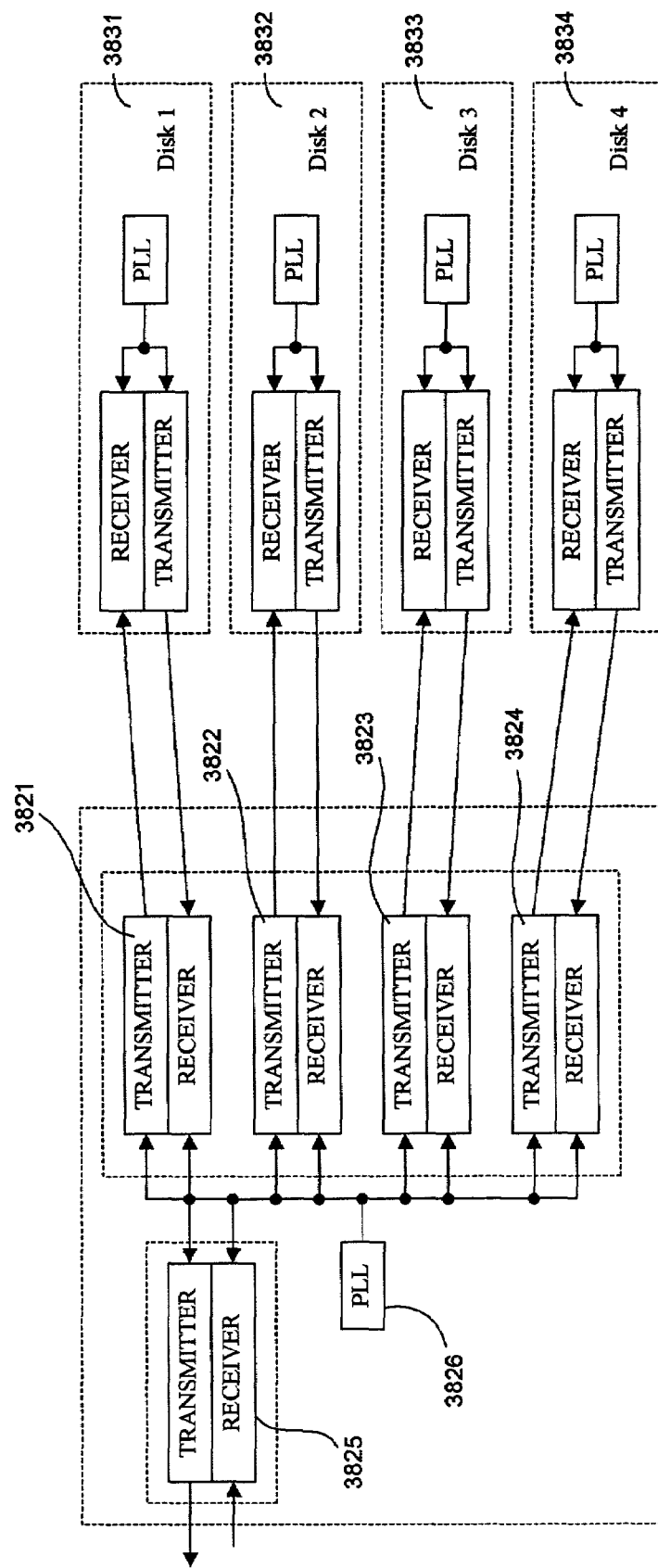
FIG. 38B is a block diagram illustrating a switch supporting multiple data store devices in one embodiment.

FIG. 38B is a block diagram illustrating a switch supporting multiple data store devices in one embodiment. The switch 3820 has 5 ports 3821-3825. Ports 3821-3824 are shown connected to disk drives 3831-3834. The switch has one phase lock loop 3826 that is shared by all the ports. Since all the ports of the switch are synchronized to the same clock, the data can be freely (without buffering) transferred between ports. (See discussion below on asynchronous clock boundaries.)

Figure 39A:
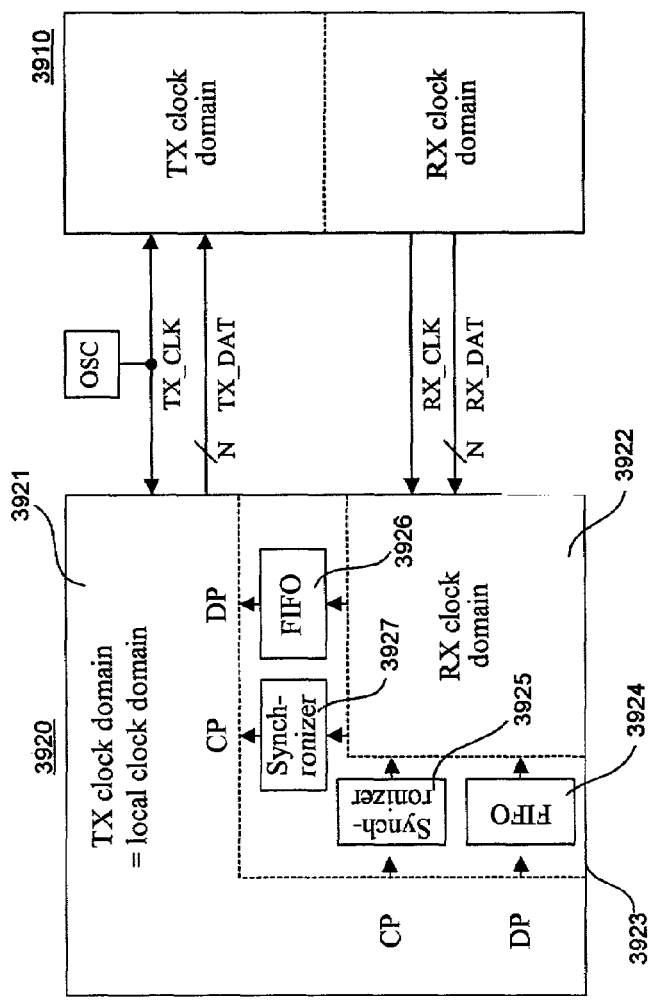
FIG. 39A is a block diagram illustrating a prior art synchronous clocking system.

FIG. 39A is a block diagram illustrating a prior art synchronous clocking system. In this synchronous clocking system, the RX_DAT lines provided to the link layer 3920 are synchronized not to the local clock, but to the RX_CLK line provided by the physical layer. The RX_CLK line provides a clock that has been recovered from the incoming bit stream, which is synchronized to the transmitter's clock. The receiver may recover the clock from a clock signal on a separate line or from the stream of data bits transmitted by the transmitter. In the link layer, there are two clock domains, the TX clock domain 3921 that is the same as the local clock domain, and the RX clock domain 3922 that is the same as the transmitter's clock domain. Consequently, an asynchronous clock boundary 3923 is formed between the TX clock domain and the RX clock domain. When information is transferred from the TX clock domain to the RX clock domain, the FIFO 3924 is used for the data and flip-flop synchronizer 3925 is used for the control information. When information is transferred from the RX clock domain to the TX clock domain, the FIFO 3926 is used for the data and the flip-flop synchronizer 3927 is used for the control information.

Figure 39B:
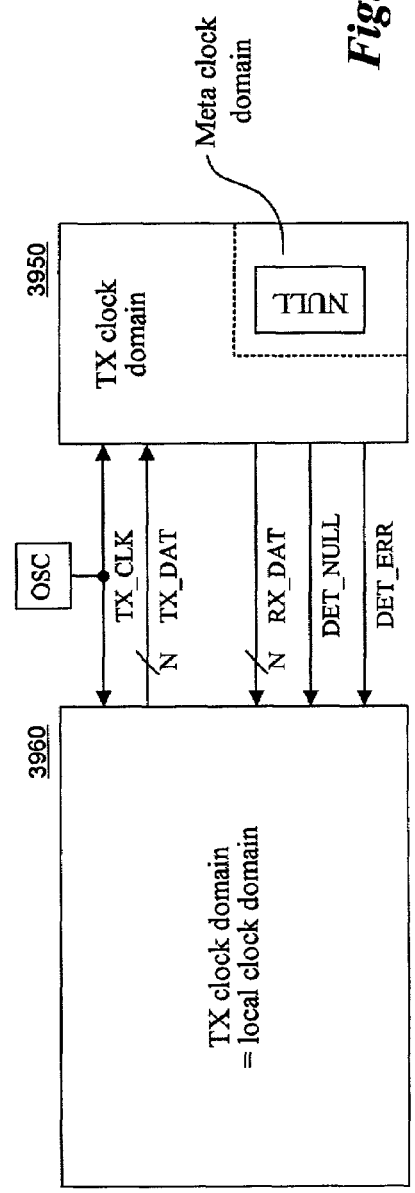
FIG. 39B is a block diagram illustrating resolution of an asynchronous clock boundary in the physical layer in one embodiment.

FIG. 39B is a block diagram illustrating resolution of an asynchronous clock boundary in the physical layer in one embodiment. The clock and data recover ("CDR") processing of the physical layer 3950 provides to the link layer RX_DAT lines that are synchronized to the local clock. Thus, the asynchronous boundary at the link layer along with the needed logic to resolve the boundary is avoided in the link layer. The CDR processing also provides a 1-bit control signal (DET_NULL) that indicates a NULL symbol is provided in RX_DAT (i.e., to inform the link layer that a primitive has been received) and a 1-bit control signal (DET_ERR) that indicates an error in the physical layer data recovery.

Figure 40:
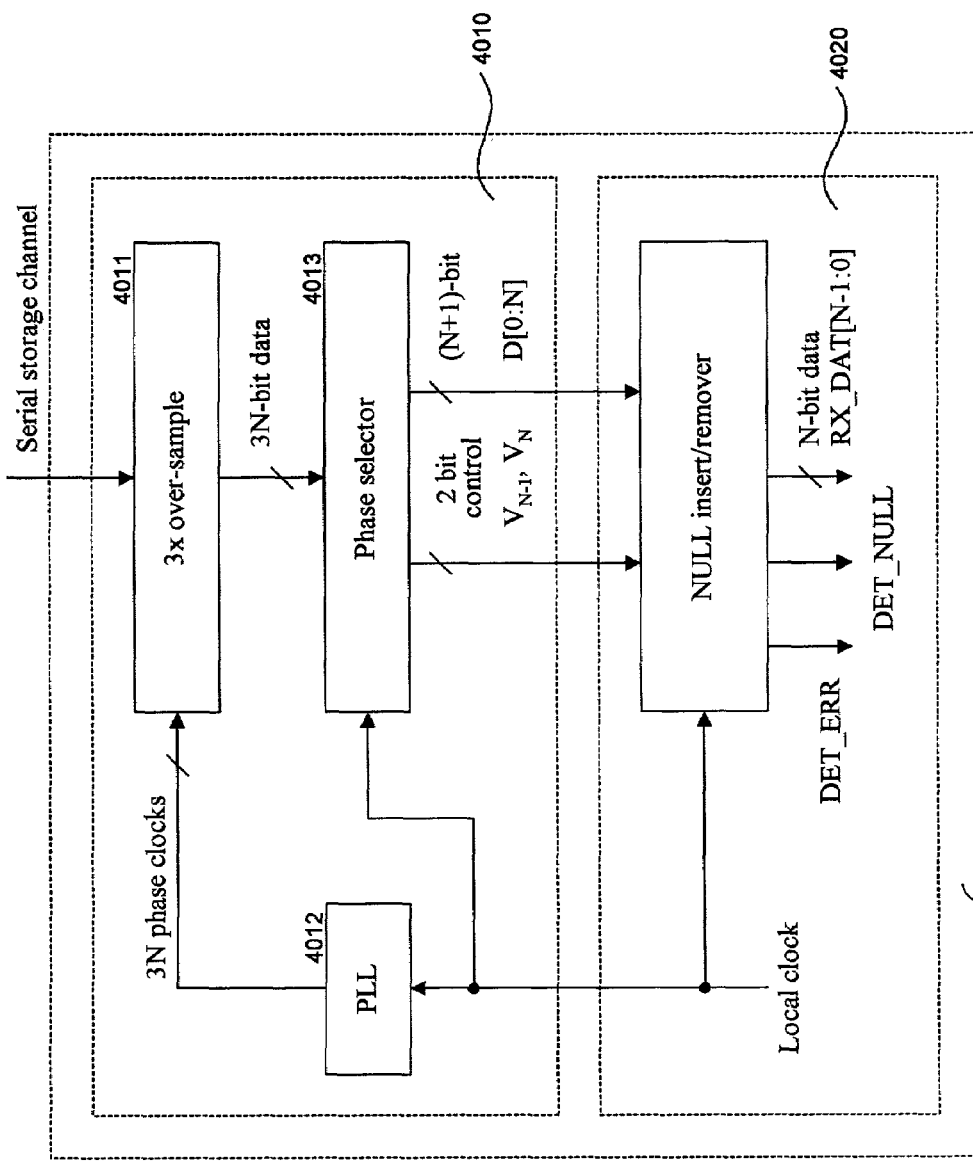
FIG. 40 is a block diagram illustrating NULL insertion and deletion at the physical layer in one embodiment.

FIG. 40 is a block diagram illustrating NULL insertion and deletion at the physical layer in one embodiment. Sampler 4010 in one embodiment corresponds to the over sampler 4011, digital phase lock loop 4012, and phase selector 4013 described in U.S. Pat. No. 6,229,859, entitled "System and Method for High-Speed, Synchronized Data Communication." The sampler outputs N+1 bits (where N is the number of bits in a symbol) of data lines D[0: N] and two valid bits V[N−1] and V[N]. The sampler identifies a stream of data bits that are received and provides those data bits in data lines D[0: N]. The valid bits indicate whether D[N−1] and D[N] contain valid data (e.g., V[N−1]=1 indicates that D[N−1] is valid). The data bits provided by the sampler are not, however, frame (i.e., symbol) aligned; that is, D[0] is not necessarily (and more often than not would not be) the first bit in a symbol. The valid bits indicate whether an overrun or underrun condition has occurred. An overrun occurs as a result of the transmitter's clock frequency being faster than the receiver's, and an underrun occurs as a result of the transmitter's clock frequency being slower than the receiver's. Nominally, N data bits are provided by the sampler every sample interval. In such a case D[N−1] is valid, but D[N] is invalid. If, however, there is an overrun, then the sampler provides N+1 data bits; that is, D[N−1] and D[N] are both valid. If there is an underrun, then the sampler provides N−1 data bits; that is, D[N−1] and D[N] are both invalid. The data bits and the valid bits are supplied to a frame aligner 4020. The frame aligner not only aligns the frames, but also inserts and removes NULL symbols to adjust for variations in the transmitting and receiving clock frequencies.

Figure 41:
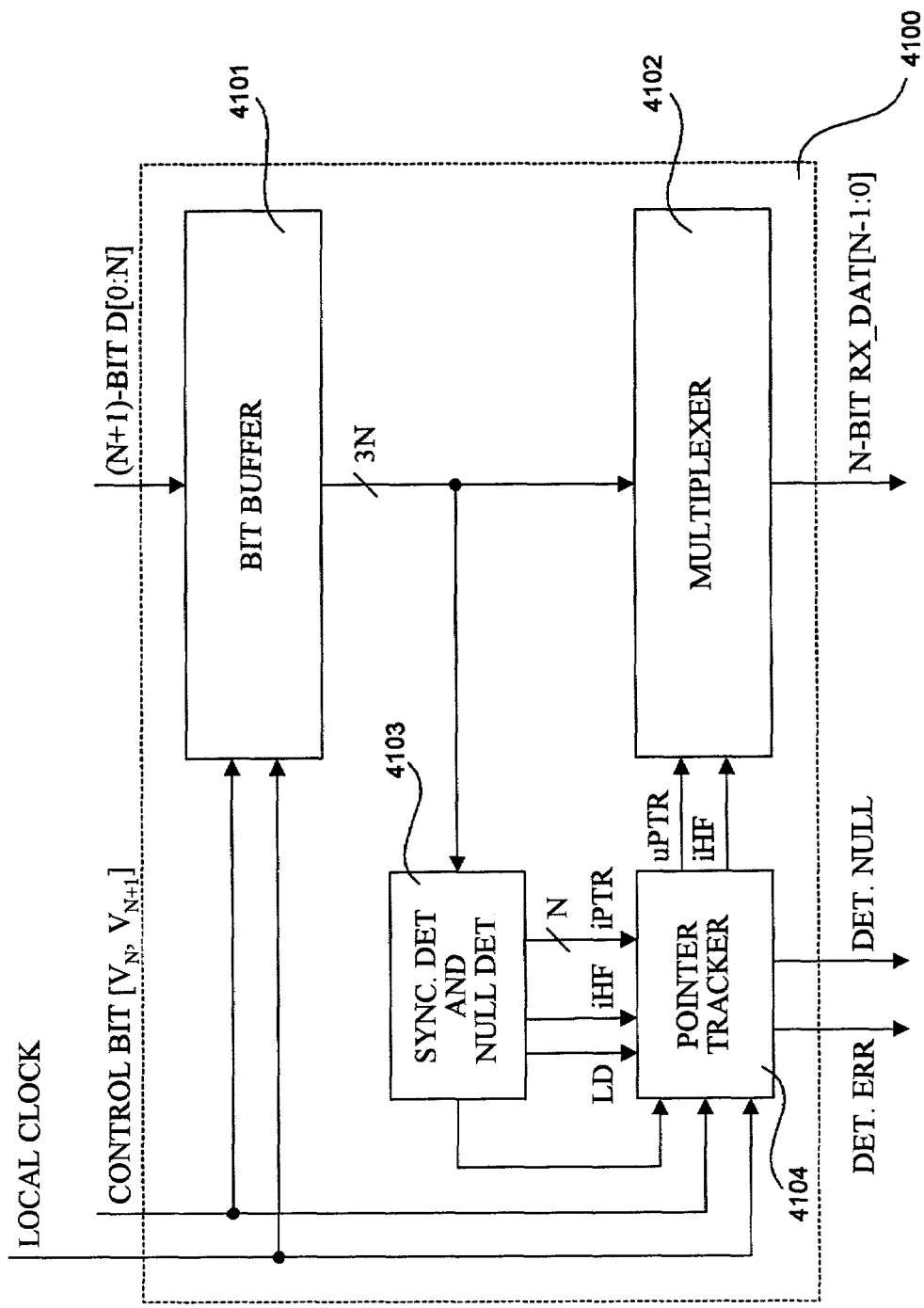
FIG. 41 is a block diagram illustrating the frame aligner in one embodiment.

FIG. 41 is a block diagram illustrating the frame aligner in one embodiment. The frame aligner 4100 includes bit buffer 4101, sync and null detector 4103, symbol pointer tracker 4104, and multiplexer 4102. The bit buffer stores the last 27 bits (e.g., 3×N) received as provided by D[0:9], assuming that a symbol includes 9 bits. The bit buffer is organized into three buffers or regions (i.e., A, B, and C) of 9 bits each. The sync and null detector scans the bit buffer to detect whether it contains a NULL primitive and, in particular, a synchronization primitive. If a synchronization primitive is detected, it signals the symbol pointer tracker to align itself on the synchronization primitive. The sync and null detector also signals the symbol pointer tracker whether a NULL symbol should be inserted or removed from the symbol stream. The symbol tracker pointer tracks the symbol alignment over time.

The sync and null detector provides a 1-bit load data signal ("LD"), a 1-bit last half signal ("iHF"), and a 9-bit synchronization symbol pointer ("iPTR") to the symbol pointer tracker. The LD signal indicates that a synchronization symbol has been detected. The iHF signal indicates whether the synchronization symbol starts in the first or last half of one of the 9-bit buffers of the bit buffer. The iPTR signal indicates a bit position of the start of the synchronization primitive in the bit buffer.

The symbol pointer tracker provides 1-bit null selection signal ("uHF") and 9-bit start-of-symbol pointer ("uPTR") to the multiplexer. The uHF signal indicates whether to insert a NULL symbol into the stream of symbols, and the uPTR signal indicates the start bit position of a symbol. The symbol pointer tracker also provides 1-bit error signal ("DET.ERR") and 1-bit null signal ("DET.NULL") to the link layer. The multiplexer provides the 9-bit RX_DAT to the link layer.

Figure 42A:
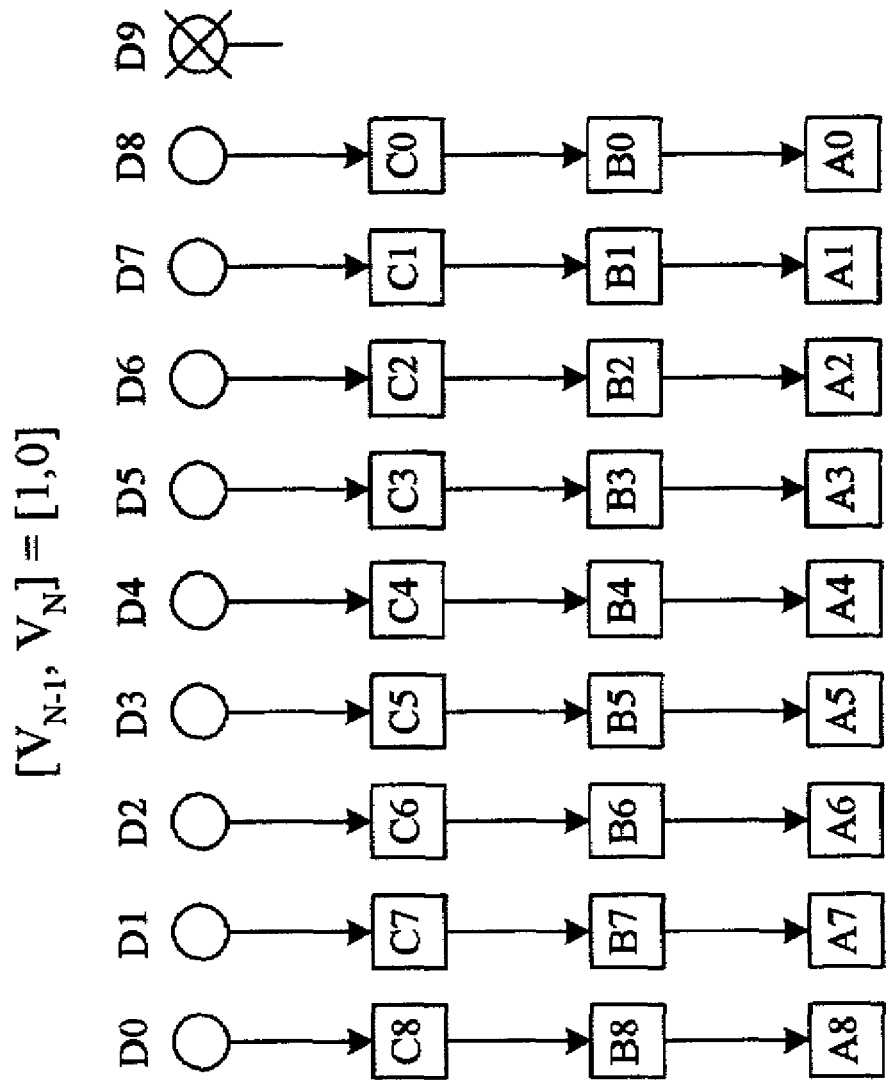
FIGS. 42A, 42B, and 42C illustrate the loading of the bit buffer in one embodiment.
Figure 42B:
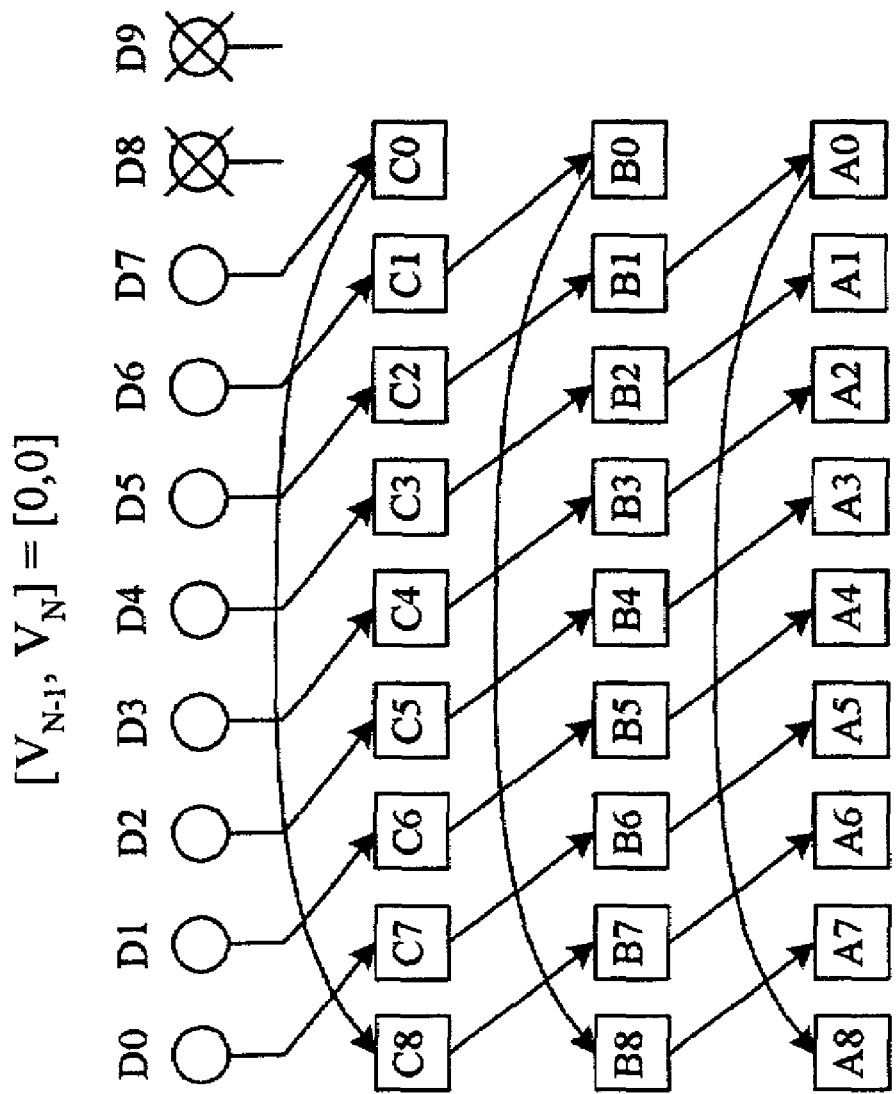
Figure 42C:
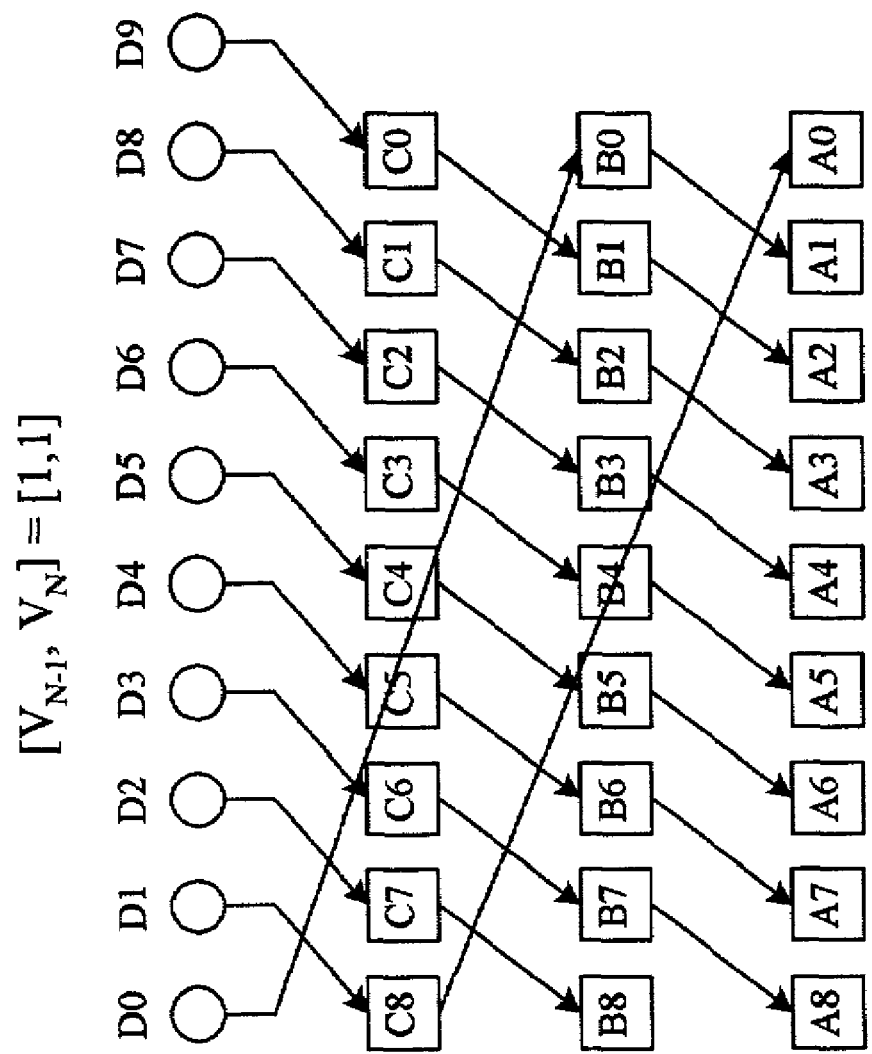

FIGS. 42A, 42B, and 42C illustrate the loading of the bit buffer in one embodiment. The bit buffer contains three 9-bit buffers A[8:0], B[8:0], and C[8:0]. When the valid bits V[8:9] indicate that only D[8] is valid (i.e., V[8:9]="10" a normal condition), then all the data in the bit buffer is rotated 9 bits to the left. In other words, the data from B[8:0] is transferred to A[8:0], the data from C[8:0] is transferred to B[8:0], and the data from D[0:8] is transferred to C[8:0] as indicated by FIG. 42A. When the valid bits V[8:9] indicate that neither D[8] or D[9] is valid (i.e., V[8:9]="00" an underrun condition), then the data in the bit buffer is rotated 8 bits to the left. In other words, A[0] is transferred to A[8], B[8:1] is transferred to A[7:0], B[0] is transferred to B[8], C[8:1] is transferred to B[7:0], C[0] is to C[8], and D[0:7] is transferred to C[7:0] as illustrated by FIG. 42B. When the valid data V[8:9] indicates that both D[8] and D[9] are valid (i.e., V[8:9]="11" an overrun condition), then the data in the bit buffer is rotated 10 bits to the left. In other words, B[7:0] is transferred to A[8:1], C[8] is transferred to A[0], C[7:0] is transferred B[8:1], D[0] is transferred to B[0], and D[1:9] is transferred to C[8:0] as illustrated by FIG. 42C.

Figure 43:
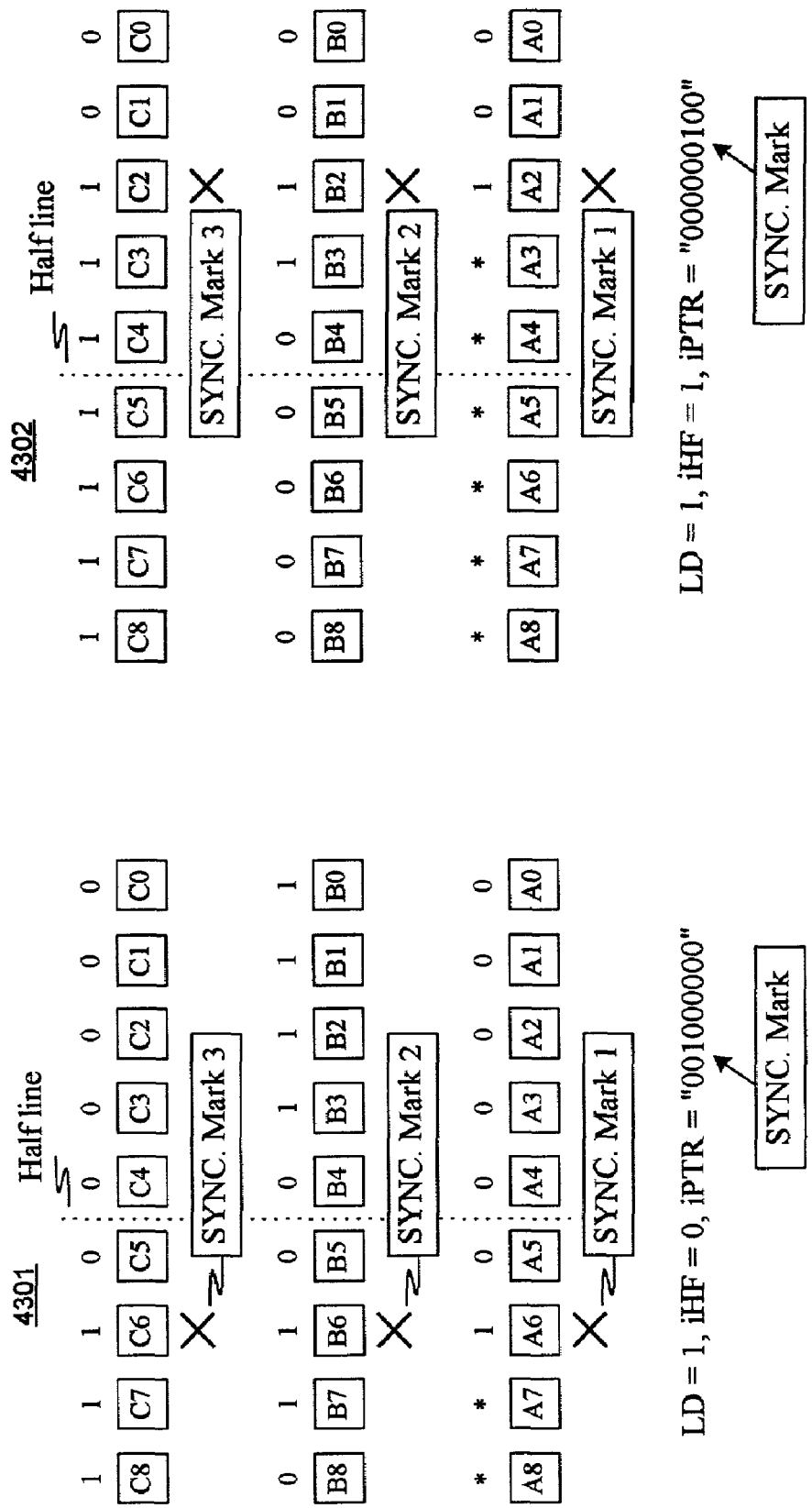
FIG. 43 is a diagram illustrating the detection of a synchronization primitive by the sync and null detector in one embodiment.

FIG. 43 is a diagram illustrating the detection of a synchronization primitive by the sync and null detector in one embodiment. Assuming that the synchronization detection mode is falling edge, the detector determines whether there are only three falling edges in the bit buffer and whether they are 9 bits apart. If so, the detector sets the LD signal to 1, else the detector sets the LD signal to 0. If the falling edges are in the first half of the bit buffer (e.g., A[8:5]), then the detector sets the iHF signal to 0, else the detector sets the iHF signal to 1. The detector also sets the iPTR signals to indicate the position of the falling edge that starts the synchronization symbols, which indicate the start bit position of the synchronization symbol. In this example, the bit buffer 4301 contains the synchronization primitive "100000001-100111111" starting at A[6] and a portion of that synchronization primitive starts at C[6]. If A[8:7] contained a falling edge from a non-synchronization symbol, then when the next symbol of the second synchronization primitive is received from the sampler, the bit buffer would be guaranteed to contain only three falling edges. The bit buffer 4302 contains the same synchronization primitives.

Figure 44:
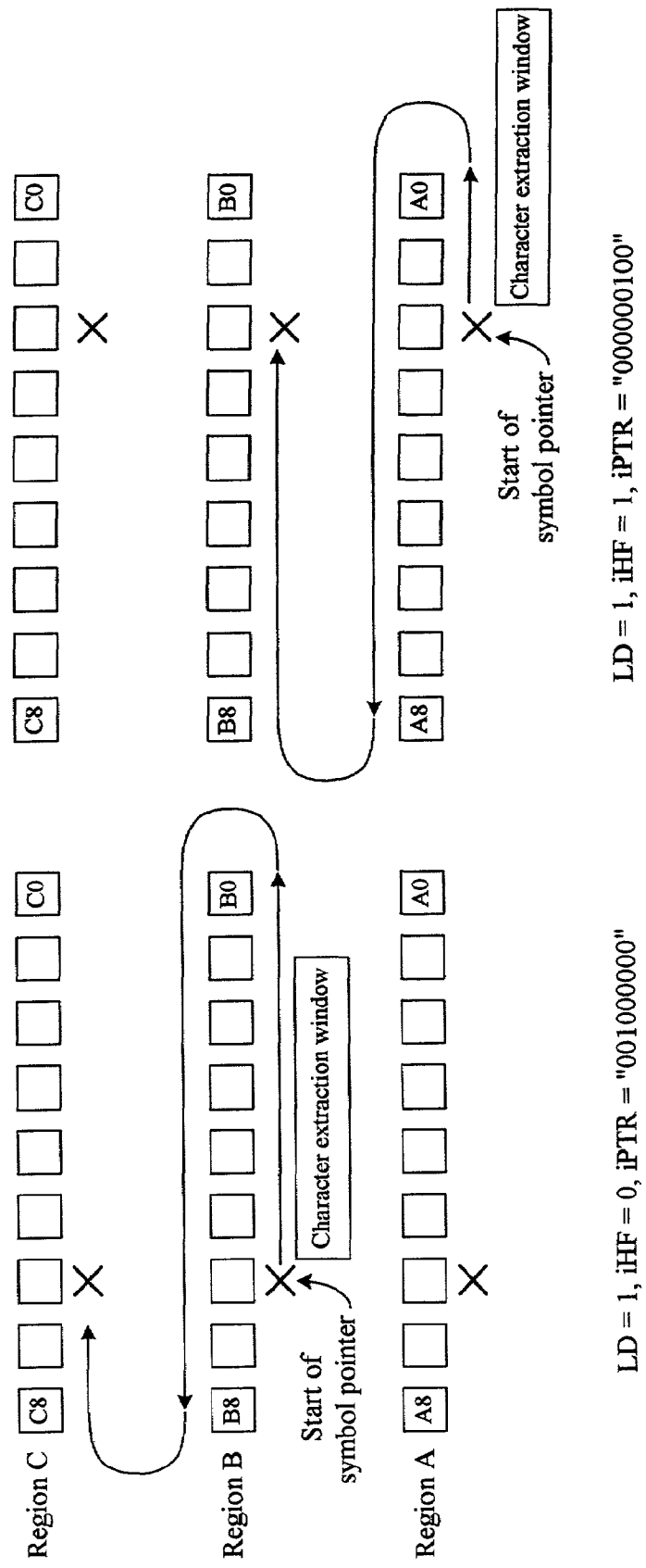
FIG. 44 is a diagram illustrating the portion of the bit buffer that contains the next symbol to be extracted in one embodiment.

FIG. 44 is a diagram illustrating the portion of the bit buffer that contains the next symbol to be extracted in one embodiment. If the start of a symbol is in the first half of a region of the bit buffer (i.e., A[8:5]), then the symbol is extracted starting in the B region of the bit buffer and proceeding to the C region. If the start of a symbol is in the last half of a region of the bit buffer (i.e., A[4:0]), then the symbol is extracted starting in the A region of the bit buffer and proceeding to the B region.

Figure 45:
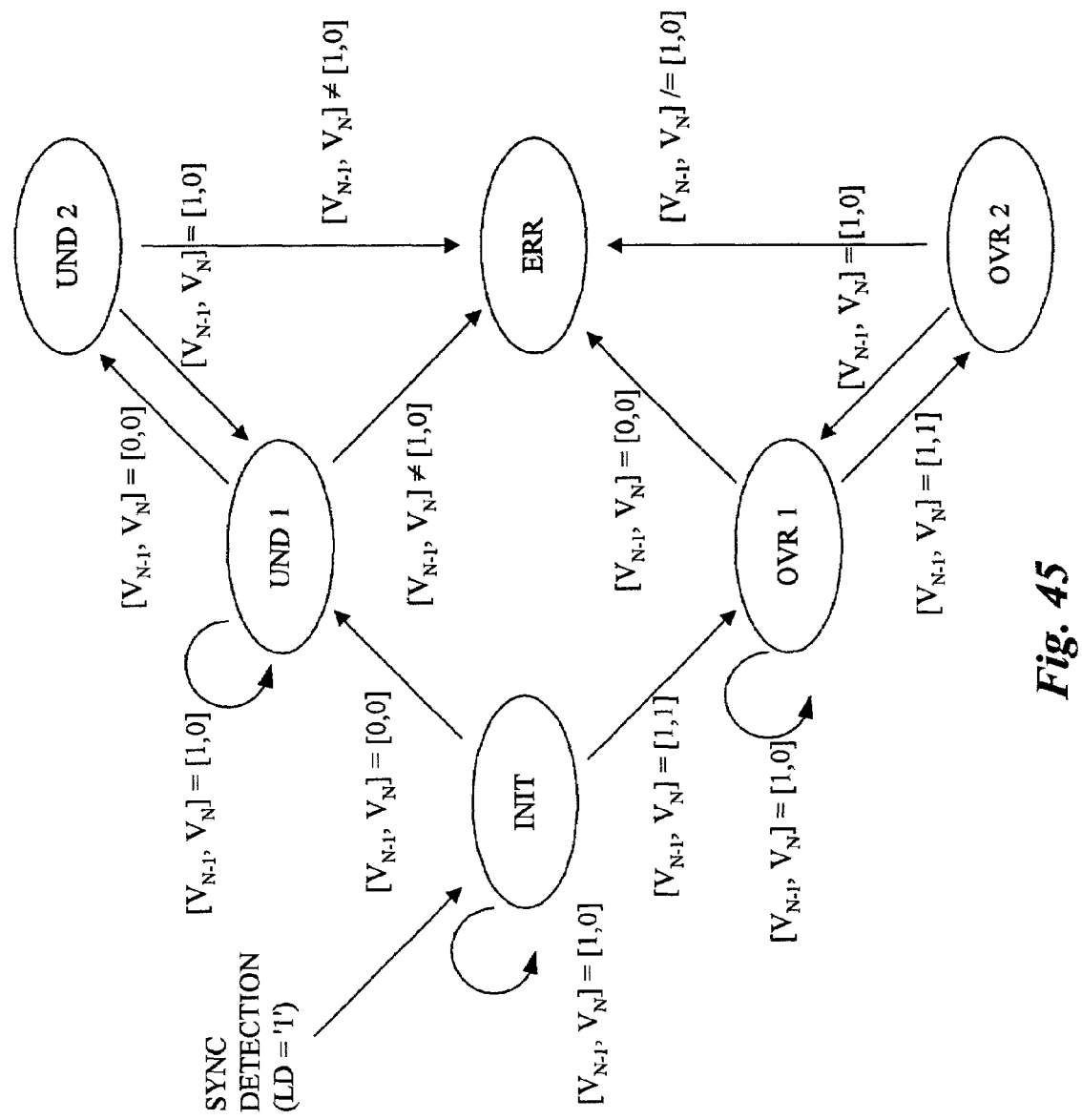
FIG. 45 is a state diagram of the symbol pointer tracker in one embodiment.

FIG. 45 is a state diagram of the symbol pointer tracker in one embodiment. The symbol pointer tracker tracks the start position of a symbol (e.g., frame) based on the start position of a synchronization symbol and the valid bits (e.g., V[8:9]) provided by the sampler. The symbol pointer tracker enters an initial state ("INIT") whenever the LD signal of the sync and null detector indicates that a synchronization symbol has been detected. The tracker stays in that initial state so long as the frame aligner is provided with 9 valid bits (i.e., N valid bits) at a time (i.e., V[8:9]="10" a normal condition). If the frame aligner is provided with 10 valid bits (i.e., V[8:9]="11" an overrun condition), then the tracker enters a first overrun state ("OVR1"), which means that the transmitter's clock frequency is faster than the receiver's clock frequency. The tracker stays in the first overrun state so long as the frame aligner is provided with 9 valid bits at a time. If the frame aligner is provided with 10 valid bits, then the tracker enters the second overrun state ("OVR2") from the first overrun state. If the frame aligner is provided with 8 valid bits, then an error has occurred (e.g., 10 bits valid followed by 8 bits valid) and enters an error state from the first overrun state. The tracker exits the second overrun state when the next bits are provided to the frame aligner. If the tracker is provided with 9 valid bits, then the tracker returns to the first overrun state, else the tracker enters an error state. Once an overrun is detected, the tracker thus expects to receive only 9 or 10 valid bits at a time and does not expect to receive two sets of 10 valid bits in a row. The receiving of two sets of 10 valid bits in a row would indicate that the transmitter's clock frequency is too high to be compensated for by the receiver. The receiving of 8 bits in an overrun state indicates that the transmitter's clock frequency now appears to be slower, which means some sort of error has occurred. The first underrun state ("UND1") and the second underrun state ("UND2") are entered in a manner that is analogous to entry into the overrun states.

When the tracker detects an LD signal of 1, it sets the start-of-symbol pointer to the start of the synchronization symbol as indicated by the iPTR lines and enters the initial state. It then sets the extraction region for the start-of-symbol pointer to A if the iHF signal is 1 and to B if the iHF signal is 0. The extraction region indicates the region that contains the first bit of the next symbol to be extracted. When the tracker detects an LD signal of 0, it moves the start-of-symbol pointer either backward or forward, depending on whether the tracker transitions to an overrun state as a result of receiving 10 bits or transitions to an underrun state as a result of receiving 8 bits.

Figure 46:
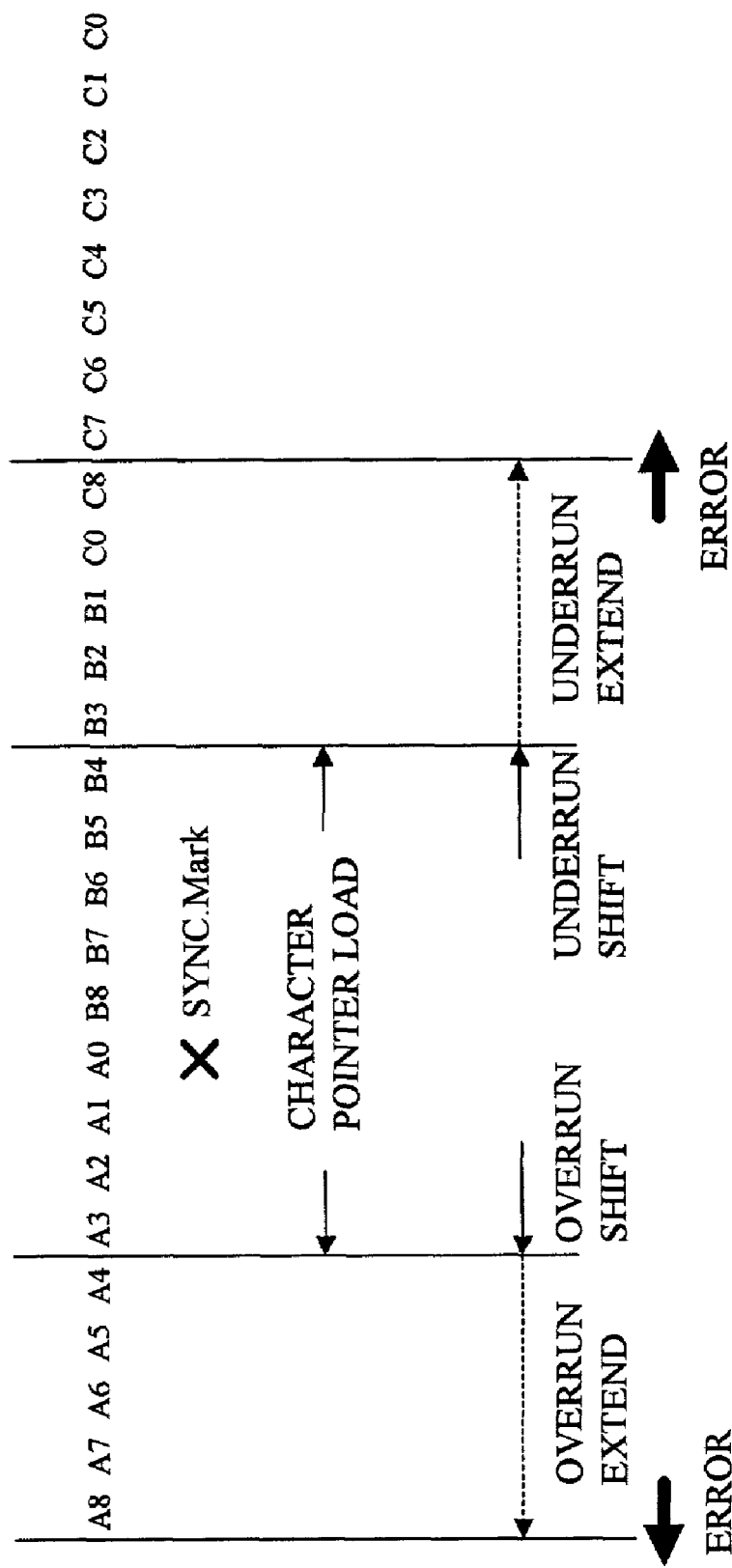
FIG. 46 is a diagram illustrating movement of the start-of-symbol pointer due to overrun or underrun in one embodiment.

FIG. 46 is a diagram illustrating movement of the start-of-symbol pointer due to overrun or underrun in one embodiment. When a synchronization symbol is detected (i.e., LD=1), then the start-of-symbol pointer is somewhere within the range of A[3]: B[4]. If the transmitter's local clock frequency is slightly slower than the receiver's local clock frequency (i.e., a potential underrun condition), the tracker moves the pointer forward to the C region. When the pointer is moved into the underrun extend region (e.g., B[3]: C[8]) and a NULL symbol is detected, then the tracker moves the start-of-symbol pointer backward 9 bit positions (i.e., 1 symbol position) and inserts a NULL symbol at the start-of-symbol pointer. This insertion of the NULL symbol compensates for the underrun by adding an extra symbol to the received stream. In one embodiment, a NULL symbol can be any symbol of any primitive, that is, control or synchronization. Similarly, if the transmitter's local clock frequency is slightly faster than the receiver's local clock frequency (i.e., a potential overrun condition), the tracker moves the start-of-symbol pointer backward toward the A region. When the pointer is moved into the overrun extend region (i.e., A[8:4]) and a NULL symbol is detected, then the tracker moves the pointer forward 9 bits, which effectively removes the NULL symbol. The removal of the NULL symbol compensates for the overrun. One skilled in the art will appreciate that the size of the overrun and the underrun extend regions can be adjusted based on the maximum possible differences in clock frequencies between the transmitter and receiver and the guarantee frequency at which a NULL primitive is to be transmitted.

Figure 47A:
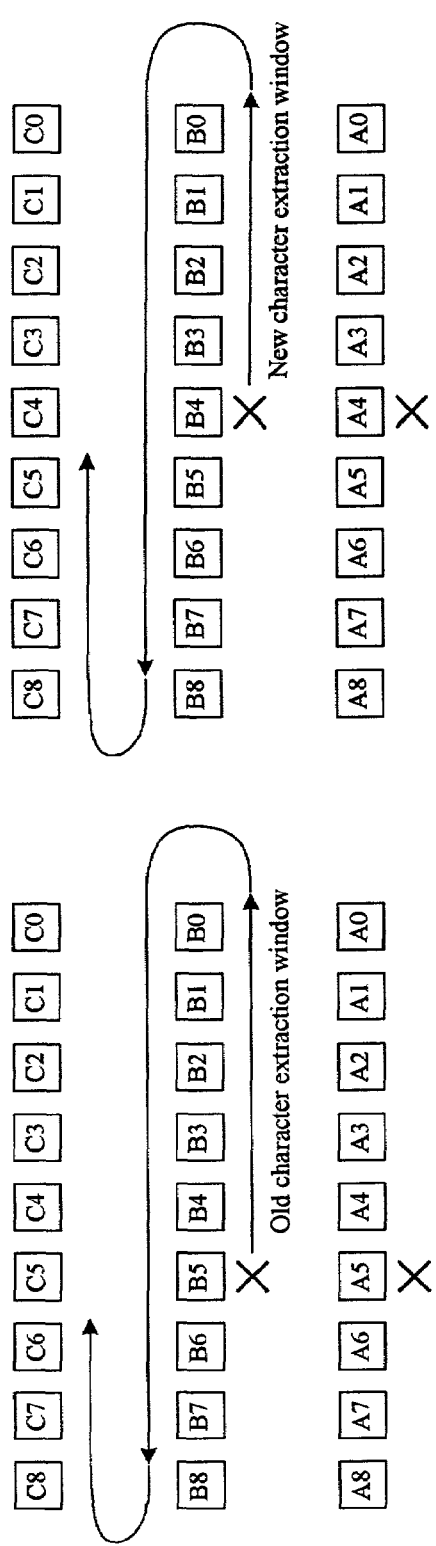
FIGS. 47A and 47B are diagrams illustrating NULL detection while the start-of-symbol pointer is not within the overrun or underrun extend regions in one embodiment.
Figure 47B:
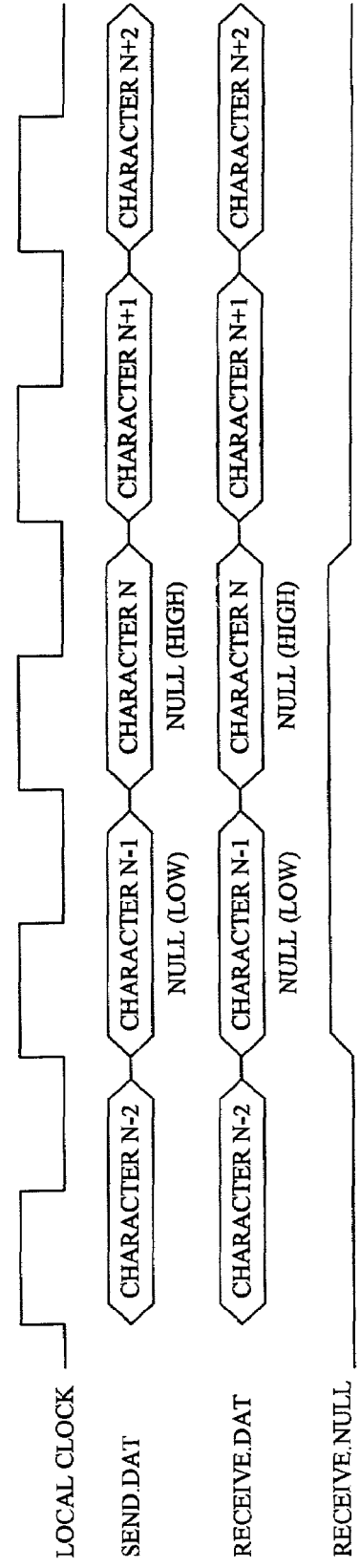

FIGS. 47A and 47B are diagrams illustrating NULL detection while the start-of-symbol pointer is not within the overrun or underrun extend regions in one embodiment. In this example, the pointer is at B[4]. Only 8 valid bits are provided to the frame aligner (i.e., an underrun condition); as a result, the pointer is moved forward to B[4]. A NULL symbol is also detected starting at B[4]. However, since the pointer is not within the overrun or underrun extend regions, no NULL symbol is removed or inserted and the two symbols of the NULL primitive are extracted.

FIGS. 48A and 48B are diagrams illustrating NULL detection while the start-of-symbol pointer is in the underrun extend region. The pointer enters the underrun extend region as a result of the transmitter's clock frequency being slightly slower than the receiver's clock frequency. When the transmitter's clock frequency is slower, the receiver can receive more data than the transmitter transmits and the receiver will eventually run out of data as the start-of-symbol pointer is moved forward. When the pointer is in the underrun region, the tracker inserts a NULL symbol when another NULL symbol is detected to account for the underrun. In this example, the pointer is at B[2] when a NULL symbol is detected. The tracker moves the pointer backward to A[2] (i.e., 1 symbol position) and inserts a NULL symbol at A[2]: B[3]. The inserted NULL symbol and the two NULL symbols of the NULL primitive are then extracted. In one embodiment, the inserted NULL symbol is a duplicate of the detected NULL symbol.

Figure 49A:
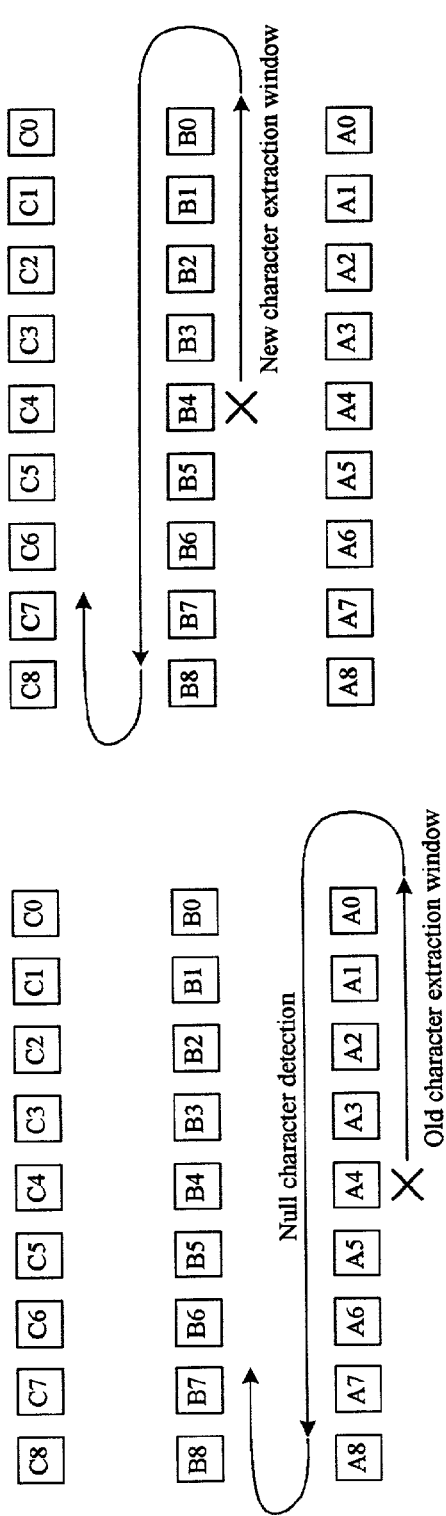
FIGS. 49A and 49B are diagrams illustrating NULL detection while the start-of-symbol pointer is in the overrun extend region.
Figure 49B:
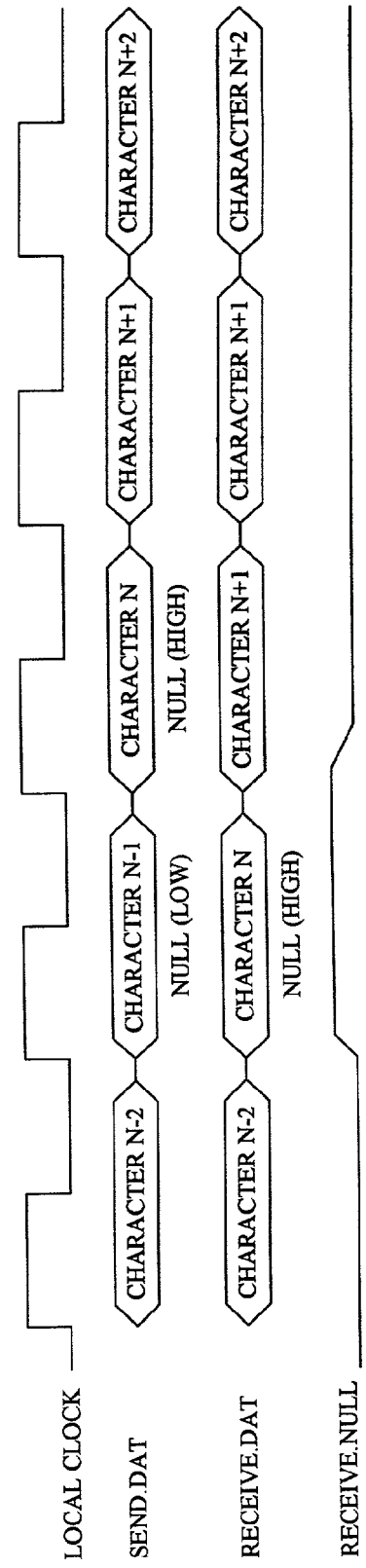

FIGS. 49A and 49B are diagrams illustrating NULL detection, while the start-of-symbol pointer is in the overrun extend region. The pointer enters the overrun extend region as a result of the transmitter's clock frequency being slightly faster than the receiver's clock frequency. When the transmitter's local clock frequency is faster, the receiver cannot receive as much data as the transmitter transmits, and so the receiver would eventually lose some data. When the pointer is in the overrun region, the tracker removes a NULL symbol of a NULL primitive when a NULL primitive is detected to account for the overrun. In this example, the pointer is at A[4] when a NULL symbol is detected. The tracker moves the pointer forward 1 symbol position, which effectively removes or skips over the NULL symbol at A[4]: B[5]. As a result, only the second NULL symbol of the NULL primitive is extracted. All primitives have the characteristic that each symbol of the primitive encodes the same information. Thus, one of the symbols of a primitive can be removed without loss of information.

From the foregoing, it will be appreciated that although specific embodiments of the invention have been described herein for purposes of illustration, various modifications may be made without deviating from the spirit and scope of the invention. Accordingly, the invention is not limited, except as by the appended claims.

We claim:

1. A memory bank having words that are addressable by addresses and having multiple sections, the memory bank comprising:

a plurality of sections, each section representing a subdivision of a word of memory, each word of memory being accessible via an address, each section being selectively enabled so that row enable lines to a section are only enabled when the subdivision of the word represented by the section is accessed wherein only a portion of a word corresponding to enabled sections is accessible so that sections that are not enabled use less power than sections that are enabled.

2. The memory bank of claim 1 wherein the address is divided into a row portion and a column portion and the memory bank includes a row decoder and a column decoder to selectively access a word of the memory bank.

3. The memory bank of claim 2 wherein output of the row decoder only drives sections that are enabled.

4. The memory bank of claim 3 wherein the outputs are buffered to accommodate row and column latencies.

5. The memory bank of claim 1 wherein the memory bank is part of a multiport memory device and wherein the section enable lines are enabled based on the accessing port.

6. The memory bank of claim 1 wherein different rows of different sections can be simultaneously accessed to satisfy different memory access requests.

7. The memory bank of claim 1 including configuration information storage for selectively enabling sections.

8. The memory bank of claim 7 wherein the memory bank is part of a multiport memory device and the selective enabling of sections is on a port-by-port basis.

9. A method for providing access to memory, the method comprising:

disabling a section of the memory, the memory including multiple sections that each contain a subdivision of a word so that row enable lines to the disabled section are not enabled when a word of memory is accessed;

receiving an address for a word of memory that is to be accessed; and accessing a subdivision of the addressed word of memory, the accessed subdivision not including the subdivision of the word in the disabled section of memory so that power is preserved by disabling the section of memory when access to the entire word is not needed.

10. The method of claim 9 wherein the memory is a multiport memory and the sections can be disabled on a port-by-port basis.

11. The method of claim 10 wherein different subdivisions of a word can be accessed through different ports.

12. The method of claim 9 wherein the disabling of a section of the memory includes setting a configurable parameter of the memory.

13. The method of claim 12 wherein the setting is stored in a latch that disables the section.

14. A memory having words that are addressable by addresses, the memory comprising:

a plurality of sections that each contain a subdivision of each word; and means for selectively disabling a section so that a row enable line to the disabled section is not enabled when a word is accessed and so that accesses to the memory access a subdivision of words that does not include the subdivision of the disabled section whereby power is saved because the section is disabled.

15. The memory of claim 14 including a plurality of ports and wherein the means for selectively disabling does so on a port-by-port basis.

16. The memory of claim 14 wherein the means for selectively disabling includes a latch for storing an indication of whether a section is disabled.

17. A memory bank having multiple sections containing words that are addressable by addresses, the memory bank comprising:

a plurality of sections, each section representing a subdivision of a word of memory; and enabling logic coupled to the plurality of sections and generating enable signals to selectively enable or disable each of the plurality of sections, wherein a section is enabled when a subdivision of a word contained within the section is accessed, and a section is disabled to reduce power consumption when a subdivision of a word contained within the section is not being accessed.

18. The memory bank of claim 17 wherein the memory bank is part of a multiport memory device and wherein the plurality of sections can be enabled or disabled based on the accessing port.

19. The memory bank of claim 18 wherein different subdivisions of a word can be accessed through different ports.

20. The memory bank of claim 17 wherein a section of memory is disabled by removing the application of an address to the section.

21. The memory bank of claim 20 wherein the address is the row address.

22. The memory bank of claim 17 wherein a section of memory is disabled by not latching data from the section of memory.

* * * * *